US012795615B2

(12) United States Patent
Naik et al.

(10) Patent No.: US 12,795,615 B2
(45) Date of Patent: Nov. 10, 2026

(54) COORDINATED TIME DIVISION MULTIPLE ACCESS (C-TDMA) IN WI-FI NETWORKS FOR PARTIAL BANDWIDTH TRANSMISSION OPPORTUNITY (TXOP) SHARING

(71) Applicant: QUALCOMM Incorporated, San Diego, CA (US)

(72) Inventors: Gaurang Naik, San Diego, CA (US); Sanket Sanjay Kalamkar, San Diego, CA (US); Abhishek Pramod Patil, San Diego, CA (US); George Cherian, San Diego, CA (US); Alfred Asterjadhi, San Diego, CA (US); Sai Yiu Duncan Ho, San Diego, CA (US); Sherief Helwa, San Diego, CA (US); Giovanni Chisci, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 358 days.

(21) Appl. No.: 18/658,879

(22) Filed: May 8, 2024

(65) Prior Publication Data

US 2025/0351121 A1 Nov. 13, 2025

(51) Int. Cl.
*H04W 72/04* (2023.01)

(52) U.S. Cl.
CPC .................................. *H04W 72/04* (2013.01)

(58) Field of Classification Search
CPC ..... H04W 84/12; H04W 72/27; H04W 72/29; H04W 72/04; H04W 72/0446; H04W 74/002
See application file for complete search history.

(56) References Cited

U.S. PATENT DOCUMENTS 12,426,024 B2 * 9/2025 Park ........................ H04B 7/024
12,634,981 B2 * 5/2026 Jang .................... H04W 72/543
(Continued)

FOREIGN PATENT DOCUMENTS

EP 3665822 B1 3/2023
GB 2640414 A * 10/2025 ............ H04W 84/12
WO WO-2024238201 A2 * 11/2024 ........ H04W 74/0816

OTHER PUBLICATIONS

International Search Report and Written Opinion—PCT/US2025/023962—ISA/EPO—Jul. 11, 2025.
(Continued)

*Primary Examiner* — Mong-Thuy T Tran
(74) *Attorney, Agent, or Firm* — Holland & Hart LLP

(57) ABSTRACT

This disclosure provides methods, components, devices and systems for coordinated time division multiple access (C-TDMA) in Wi-Fi networks for partial bandwidth transmission opportunity (TXOP) sharing. Some aspects more specifically relate to coordinating TXOP sharing in time and frequency. In some examples, a first access point (AP) obtains a TXOP associated with a bandwidth, allocates a duration of the TXOP to a second AP, and selectively communicates with one or more stations (STAs) associated with the first AP via a first portion of the bandwidth within the duration of the TXOP. In other words, the first AP may selectively communicate with one or more STAs associated with the first AP within the duration of the TXOP that the first AP shared with the second AP. Various disclosed protocols and mechanisms further relate to using resources that would otherwise be unutilized within a framework of coordinated medium access.

30 Claims, 17 Drawing Sheets

(56) References Cited

U.S. PATENT DOCUMENTS

| | | | | |
|---|---|---|---|---|
| 2022/0394487 | A1* | 12/2022 | Cizdziel | H04W 16/02 |
| 2022/0408355 | A1* | 12/2022 | Shafin | H04B 17/336 |
| 2023/0413255 | A1* | 12/2023 | Naribole | H04W 72/0453 |
| 2024/0073966 | A1 | 2/2024 | Patil et al. | |
| 2024/0107604 | A1* | 3/2024 | Ryu | H04W 76/15 |
| 2024/0137980 | A1 | 4/2024 | Ajami et al. | |
| 2024/0260086 | A1* | 8/2024 | Chu | H04W 72/0446 |
| 2024/0283613 | A1* | 8/2024 | Huang | H04L 5/0023 |
| 2024/0306194 | A1* | 9/2024 | Ryu | H04W 74/08 |
| 2024/0334478 | A1* | 10/2024 | Ali | H04W 52/143 |
| 2026/0075464 | A1* | 3/2026 | Lou | H04L 5/0053 |

OTHER PUBLICATIONS

Kalamkar S (Qualcomm Technologies Inc)., et al., “NAV Rules in C-TDMA”, IEEE 802.11-24/0423r0, 11-24-0423-00-00BN-NAV-Rules-in-C-TDMA, IEEE-SA Mentor, Piscataway, NJ, USA, vol. 802.11 UHR, 802.11bn, Apr. 17, 2024, pp. 1-9, XP068303260.

Lul (Oppo)., et al., “Considerations on Dynamic Subchannel Operation—Follow up”, IEEE 802.11-24/0449r0, 11-24-0449-00-00BN-Considerations-on-Dynamic-Subchannel-Operation-Follow-Up, IEEE-SA Mentor, Piscataway, NJ, USA, vol. 802.11 UHR, 802.11bn, Mar. 27, 2024, pp. 1-10, XP068276420, p. 4, line 1—p. 5, line 22.

* cited by examiner

COORDINATED TIME DIVISION MULTIPLE ACCESS (C-TDMA) IN WI-FI NETWORKS FOR PARTIAL BANDWIDTH TRANSMISSION OPPORTUNITY (TXOP) SHARING

TECHNICAL FIELD

This disclosure relates generally to wireless communication and, more specifically, to coordinated time division multiple access (C-TDMA) in Wi-Fi networks for partial bandwidth transmission opportunity (TXOP) sharing.

DESCRIPTION OF THE RELATED TECHNOLOGY

Wireless communication networks may include various types of wireless communication devices including network entities (such as wireless access points (AP) or base stations (BS)), client devices (such as wireless stations (STAs) or user equipment (UEs)), and other wireless nodes. These wireless communication devices may communicate with one another via a variety of technologies and wireless communication protocols, including wireless local area network (WLAN) or Wi-Fi-based protocols or cellular (such as 4G, 5G, or 6G)-based protocols. The wireless communication networks may be capable of supporting communication with multiple users by sharing the available system resources (such as time, frequency, and spatial resources). To enable features or provide improved performance, the wireless communication devices may employ technologies such as orthogonal frequency divisional multiple access (OFDMA), multi-user Multiple-Input Multiple-Output (MU-MIMO), spatial multiplexing, and beamforming. For greater inter-operability, the wireless communication networks may support backwards compatibility (such as supporting legacy wireless communication devices) as well as forward compatibility (such as supporting communication with wireless communication devices compatible with next-generation wireless communication standards).

In some wireless communication networks, a wireless communication device may contend for channel access to obtain a transmission opportunity (TXOP). In accordance with obtaining a TXOP, the wireless communication device may transmit or receive, or both, one or more frames within a duration associated with the TXOP. In some scenarios, the wireless communication device may share a portion of the TXOP with another wireless communication device (such as if a portion of the TXOP remains after the wireless communication device transmits or receives the one or more frames).

SUMMARY

The systems, methods, and devices of this disclosure each have several innovative aspects, no single one of which is solely responsible for the desirable attributes disclosed herein.

One innovative aspect of the subject matter described in this disclosure can be implemented in an apparatus for wireless communication at a first wireless AP associated with a first basic service set (BSS). The apparatus may include a processing system that includes processor circuitry and memory circuitry that stores code. The processing system may be configured to cause the first wireless AP to obtain a transmission opportunity (TXOP) associated with a bandwidth, transmit a physical layer (PHY) protocol data unit (PPDU) that includes first information indicative of an allocation of a first duration of the TXOP to a second wireless AP associated with a second BSS and second information indicative of a presence of communication associated with the first BSS via a first portion of the bandwidth within the first duration of the TXOP, and communicate, via the first portion of the bandwidth within the first duration of the TXOP, a frame with one or more stations (STAs) associated with the first wireless AP.

Another innovative aspect of the subject matter described in this disclosure can be implemented in a method for wireless communication by or at a first wireless AP associated with a first BSS. The method may include obtaining a TXOP associated with a bandwidth, transmitting a PPDU that includes first information indicative of an allocation of a first duration of the TXOP to a second wireless AP associated with a second BSS and second information indicative of a presence of communication associated with the first BSS via a first portion of the bandwidth within the first duration of the TXOP, and communicating, via the first portion of the bandwidth within the first duration of the TXOP, a frame with one or more STAs associated with the first wireless AP.

Another innovative aspect of the subject matter described in this disclosure can be implemented in an apparatus for wireless communication at a first wireless AP associated with a first BSS. The apparatus or the first wireless AP may include means for obtaining a TXOP associated with a bandwidth, means for transmitting a PPDU that includes first information indicative of an allocation of a first duration of the TXOP to a second wireless AP associated with a second BSS and second information indicative of a presence of communication associated with the first BSS via a first portion of the bandwidth within the first duration of the TXOP, and means for communicating, via the first portion of the bandwidth within the first duration of the TXOP, a frame with one or more STAs associated with the first wireless AP.

Another innovative aspect of the subject matter described in this disclosure can be implemented in a non-transitory computer-readable medium storing code for wireless communication by a first wireless AP associated with a first BSS. The code may include instructions executable by a processing system to obtain a TXOP associated with a bandwidth, transmit a PPDU that includes first information indicative of an allocation of a first duration of the TXOP to a second wireless AP associated with a second BSS and second information indicative of a presence of communication associated with the first BSS via a first portion of the bandwidth within the first duration of the TXOP, and communicate, via the first portion of the bandwidth within the first duration of the TXOP, a frame with one or more STAs associated with the first wireless AP.

Some implementations of the method, apparatuses, first wireless APs, and non-transitory computer-readable medium described herein may further include operations, features, means, or instructions for receiving an indication of a bandwidth usage at the second wireless AP via a second frame, where indicating the presence of the communication associated with the first BSS via the first portion of the bandwidth within the first duration may be in accordance with the bandwidth usage at the second wireless AP being less than the bandwidth associated with the TXOP obtained by the first wireless AP.

In some implementations of the method, apparatuses, first wireless APs, and non-transitory computer-readable medium described herein, the second information indicates the presence of a transmission to or from the first wireless AP via an opportunistic primary (O-Primary) channel associated with the first BSS within the first duration of the TXOP, the first portion of the bandwidth includes the O-Primary channel, and the communication associated with the first BSS includes the transmission via the O-Primary channel.

In some implementations of the method, apparatuses, first wireless APs, and non-transitory computer-readable medium described herein, the second information indicates the one or more STAs associated with the first wireless AP to switch from a second portion of the bandwidth to the first portion of the bandwidth.

Some implementations of the method, apparatuses, first wireless APs, and non-transitory computer-readable medium described herein may further include operations, features, means, or instructions for transmitting, via information indicative of an expectation to share the TXOP with the second wireless AP, an indication of the first duration of the TXOP and receiving an indication of an amount of the first duration that the second wireless AP will use, where indicating the presence of the communication associated with the first BSS via the first portion of the bandwidth within the first duration may be in accordance with the amount of the first duration that the second wireless AP will use.

Another innovative aspect of the subject matter described in this disclosure can be implemented in an apparatus for wireless communication at a first wireless AP associated with a first BSS. The apparatus may include a processing system that includes processor circuitry and memory circuitry that stores code. The processing system may be configured to cause the first wireless AP to receive first information indicative of an expectation of a second wireless AP associated with a second BSS to share a TXOP with the first wireless AP, transmit an indication of a bandwidth usage at the first wireless AP, receive a PPDU that includes second information indicative of an allocation of a first duration of the TXOP to the first wireless AP in accordance with the indication of the bandwidth usage at the first wireless AP, and communicate, via a first portion of a bandwidth associated with the TXOP and within the first duration of the TXOP, a frame with one or more STAs associated with the first wireless AP, where the bandwidth usage at the first wireless AP includes the first portion of the bandwidth.

Another innovative aspect of the subject matter described in this disclosure can be implemented in a method for wireless communication by or at a first wireless AP associated with a first BSS. The method may include receiving first information indicative of an expectation of a second wireless AP associated with a second BSS to share a TXOP with the first wireless AP, transmitting an indication of a bandwidth usage at the first wireless AP, receiving a PPDU that includes second information indicative of an allocation of a first duration of the TXOP to the first wireless AP in accordance with the indication of the bandwidth usage at the first wireless AP, and communicating, via a first portion of a bandwidth associated with the TXOP and within the first duration of the TXOP, a frame with one or more STAs associated with the first wireless AP, where the bandwidth usage at the first wireless AP includes the first portion of the bandwidth.

Another innovative aspect of the subject matter described in this disclosure can be implemented in an apparatus for wireless communication at a first wireless AP associated with a first BSS. The apparatus or the first wireless AP may include means for receiving first information indicative of an expectation of a second wireless AP associated with a second BSS to share a TXOP with the first wireless AP, means for transmitting an indication of a bandwidth usage at the first wireless AP, means for receiving a PPDU that includes second information indicative of an allocation of a first duration of the TXOP to the first wireless AP in accordance with the indication of the bandwidth usage at the first wireless AP, and means for communicating, via a first portion of a bandwidth associated with the TXOP and within the first duration of the TXOP, a frame with one or more STAs associated with the first wireless AP, where the bandwidth usage at the first wireless AP includes the first portion of the bandwidth.

Another innovative aspect of the subject matter described in this disclosure can be implemented in a non-transitory computer-readable medium storing code for wireless communication by a first wireless AP associated with a first BSS. The code may include instructions executable by a processing system to receive first information indicative of an expectation of a second wireless AP associated with a second BSS to share a TXOP with the first wireless AP, transmit an indication of a bandwidth usage at the first wireless AP, receive a PPDU that includes second information indicative of an allocation of a first duration of the TXOP to the first wireless AP in accordance with the indication of the bandwidth usage at the first wireless AP, and communicate, via a first portion of a bandwidth associated with the TXOP and within the first duration of the TXOP, a frame with one or more STAs associated with the first wireless AP, where the bandwidth usage at the first wireless AP includes the first portion of the bandwidth.

In some implementations of the method, apparatuses, first wireless APs, and non-transitory computer-readable medium described herein, the first wireless AP receives the information indicative of the expectation to share the TXOP with the second wireless AP via a schedule announcement frame.

In some implementations of the method, apparatuses, first wireless APs, and non-transitory computer-readable medium described herein, the indication of the bandwidth usage at the first wireless AP may be received via a second frame, the indication of the bandwidth usage at the first wireless AP may be associated with a 1-bit indication of whether the first wireless AP will use an entirety of the bandwidth associated with the TXOP or a portion of the bandwidth associated with the TXOP; a multi-bit indication that indicates which portion, of a set of multiple portions, of the bandwidth associated with the TXOP the first wireless AP will use; or an occupied bandwidth of the second frame, and the second frame may be transmitted by the first wireless AP.

In some implementations of the method, apparatuses, first wireless APs, and non-transitory computer-readable medium described herein, the second frame may be a response frame associated with a schedule announcement frame, a negotiation frame, or a management frame.

Some implementations of the method, apparatuses, first wireless APs, and non-transitory computer-readable medium described herein may further include operations, features, means, or instructions for transmitting the indication of the bandwidth usage at the first wireless AP dynamically on a per-TXOP basis or semi-statically on a per-coordination instance basis.

Another innovative aspect of the subject matter described in this disclosure can be implemented in an apparatus for wireless communication at a first STA associated with a first BSS. The apparatus may include a processing system that includes processor circuitry and memory circuitry that stores code. The processing system may be configured to cause the first STA to receive, from a first wireless AP associated with the first BSS, a PPDU that includes first information indicative of an allocation of a first duration of a TXOP obtained by the first wireless AP to a second wireless AP associated with a second BSS and second information indicative of a presence of communication associated with the first BSS via a first portion of a bandwidth associated with the TXOP within the first duration of the TXOP and receive, via the first portion of the bandwidth within the first duration of the TXOP, a frame from the first wireless AP.

Another innovative aspect of the subject matter described in this disclosure can be implemented in a method for wireless communication by or at a first STA associated with a first BSS. The method may include receiving, from a first wireless AP associated with the first BSS, a PPDU that includes first information indicative of an allocation of a first duration of a TXOP obtained by the first wireless AP to a second wireless AP associated with a second BSS and second information indicative of a presence of communication associated with the first BSS via a first portion of a bandwidth associated with the TXOP within the first duration of the TXOP and receiving, via the first portion of the bandwidth within the first duration of the TXOP, a frame from the first wireless AP.

Another innovative aspect of the subject matter described in this disclosure can be implemented in an apparatus for wireless communication at a first STA associated with a first BSS. The apparatus or the first STA may include means for receiving, from a first wireless AP associated with the first BSS, a PPDU that includes first information indicative of an allocation of a first duration of a TXOP obtained by the first wireless AP to a second wireless AP associated with a second BSS and second information indicative of a presence of communication associated with the first BSS via a first portion of a bandwidth associated with the TXOP within the first duration of the TXOP and means for receiving, via the first portion of the bandwidth within the first duration of the TXOP, a frame from the first wireless AP.

Another innovative aspect of the subject matter described in this disclosure can be implemented in a non-transitory computer-readable medium storing code for wireless communication by a first wireless STA associated with a first BSS. The code may include instructions executable by a processing system to receive, from a first wireless AP associated with the first BSS, a PPDU that includes first information indicative of an allocation of a first duration of a TXOP obtained by the first wireless AP to a second wireless AP associated with a second BSS and second information indicative of a presence of communication associated with the first BSS via a first portion of a bandwidth associated with the TXOP within the first duration of the TXOP and receive, via the first portion of the bandwidth within the first duration of the TXOP, a frame from the first wireless AP.

Some implementations of the method, apparatuses, first STAs, and non-transitory computer-readable medium described herein may further include operations, features, means, or instructions for receiving, via the first information, an indication of a second portion of the bandwidth allocated to the second wireless AP within the first duration of the TXOP.

In some implementations of the method, apparatuses, first STAs, and non-transitory computer-readable medium described herein, the second information indicates the presence of a transmission to or from the first wireless AP via an O-Primary channel associated with the first BSS within the first duration of the TXOP, the first portion of the bandwidth includes the O-Primary channel, and the communication associated with the first BSS includes the transmission via the O-Primary channel.

In some implementations of the method, apparatuses, first STAs, and non-transitory computer-readable medium described herein, the second information indicates that the first STA may be to switch from a second portion of the bandwidth to the first portion of the bandwidth.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
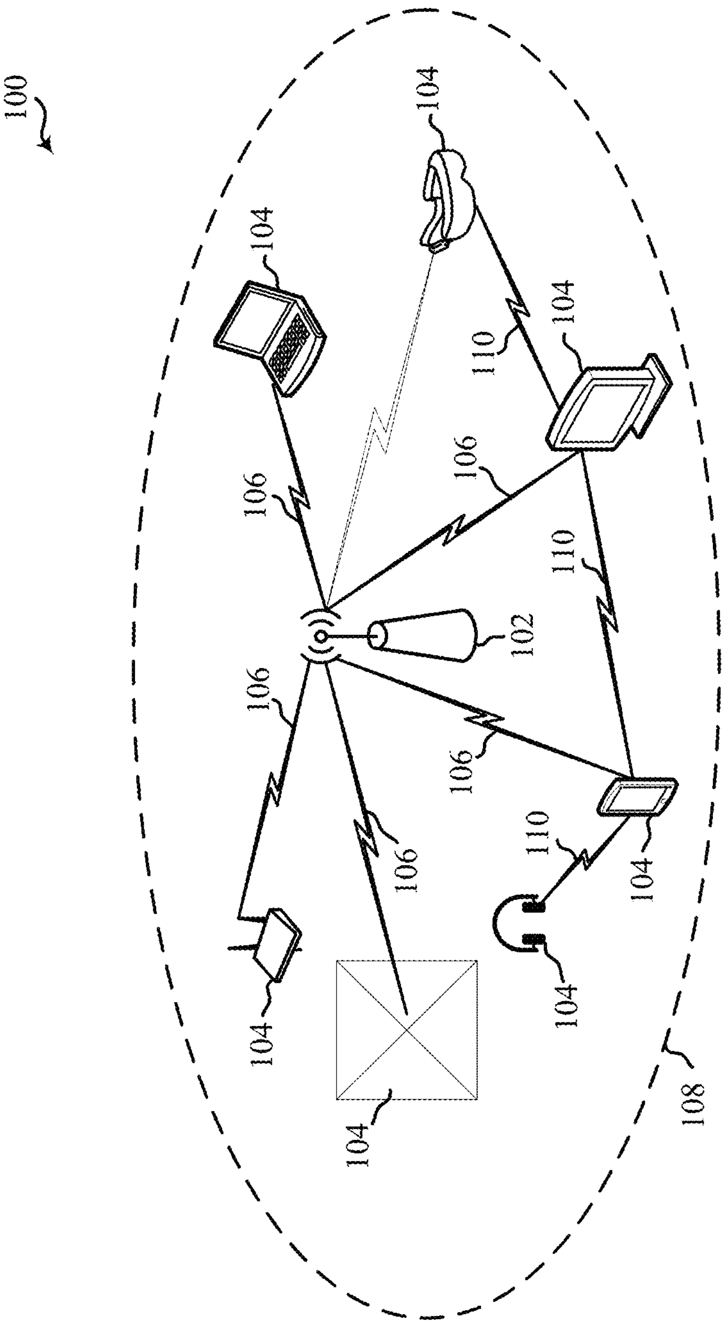
FIG. 1 shows a pictorial diagram of an example wireless communication network.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G, 5G (New Radio (NR)) or 6G standards promulgated by the 3rd Generation Partnership Project (3GPP), among others.

The described examples can be implemented in any suitable device, component, system or network that is capable of transmitting and receiving RF signals according to one or more of the following technologies or techniques: code division multiple access (CDMA), time division multiple access (TDMA), orthogonal frequency division multiplexing (OFDM), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO (MU-MIMO). The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN), a non-terrestrial network (NTN), or an internet of things (IoT) network.

In some wireless communication networks, various wireless communication devices (such as one or more access points (APs) or one or more stations (STAs), or any combination thereof) may contend for channel access to transmit or solicit one or more frames. For example, a wireless communication device may attempt to obtain channel access, which may be referred to herein as a transmission opportunity (TXOP), in accordance with a data arrival or an expected data arrival (such that the wireless communication device may use the TXOP to transmit or receive the (expected) data). If the wireless communication device obtains a TXOP, the wireless communication device may transmit a frame via a bandwidth associated with the TXOP to protect or reserve the bandwidth for a TXOP duration indicated by the frame. In accordance with obtaining and protecting the TXOP, the wireless communication device may transmit one or more frames via the bandwidth associated with the TXOP to convey the data or to solicit a transmission of the data from another wireless communication device.

In some scenarios, the wireless communication device may complete the data transfer within the TXOP such that there may be some time remaining within the obtained/protected TXOP duration. In such scenarios, among other scenarios, the wireless communication device may share a portion of the remainder of the TXOP with one or more other wireless communication devices. For example, the wireless communication device may transmit a frame, such as a TXOP allocation or sharing frame, to a second wireless communication device to allocate at least a portion of the remainder of the TXOP to the second wireless communication device. In some examples, however, the second wireless communication device may, for one or more of various reasons, use a subset of the bandwidth associated with the TXOP. In such cases, a portion of the bandwidth associated with the TXOP may go unused by the second wireless communication device. Such an unutilized portion of the bandwidth may contribute to a lower spectral efficiency or may be liable to be "taken" by another wireless communication device (as the unutilized portion of the bandwidth may appear available to some wireless communication devices). Thus, some networks may benefit from additional signaling protocols or coordination associated with providing low latency channel access to an unutilized portion of a shared TXOP bandwidth.

Various aspects relate generally to one or more signaling- or configuration-based protocols or mechanisms according to which one or more wireless communication devices (such as one or more APs or one or more STAs, or any combination thereof) may coordinate TXOP sharing in time and frequency. Some aspects more specifically relate to a first AP obtaining a TXOP associated with a bandwidth, allocating a duration of the TXOP to a second AP, and selectively communicating with (such as transmitting to or receiving from) one or more STAs associated with the first AP via a first portion of the bandwidth within at least the duration of the TXOP. In other words, the first AP may selectively communicate with one or more STAs associated with the first AP within at least the duration of the TXOP that the first AP shared with (such as allocated to) the second AP. Such selective communication may include communicating with the one or more STAs in scenarios in which the second AP uses less than the bandwidth associated with the TXOP or refraining from communicating with the one or more STAs in scenarios in which the second AP uses an entirety of the bandwidth associated with the TXOP. In some aspects, the first AP may be associated with a first basic service set (BSS) and the second AP may be associated with a second BSS (the first BSS being different from the second BSS). Thus, the disclosed protocols and mechanisms generally relate to using unutilized or underutilized resources within a framework of coordinated medium access, such as one or both of coordinated TDMA (C-TDMA) and TXOP sharing. Such a framework of coordinated medium access may be associated with inter-AP coordination and involve two or more APs. The first portion of the bandwidth may include or correspond to an opportunistic primary (O-Primary) channel, a dynamic sub-channel operation (DSO) sub-band, or any other frequency domain resource associated with the TXOP bandwidth.

In some implementations, the first AP may receive (such as obtain or derive) information indicative of a bandwidth usage, or a likely (such as expected, estimated, projected, or calculated) bandwidth usage, at the second AP. In such implementations, the first AP may selectively communicate with the one or more STAs via the first portion of the bandwidth within at least the shared TXOP duration in accordance with the (likely) bandwidth usage at the second AP. The first AP may receive the information indicative of the (likely) bandwidth usage at the second AP from the second AP or another network node (such as a central controller). The first AP may receive the information indicative of the (likely) bandwidth usage at the second AP dynamically (such as on a per-TXOP basis), semi-persistently, periodically, semi-statically, or once. For example, the first AP may receive the information indicative of the (likely) bandwidth usage at the second AP via a response frame associated with a schedule announcement frame, via a frame associated with a negotiation (such as a negotiation between the first AP and the second AP), or via any other management or data frame, among other examples.

Additionally, or alternatively, the first AP may transmit information indicative of whether the first AP expects, might, or does not expect to communicate with the one or more STAs via the first portion of the bandwidth within the shared TXOP duration in association with sharing the duration of the TXOP with the second AP. For example, the first AP may transmit first information indicative of an allocation of the duration of the TXOP to the second AP and, in association with transmitting the first information, may transmit second information indicative of a presence of communication with (such as at least one transmission to or at least one reception from) the one or more STAs via the first portion of the bandwidth within at least the shared TXOP duration. In some examples, transmitting the second information in association with transmitting the first information may include transmitting the first information and the second information via a physical layer (PHY) protocol data unit (PPDU). For example, a same or single PPDU may include the first information and the second information. Additionally, or alternatively, transmitting the second information in association with transmitting the first information may include transmitting the first information and the second information within a threshold time duration of each other. For example, the first AP may transmit the second information prior to a response from the second AP associated with the allocation (as conveyed by the first information) or prior to a frame exchange between the second AP and one or more STAs associated with the second AP.

Particular aspects of the subject matter described in this disclosure can be implemented to realize one or more of the following potential advantages. In some examples, by coordinating TXOP sharing in time and frequency, the disclosed techniques may be implemented to more fully use an available RF spectrum, which may provide greater spectral efficiency, higher data rates, lower latency, and greater network capacity. For example, by selectively communicating with the one or more STAs associated with the first AP via a portion of the bandwidth associated with the TXOP within at least the shared TXOP duration in accordance with how much bandwidth the second AP uses, the first AP may achieve greater resource efficiency while avoiding causing interference to the communication by or at the second AP. Further, by employing one or more protocols or mechanisms according to which the first AP is able to receive information indicative of a bandwidth usage at the second AP, the disclosed techniques can be implemented to facilitate a more informed channel access and greater inter-AP coordination, which may facilitate more efficient channel access attempts and more efficient use of processing resources. For example, the first AP or a STA associated with the first AP may refrain from switching from one bandwidth portion to another bandwidth portion within the shared TXOP duration if the first AP or the STA receives information indicating that the second AP will (likely) use an entirety of the bandwidth associated with the TXOP, which may reduce processing costs (and increase battery life) or allow now-available processing or RF circuitry to perform one or more other tasks (which may increase processing efficiency and improve a user experience). Such greater inter-AP coordination may further protect the TXOP from being "taken" by another wireless communication device across various scenarios.

Moreover, by transmitting the first information indicative of the TXOP allocation/sharing to the second AP and the second information indicative of the presence of the communication between the first AP and the second AP, the disclosed techniques can be implemented to facilitate prompt coordination and information sharing. Such aspects may be further implemented to facilitate low latency channel access (such as, for example, in scenarios in which the second AP uses less than an entirety of the bandwidth associated with the TXOP). Thus, in accordance with transmitting the first information in association with the second information and facilitating low latency channel access, various wireless communication devices may achieve greater spectral efficiency and communicate via a relatively larger percentage of the available bandwidth, which may achieve higher throughput and greater network capacity. Further, by achieving higher throughput and greater network capacity, various implementations of the present disclosure may additionally support higher reliability as coordinated communication avoids, for example, inter-BSS (such as overlapping BSS (OBSS)) interference and as the TXOP of the first AP has a lower likelihood of being "taken" (and lost) during a TXOP sharing procedure.

FIG. 1 shows a pictorial diagram of an example wireless communication network 100. According to some aspects, the wireless communication network 100 can be an example of a wireless local area network (WLAN) such as a Wi-Fi network. For example, the wireless communication network 100 can be a network implementing at least one of the IEEE 802.11 family of wireless communication protocol standards, such as defined by the IEEE 802.11-2020 specification or amendments thereof (including, but not limited to, 802.11ay, 802.11ax (also referred to as Wi-Fi 6), 802.11az, 802.11ba, 802.11bc, 802.11bd, 802.11be (also referred to as Wi-Fi 7), 802.11bf, and 802.11bn (also referred to as Wi-Fi 8)) or other WLAN or Wi-Fi standards, such as that associated with the Integrated Millimeter Wave (IMMW) study group. In some other examples, the wireless communication network 100 can be an example of a cellular radio access network (RAN), such as a 5G or 6G RAN that implements one or more cellular protocols such as those specified in one or more 3GPP standards. In some other examples, the wireless communication network 100 can include a WLAN that functions in an interoperable or converged manner with one or more cellular RANs to provide greater or enhanced network coverage to wireless communication devices within the wireless communication network 100 or to enable such devices to connect to a cellular network's core, such as to access the network management capabilities and functionality offered by the cellular network core. In some other examples, the wireless communication network 100 can include a WLAN that functions in an interoperable or converged manner with one or more personal area networks, such as a network implementing Bluetooth or other wireless technologies, to provide greater or enhanced network coverage or to provide or enable other capabilities, functionality, applications or services.

The wireless communication network 100 may include numerous wireless communication devices including a wireless AP 102 and any number of wireless STAs 104. While only one AP 102 is shown in FIG. 1, the wireless communication network 100 can include multiple APs 102 (such as in an extended service set (ESS) deployment, enterprise network or AP mesh network), or may not include any AP at all (such as in an independent basic service set (IBSS) such as a peer-to-peer (P2P) network or other ad hoc network). The AP 102 can be or represent various different types of network entities including, but not limited to, a home networking AP, an enterprise-level AP, a single-frequency AP, a dual-band simultaneous (DBS) AP, a tri-band simultaneous (TBS) AP, a standalone AP, a non-standalone AP, a software-enabled AP (soft AP), and a multi-link AP (also referred to as an AP multi-link device (MLD)), as well as cellular (such as 3GPP, 4G LTE, 5G or 6G) base stations or other cellular network nodes such as a Node B, an evolved Node B (eNB), a gNB, a transmission reception point (TRP) or another type of device or equipment included in a radio access network (RAN), including Open-RAN (O-RAN) network entities, such as a central unit (CU), a distributed unit (DU) or a radio unit (RU).

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, other handheld or wearable communication devices, netbooks, notebook computers, tablet computers, laptops, Chromebooks, augmented reality (AR), virtual reality (VR), mixed reality (MR) or extended reality (XR) wireless headsets or other peripheral devices, wireless earbuds, other wearable devices, display devices (such as TVs, computer monitors or video gaming consoles), video game controllers, navigation systems, music or other audio or stereo devices, remote control devices, printers, kitchen appliances (including smart refrigerators) or other household appliances, key fobs (such as for passive keyless entry and start (PKES) systems), Internet of Things (IoT) devices, and vehicles, among other examples.

A single AP 102 and an associated set of STAs 104 may be referred to as an infrastructure basic service set (BSS), which is managed by the respective AP 102. FIG. 1 additionally shows an example coverage area 108 of the AP 102, which may represent a basic service area (BSA) of the wireless communication network 100. The BSS may be identified by STAs 104 and other devices by a service set identifier (SSID), as well as a basic service set identifier (BSSID), which may be a medium access control (MAC) address of the AP 102. The AP 102 may periodically broadcast beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification or indication of a primary channel used by the respective AP 102 as well as a timing synchronization function (TSF) for establishing or maintaining timing synchronization with the AP 102. The AP 102 may provide access to external networks to various STAs 104 in the wireless communication network 100 via respective communication links 106.

To establish a communication link 106 with an AP 102, each of the STAs 104 is configured to perform passive or active scanning operations ("scans") on frequency channels in one or more frequency bands (such as the 2.4 GHz, 5 GHZ, 6 GHz, 45 GHz, or 60 GHz bands). To perform passive scanning, a STA 104 listens for beacons, which are transmitted by respective APs 102 at periodic time intervals referred to as target beacon transmission times (TBTTs). To perform active scanning, a STA 104 generates and sequentially transmits probe requests on each channel to be scanned and listens for probe responses from APs 102. Each STA 104 may identify, determine, ascertain, or select an AP 102 with which to associate in accordance with the scanning information obtained through the passive or active scans, and to perform authentication and association operations to establish a communication link 106 with the selected AP 102. The selected AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA 104 or to select among multiple APs 102 that together form an ESS including multiple connected BSSs. For example, the wireless communication network 100 may be connected to a wired or wireless distribution system that may enable multiple APs 102 to be connected in such an ESS. As such, a STA 104 can be covered by more than one AP 102 and can associate with different APs 102 at different times for different transmissions. Additionally, after association with an AP 102, a STA 104 also may periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some examples, STAs 104 may form networks without APs 102 or other equipment other than the STAs 104 themselves. One example of such a network is an ad hoc network (or wireless ad hoc network). Ad hoc networks may alternatively be referred to as mesh networks or P2P networks. In some examples, ad hoc networks may be implemented within a larger network such as the wireless communication network 100. In such examples, while the STAs 104 may be capable of communicating with each other through the AP 102 using communication links 106, STAs 104 also can communicate directly with each other via direct wireless communication links 110. Additionally, two STAs 104 may communicate via a direct wireless communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless communication links 110 include Wi-Fi Direct connections, connections established by using a Wi-Fi Tunneled Direct Link Setup (TDLS) link, and other P2P group connections.

In some networks, the AP 102 or the STAs 104, or both, may support applications associated with high throughput or low-latency requirements, or may provide lossless audio to one or more other devices. For example, the AP 102 or the STAs 104 may support applications and use cases associated with ultra-low-latency (ULL), such as ULL gaming, or streaming lossless audio and video to one or more personal audio devices (such as peripheral devices) or AR/VR/MR/XR headset devices. In scenarios in which a user uses two or more peripheral devices, the AP 102 or the STAs 104 may support an extended personal audio network enabling communication with the two or more peripheral devices. Additionally, the AP 102 and STAs 104 may support additional ULL applications such as cloud-based applications (such as VR cloud gaming) that have ULL and high throughput requirements.

As indicated above, in some implementations, the AP 102 and the STAs 104 may function and communicate (via the respective communication links 106) according to one or more of the IEEE 802.11 family of wireless communication protocol standards. These standards define the WLAN radio and baseband protocols for the physical (PHY) and MAC layers. The AP 102 and STAs 104 transmit and receive wireless communications (hereinafter also referred to as "Wi-Fi communications" or "wireless packets") to and from one another in the form of PHY protocol data units (PPDUs).

Each PPDU is a composite structure that includes a PHY preamble and a payload that is in the form of a PHY service data unit (PSDU). The information provided in the preamble may be used by a receiving device to decode the subsequent data in the PSDU. In instances in which a PPDU is transmitted over a bonded or wideband channel, the preamble fields may be duplicated and transmitted in each of multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is associated with the particular IEEE 802.11 wireless communication protocol to be used to transmit the payload.

The APs 102 and STAs 104 in the wireless communication network 100 may transmit PPDUs over an unlicensed spectrum, which may be a portion of spectrum that includes frequency bands traditionally used by Wi-Fi technology, such as the 2.4 GHZ, 5 GHZ, 6 GHZ, 45 GHZ, and 60 GHz bands. Some examples of the APs 102 and STAs 104 described herein also may communicate in other frequency bands that may support licensed or unlicensed communications. For example, the APs 102 or STAs 104, or both, also may be capable of communicating over licensed operating bands, where multiple operators may have respective licenses to operate in the same or overlapping frequency ranges. Such licensed operating bands may map to or be associated with frequency range designations of FR1 (410 MHz-7.125 GHZ), FR2 (24.25 GHz-52.6 GHZ), FR3 (7.125 GHZ-24.25 GHZ), FR4a or FR4-1 (52.6 GHz-71 GHz), FR4 (52.6 GHz-114.25 GHz), and FR5 (114.25 GHZ-300 GHz).

Each of the frequency bands may include multiple subbands and frequency channels (also referred to as subchannels). The terms "channel" and "subchannel" may be used interchangeably herein, as each may refer to a portion of frequency spectrum within a frequency band (such as a 20 MHz, 40 MHz, 80 MHz, or 160 MHz portion of frequency spectrum) via which communication between two or more wireless communication devices can occur. For example, PPDUs conforming to the IEEE 802.11n, 802.11ac, 802.11ax, 802.11be and 802.11bn standard amendments may be transmitted over one or more of the 2.4 GHz, 5 GHZ, or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 MHz, 240 MHZ, 320 MHz, 480 MHz, or 640 MHz by bonding together multiple 20 MHz channels.

An AP 102 may determine or select an operating or operational bandwidth for the STAs 104 in its BSS and select a range of channels within a band to provide that operating bandwidth. For example, the AP 102 may select sixteen 20 MHz channels that collectively span an operating bandwidth of 320 MHz. Within the operating bandwidth, the AP 102 may typically select a single primary 20 MHz channel on which the AP 102 and the STAs 104 in its BSS monitor for contention-based access schemes. In some examples, the AP 102 or the STAs 104 may be capable of monitoring only a single primary 20 MHz channel for packet detection (such as for detecting preambles of PPDUs). Conventionally, any transmission by an AP 102 or a STA 104 within a BSS must involve transmission on the primary 20 MHz channel. As such, in conventional systems, the transmitting device must contend on and win a TXOP on the primary channel to transmit anything at all. However, some APs 102 and STAs 104 supporting ultra-high reliability (UHR) communications or communication according to the IEEE 802.11bn standard amendment can be configured to operate, monitor, contend and communicate using multiple primary 20 MHz channels. Such monitoring of multiple primary 20 MHz channels may be sequential such that responsive to determining, ascertaining or detecting that a first primary 20 MHz channel is not available, a wireless communication device may switch to monitoring and contending using a second primary 20 MHz channel. Additionally, or alternatively, a wireless communication device may be configured to monitor multiple primary 20 MHz channels in parallel. In some examples, a first primary 20 MHz channel may be referred to as a main primary (M-Primary) channel and one or more additional, second primary channels may each be referred to as an O-Primary channel. For example, if a wireless communication device measures, identifies, ascertains, detects, or otherwise determines that the M-Primary channel is busy or occupied (such as due to an overlapping BSS (OBSS) transmission), the wireless communication device may switch to monitoring and contending on an O-Primary channel. In some examples, the M-Primary channel may be used for beaconing and serving legacy client devices and an O-Primary channel may be specifically used by non-legacy (such as UHR- or IEEE 802.11bn-compatible) devices for opportunistic access to spectrum that may be otherwise under-utilized.

The AP 102 and the STAs 104 of the wireless communication network 100 may implement technologies, protocols or procedures compliant with current and future generations of the IEEE 802.11 family of wireless communication protocol standards, such as Extremely High Throughput (EHT) operation defined by the IEEE 802.11be standard amendment and Ultra-High Reliability (UHR) operation defined by the IEEE 802.11bn standard amendments, to enable additional capabilities or features relative to previous generations, such as devices supporting only legacy operation such as Very High Throughput (VHT) operation defined by the 802.11ac standard amendment or High Efficiency (HE) operation defined by the IEEE 802.11ax standard amendment. For example, the IEEE 802.11be standard amendment introduced 320 MHz channels, which are twice as wide as those possible with the IEEE 802.11ax standard amendment. Accordingly, the AP 102 or the STAs 104 may use 320 MHz channels enabling double the throughput and network capacity, as well as providing rate versus range gains at high data rates due to linear bandwidth versus log SNR trade-off. EHT, UHR or other newer wireless communication protocols may support flexible operating bandwidth enhancements, such as broadened operating bandwidths relative to legacy operating bandwidths or more granular operation relative to legacy operation. For example, an EHT system may allow communications spanning operating bandwidths of 20 MHz, 40 MHz, 80 MHz, 160 MHz, 240 MHz, and 320 MHz while an UHR system may enable communications spanning even greater bandwidths, such as 480 MHz, 640 MHz or greater. EHT systems may, for example, support multiple bandwidth modes such as a contiguous 240 MHz bandwidth mode, a contiguous 320 MHz bandwidth mode, a noncontiguous 160+160 MHz bandwidth mode, or a noncontiguous 80+80+80+80 (or "4×80") MHz bandwidth mode.

In some examples, the AP 102 or the STA 104 may benefit from operability enhancements associated with EHT, UHR and newer generations of the IEEE 802.11 family of wireless communication protocol standards. For example, the AP 102 or the STA 104 attempting to gain access to the wireless medium of the wireless communication network 100 may perform techniques (which may include modifications to existing rules, structure, or signaling implemented for legacy systems) such as clear channel assessment (CCA) operation based on EHT or UHR enhancements such as increased bandwidth, puncturing, or refinements to carrier sensing and signal reporting mechanisms.

In some wireless communication systems, wireless communication between an AP 102 and an associated STA 104 can be secured. For example, either an AP 102 or a STA 104 may establish a security key for securing wireless communication between itself and the other device and may encrypt the contents of the data and management frames using the security key. In some examples, the control frame and fields within the MAC header of the data or management frames, or both, also may be secured either via encryption or via an integrity check (such as by generating a message integrity check (MIC) for one or more relevant fields.

Access to the shared wireless medium is generally governed by a distributed coordination function (DCF). With a DCF, there is generally no centralized master device allocating time and frequency resources of the shared wireless medium. On the contrary, before a wireless communication device, such as an AP 102 or a STA 104, is permitted to transmit data, it may wait for a particular time and contend for access to the wireless medium. The DCF is implemented through the use of time intervals (including the slot time (or "slot interval") and the inter-frame space (IFS). IFS provides priority access for control frames used for proper network operation. Transmissions may begin at slot boundaries. Different varieties of IFS exist including the short IFS (SIFS), the distributed IFS (DIFS), the extended IFS (EIFS), and the arbitration IFS (AIFS). The values for the slot time and IFS may be provided by a suitable standard specification, such as one or more of the IEEE 802.11 family of wireless communication protocol standards.

In some examples, the wireless communication device (such as the AP 102 or the STA 104) may implement the DCF through the use of carrier sense multiple access (CSMA) with collision avoidance (CA) (CSMA/CA) techniques. According to such techniques, before transmitting data, the wireless communication device may perform a clear channel assessment (CCA) and may determine (such as identify, detect, ascertain, calculate, or compute) that the relevant wireless channel is idle. The CCA includes both physical (PHY-level) carrier sensing and virtual (MAC-level) carrier sensing. Physical carrier sensing is accomplished via a measurement of the received signal strength of a valid frame, which is compared to a threshold to determine (such as identify, detect, ascertain, calculate, or compute) whether the channel is busy. For example, if the received signal strength of a detected preamble is above a threshold, the medium is considered busy. Physical carrier sensing also includes energy detection. Energy detection involves measuring the total energy the wireless communication device receives regardless of whether the received signal represents a valid frame. If the total energy detected is above a threshold, the medium is considered busy.

Virtual carrier sensing is accomplished via the use of a network allocation vector (NAV), which effectively serves as a time duration that elapses before the wireless communication device may contend for access even in the absence of a detected symbol or even if the detected energy is below the relevant threshold. The NAV is reset each time a valid frame is received that is not addressed to the wireless communication device. When the NAV reaches 0, the wireless communication device performs the physical carrier sensing. If the channel remains idle for the appropriate IFS, the wireless communication device initiates a backoff timer, which represents a duration of time that the device senses the medium to be idle before it is permitted to transmit. If the channel remains idle until the backoff timer expires, the wireless communication device becomes the holder (or "owner") of a transmit opportunity (TXOP) and may begin transmitting. The TXOP is the duration of time the wireless communication device can transmit frames over the channel after it has "won" contention for the wireless medium. The TXOP duration may be indicated in the U-SIG field of a PPDU. If, on the other hand, one or more of the carrier sense mechanisms indicate that the channel is busy, a MAC controller within the wireless communication device will not permit transmission.

Each time the wireless communication device generates a new PPDU for transmission in a new TXOP, it randomly selects a new backoff timer duration. The available distribution of the numbers that may be randomly selected for the backoff timer is referred to as the contention window (CW). There are different CW and TXOP durations for each of the four access categories (ACs): voice (AC_VO), video (AC_VI), background (AC_BK), and best effort (AC_BE). This enables particular types of traffic to be prioritized in the network.

In some other examples, the wireless communication device (such as the AP 102 or the STA 104) may contend for access to the wireless medium of a WLAN in accordance with an enhanced distributed channel access (EDCA) procedure. A random channel access mechanism such as EDCA may afford high-priority traffic a greater likelihood of gaining medium access than low-priority traffic. The wireless communication device using EDCA may classify data into different access categories. Each AC may be associated with a different priority level and may be assigned a different range of random backoffs (RBOs) so that higher priority data is more likely to win a TXOP than lower priority data (such as by assigning lower RBOs to higher priority data and assigning higher RBOs to lower priority data). Although EDCA increases the likelihood that low-latency data traffic will gain access to a shared wireless medium during a given contention period, unpredictable outcomes of medium access contention operations may prevent low-latency applications from achieving certain levels of throughput or satisfying certain latency requirements.

Some APs and STAs (such as the AP 102 and the STAs 104 described with reference to FIG. 1) may implement techniques for spatial reuse that involve participation in a coordinated communication scheme. According to such techniques, an AP 102 may contend for access to a wireless medium to obtain control of the medium for a TXOP. The AP that wins the contention (hereinafter also referred to as a "sharing AP") may select one or more other APs (hereinafter also referred to as "shared APs") to share resources of the TXOP. The sharing and shared APs may be located in proximity to one another such that at least some of their wireless coverage areas at least partially overlap. Some examples may specifically involve coordinated AP TDMA or OFDMA techniques for sharing the time or frequency resources of a TXOP. To share its time or frequency resources, the sharing AP may partition the TXOP into multiple time segments or frequency segments each including respective time or frequency resources representing a portion of the TXOP. The sharing AP may allocate the time or frequency segments to itself or to one or more of the shared APs. For example, each shared AP may utilize a partial TXOP assigned by the sharing AP for its uplink or downlink communications with its associated STAs.

In some examples of such TDMA techniques, each portion of a plurality of portions of the TXOP includes a set of time resources that do not overlap with any time resources of any other portion of the plurality of portions of the TXOP. In such examples, the scheduling information may include an indication of time resources, of multiple time resources of the TXOP, associated with each portion of the TXOP. For example, the scheduling information may include an indication of a time segment of the TXOP such as an indication of one or more slots or sets of symbol periods associated with each portion of the TXOP such as for multi-user TDMA.

In some examples of OFDMA techniques, each portion of the plurality of portions of the TXOP includes a set of frequency resources that do not overlap with any frequency resources of any other portion of the plurality of portions. In such examples, the scheduling information may include an indication of frequency resources, of multiple frequency resources of the TXOP, associated with each portion of the TXOP. For example, the scheduling information may include an indication of a bandwidth portion of the wireless channel such as an indication of one or more subchannels or resource units associated with each portion of the TXOP such as for multi-user OFDMA.

In this manner, the sharing AP's acquisition of the TXOP enables communication between one or more additional shared APs and their respective BSSs, subject to appropriate power control and link adaptation. For example, the sharing AP may limit the transmit powers of the selected shared APs such that interference from the selected APs does not prevent STAs associated with the TXOP owner from successfully decoding packets transmitted by the sharing AP. Such techniques may be used to reduce latency because the other APs may not need to wait to win contention for a TXOP to be able to transmit and receive data according to conventional CSMA/CA or enhanced distributed channel access (EDCA) techniques. Additionally, by enabling a group of APs 102 associated with different BSSs to participate in a coordinated AP transmission session, during which the group of APs may share at least a portion of a single TXOP obtained by any one of the participating APs, such techniques may increase throughput across the BSSs associated with the participating APs and also may achieve improvements in throughput fairness. Furthermore, with appropriate selection of the shared APs and the scheduling of their respective time or frequency resources, medium utilization may be maximized or otherwise increased while packet loss resulting from OBSS interference is minimized or otherwise reduced. Various implementations may achieve these and other advantages without requiring that the sharing AP or the shared APs be aware of the STAs 104 associated with other BSSs, without requiring a preassigned or dedicated master AP or preassigned groups of APs, and without requiring backhaul coordination between the APs participating in the TXOP.

In some examples in which the signal strengths or levels of interference associated with the selected APs are relatively low (such as less than a given value), or when the decoding error rates of the selected APs are relatively low (such as less than a threshold), the start times of the communications among the different BSSs may be synchronous. Conversely, when the signal strengths or levels of interference associated with the selected APs are relatively high (such as greater than the given value), or when the decoding error rates of the selected APs are relatively high (such as greater than the threshold), the start times may be offset from one another by a time period associated with decoding the preamble of a wireless packet and determining, from the decoded preamble, whether the wireless packet is an intra-BSS packet or is an OBSS packet. For example, the time period between the transmission of an intra-BSS packet and the transmission of an OBSS packet may allow a respective AP (or its associated STAs) to decode the preamble of the wireless packet and obtain the BSS color value carried in the wireless packet to determine whether the wireless packet is an intra-BSS packet or an OBSS packet. In this manner, each of the participating APs and their associated STAs may be able to receive and decode intra-BSS packets in the presence of OBSS interference.

In some examples, the sharing AP may perform polling of a set of un-managed or non-co-managed APs that support coordinated reuse to identify candidates for future spatial reuse opportunities. For example, the sharing AP may transmit one or more spatial reuse poll frames as part of determining one or more spatial reuse criteria and selecting one or more other APs to be shared APs. According to the polling, the sharing AP may receive responses from one or more of the polled APs. In some specific examples, the sharing AP may transmit a coordinated AP TXOP indication (CTI) frame to other APs that indicates time and frequency of resources of the TXOP that can be shared. The sharing AP may select one or more candidate APs upon receiving a coordinated AP TXOP request (CTR) frame from a respective candidate AP that indicates a desire by the respective AP to participate in the TXOP. The poll responses or CTR frames may include a power indication, for example, a receive (RX) power or RSSI measured by the respective AP. In some other examples, the sharing AP may directly measure potential interference of a service supported (such as UL transmission) at one or more APs, and select the shared APs based on the measured potential interference. The sharing AP generally selects the APs to participate in coordinated spatial reuse such that it still protects its own transmissions (which may be referred to as primary transmissions) to and from the STAs in its BSS. The selected APs may be allocated resources during the TXOP as described above.

A wireless communication device may include an auxiliary radio and a main radio and may operate in both an auxiliary radio mode and a main radio mode. The wireless communication device may be a STA or an AP, such as, for example, the AP 102 and STAs 104 described with reference to FIG. 1. Additionally, the wireless communication device may support communications over a single wireless link or over multiple wireless links. For example, the wireless communication device may be an AP MLD or a non-AP MLD. The auxiliary radio mode may support communications with relatively lower data rates (such as ≤24 Mbps) than the main radio mode. For example, while operating in an auxiliary radio mode, the auxiliary radio of the wireless communication device may transmit messages having a non-high throughput (non-HT) format whereas, while operating in a main radio mode, the main radio may transmit messages having an EHT, UHR or later protocol format. A wireless communication device that uses an auxiliary radio in addition to a main radio may improve reliability and reduce latency and power consumption. For example, the wireless communication device may improve reliability by using the auxiliary radio to transmit/receive redundancies, facilitate fast feedback exchanges, or otherwise increase robustness for high-priority or otherwise important packets (such as packets containing latency-sensitive traffic or traffic requiring high reliability). For example, to support latency-sensitive traffic insertion in uplink communications, an AP may utilize its auxiliary radio for detection of low latency PPDU (LL-PPDU) subframes associated with latency-sensitive traffic. As another example, the wireless communication device also may use the auxiliary radio to scan for channels while communicating on another channel via the main radio, thereby reducing latency associated with a transition between channels by eliminating the time for the main radio to scan for channels. As another example, use of the auxiliary radio may reduce power consumption by enabling the main radio to enter a sleep mode and monitoring for wake-up signals via the auxiliary radio, which is designed to consume less power than the main radio.

The auxiliary radio may support both transmitting and receiving (Tx/Rx) modes of operation, or may support receiving-only (Rx-only) modes of operation. If the wireless communication device is an MLD, the wireless communication device may communicate on one or more wireless links using a main radio and may simultaneously communicate on one or more wireless links using one or more auxiliary radios. In an MLD scenario in which the auxiliary radio is Rx-only capable (an "Aux-Rx" mode), the wireless communication device may transmit and receive communications on a first wireless link using the main radio but may simultaneously receive (but not transmit) communications on a second wireless link using the auxiliary radio. In an MLD scenario in which the auxiliary radio is Tx/Rx capable (an "Aux-Tx/Rx" mode), the wireless communication device may transmit and receive communications on a first wireless link using the main radio and may simultaneously transmit and receive communications on a second wireless link using the auxiliary radio. In an MLD scenario, the wireless communication device may transition the main radio from a second wireless link to a first wireless link and may correspondingly transition the auxiliary radio from the first wireless link to the second wireless link. For example, the wireless communication device's auxiliary radio may receive control signaling on the second wireless link from another wireless communication device that triggers the wireless communication device to switch the use of its radios between wireless links. If the wireless communication device is not an MLD, the wireless communication device may transition from using its auxiliary radio to using its main radio mode on a single wireless link. For example, the wireless communication device's auxiliary radio may receive control signaling from another wireless communication device that triggers the wireless communication device to initiate the transition from use of the auxiliary radio to the main radio on the wireless link. Upon such a transition, the wireless communication device may place the auxiliary radio in a powered-down sleep state while activating the main radio to an awake state. Similarly, the wireless communication may transition from using its main radio to its auxiliary radio on the wireless link upon receiving a triggering control signal.

In some examples, the wireless communication device (such as a STA) may indicate (such as via a broadcast frame such as a beacon frame or other management frame), to other wireless communication devices (such as an AP), parameters associated with an auxiliary radio mode or parameters associated with transitioning from the auxiliary radio mode to a main radio mode for a given wireless link. For example, the wireless communication device may indicate a message format for the auxiliary radio mode. The indicated message format may be associated with a particular PPDU format (such as non-HT) or a supported data rate (such as ≤24 Mbps).

In some examples, the wireless communication device may indicate transition delays corresponding to time durations associated with switching from the auxiliary mode to the main radio mode as well as switching from the main radio mode to the auxiliary radio mode for a wireless link. A second wireless communication device may schedule data communications with the wireless communication device based on the transition delay so that data is not transmitted to the wireless communication device during the transition delay, during which data may be lost. The duration of the transition delay may generally be dependent on whether the auxiliary radio supports Tx/Rx or Rx-only modes of operation. For example, if the auxiliary radio supports Tx/Rx, the auxiliary radio may transmit an acknowledgment message in response to a request to transition to the main radio mode for a wireless link, which may extend the transition delay. Additionally, or alternatively, the duration of the transition delay may depend on whether the main radio is transitioning from a sleep mode or from a different wireless link.

The auxiliary radio may perform additional functions while the wireless communication device communicates with a second wireless communication device via a wireless link using the main radio. The particular functions that may be performed may generally depend on whether the auxiliary radio supports Tx/Rx or Rx-only modes of operation or whether the wireless communication device is an MLD capable of supporting communications over more than one wireless link. For example, in an Aux-Rx mode, the auxiliary radio of a wireless communication device (such as a non-AP MLD) may monitor or collect channel state (or quality) information or statistics (such as BSS load, interference profiles of neighboring BSSs and multi-NAV multi-primary maintenance) in a passive manner. In an Aux Tx/Rx mode, the auxiliary radio of the non-AP MLD may monitor or collect channel state information or statistics as well as transmit a report to an AP MLD that includes the collected channel state information or statistics without involvement of the main radio. In some examples, while operating in an Aux-Rx mode, a first wireless communication device (such as an AP MLD) may use the auxiliary radio to receive control communications or high-priority or otherwise important data communications from the second wireless communication device (such as another AP MLD) using a second wireless link while its main radio uses the first wireless link to perform data transfer. In contrast, in an Aux-Tx/Rx mode, an AP MLD may use the auxiliary radio to both receive and transmit control communications or high-priority or otherwise important data communications. In some examples, while operating in an Aux-Rx mode, a non-AP MLD's auxiliary radio may monitor or scan for potential APs to associate with on alternative wireless channels than the wireless channel on which the non-AP MLD's main radio is still communicating with a previously connected AP. In an Aux-Tx/Rx mode, an MLD may use the auxiliary radio to both scan for and perform association or authentication on other wireless channels.

Some processes, methods, operations, techniques or other aspects described herein may be implemented, at least in part, using an artificial intelligence (AI) program, such as a program that includes a machine learning (ML) or artificial neural network (ANN) model, hereinafter referred to generally as an AI/ML model. One or more AI/ML models may be implemented in wireless communication devices (such as APs 102 and STAs 104) and to enhance various aspects associated with wireless communication. For example, an AI/ML model may be trained to identify patterns or relationships in data observed in a wireless communication network 100. An AI/ML model may support operational decisions relating to aspects associated with wireless communications networks or services. For example, an AI/ML model may be utilized for supporting or improving aspects such as reducing signaling overhead (such as by CSI feedback compression, etc.), enhancing roaming or other mobility operations, multi-AP coordination, and generally facilitating network management or optimizing network connections or characteristics to, for example, increase throughput or capacity, reduce latency or otherwise enhance user experience.

An example AI/ML model may include mathematical representations or define computing capabilities for making inferences from input data based on patterns or relationships identified in the input data. As used herein, the term "inferences" can include one or more of decisions, predictions, determinations, or values, which may represent outputs of the AI/ML model. The computing capabilities may be defined in terms of certain parameters of the AI/ML model, such as weights and biases. Weights may indicate relationships between certain input data and certain outputs of the AI/ML model, and biases are offsets that may indicate a starting point for outputs of the AI/ML model. An example AI/ML model operating on input data may start at an initial output based on the biases and then update the output based on a combination of the input data and the weights.

STAs or APs (such as a STA 104 or an AP 102) may exchange local observations with other wireless communication devices (such as other STAs or APs) or provide feedback related to the communication. This may significantly expand the types of input data that can be considered as input to an AI/ML model, as such information may not otherwise be available at the other wireless communication devices. For example, information received from other STAs or APs may include observed RSSI values, experienced packet success/failure/retry rates per client/AP, BSS/Quality of Service (QOS) load/requirements, or a history of bad/good AP link(s), which may be conveyed in terms of scores or rankings.

AI/ML models can be centralized, distributed, or federated. As both STAs 104 and APs 102 can participate in AI/ML based operations, efficient AI/ML model distribution may enhance the performance of a wireless communication system. In some examples supporting centralized AI/ML models, STAs 104 may provide training data to a centralized network location (such as an AP, AP MLD, or a server) where a global AI/ML model may be generated and refined. The centralized network location may distribute the global AI/ML model to various STAs. In some examples, global AI/ML models may train a single classifier based on all training data received from various inputs/sources. In some examples supporting distributed learning or distributed models, both APs and STAs may be independently capable of computing AI/ML models and sharing data with other participating wireless communication devices in the wireless communication network such that each device can train the global AI/ML model locally. In some examples supporting a federated learning or hybrid AI/ML model, substantially all participating wireless communication devices (such as APs 102 and STAs 104) may be capable of generating local AI/ML models and sharing their local models to a centralized network location or entity. In turn, the centralized network entity may generate a global AI/ML model using the received local models as input and distribute the global model to all or a subset of the participating wireless communication devices.

In some examples, AI/ML models may be downloadable. For example, an AP may share AI/ML model components with associated STAs or other friendly/coordinating APs. STAs may download the AI/ML model and use the model for making decisions related to wireless communications. The downloading of an AI/ML model may be independent from signaling the inputs to the AI/ML model (such as some wireless communication devices may download the AI/ML model without exchanging information with other wireless communication devices; some wireless communication devices may exchange information and use such information as an input to the AI/ML model without downloading it; and some wireless communication devices may download the AI/ML model and exchange information or the AI/ML model with other wireless communication devices).

In accordance with some example implementations of the present disclosure, various wireless communication devices (such as one or more APs 102 or one or more STAs 104, or any combination thereof) may support one or more protocols or mechanisms according to which one or more of such various wireless communication devices may support frequency-aware TXOP sharing. Frequency-aware TXOP sharing may generally relate to how a wireless communication device may use received, obtained, derived, or otherwise determined information associated with a bandwidth usage by an AP 102 within a shared TXOP duration to selectively communicate via an unused portion of the bandwidth. For example, a first AP 102 may obtain a TXOP associated with a bandwidth and may share a first duration (such as a subset) of the TXOP with a second AP 102. In such examples, the first AP 102 may function or be understood as a sharing AP and the second AP 102 may function or be understood as a shared AP. Sharing the first duration of the TXOP with the second AP 102 may include allocating the first duration of the TXOP to the second AP 102. For various reasons, the second AP 102 may use an entirety of the bandwidth associated with the TXOP or a portion of the bandwidth associated with the TXOP. In scenarios in which the second AP 102 uses a portion of the bandwidth associated with the TXOP, and in accordance with some implementations, the first AP 102 may use at least a portion of a remaining bandwidth for communication with one or more STAs 104 associated with the first AP 102.

In some aspects, the first AP 102 may provide (such as transmit) a notification to the one or more STAs 104 associated with the first AP 102 to inform the one or more STAs 104 of an expectation, a possibility, or an absence of communication via the portion of the remaining bandwidth, which may be referred to herein as a first portion of the bandwidth associated with the TXOP. In some examples, the first AP 102 may provide such a notification in association with sharing (such as allocating) the first duration of the TXOP with the second AP 102. The notification may enable or trigger the one or more STAs 104, or the first AP 102, to avoid one or more delays prior to communicating via the first portion of the bandwidth. For example, in accordance with providing the notification in association with sharing the first duration of the TXOP with the second AP 102, the first AP 102 may selectively trigger the STA(s) 104 associated with the first AP 102 to move to the first portion of the bandwidth without waiting for an energy detection measurement or other signaling protocols to trigger the STA(s) to move to the first portion of the bandwidth.

Figure 2:
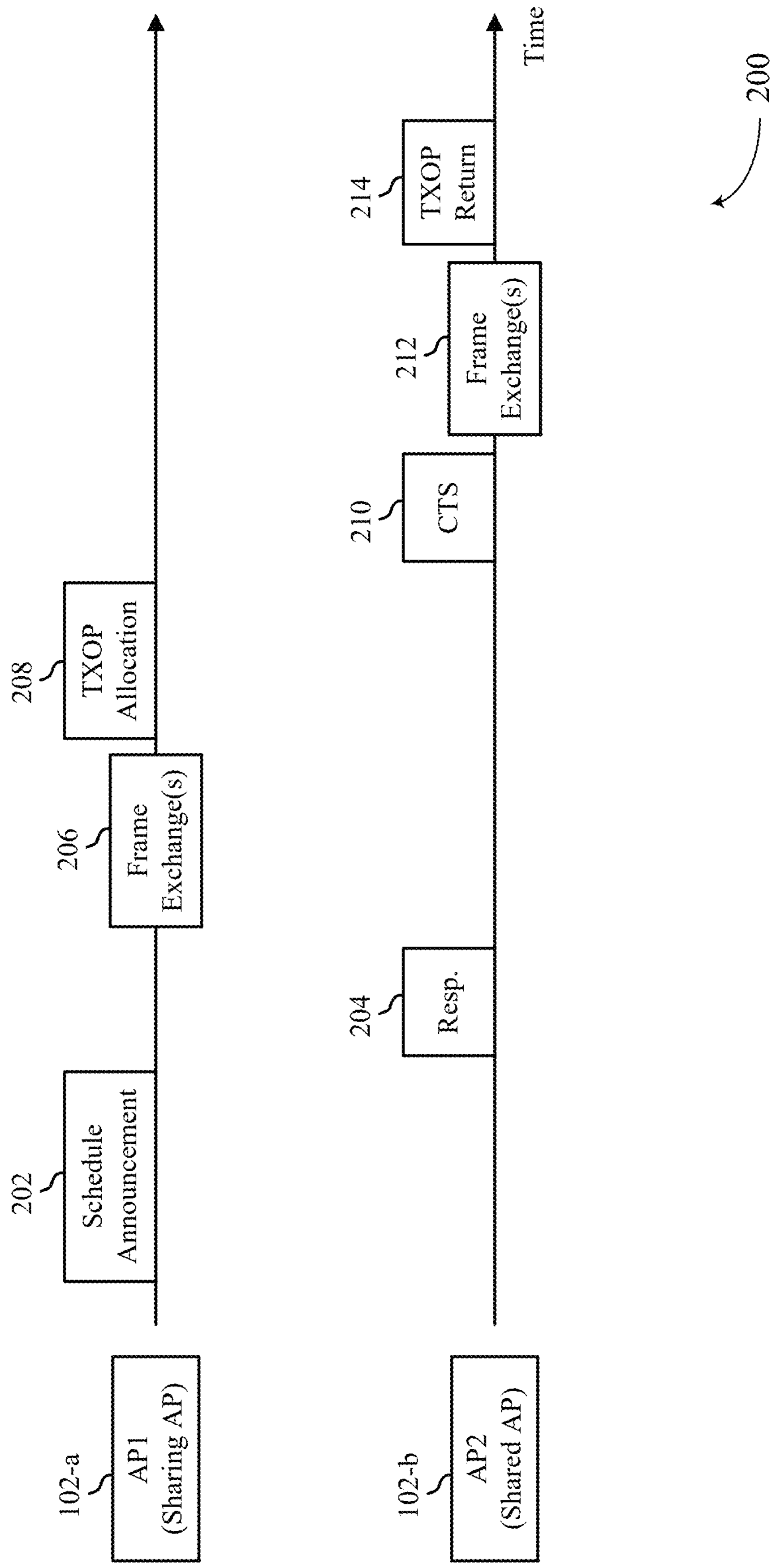
FIG. 2 shows an example frame exchange sequence that supports coordinated time division multiple access (C-TDMA) in Wi-Fi networks for partial bandwidth transmission opportunity (TXOP) sharing, including in scenarios in which a sharing access point (AP) shares a portion of a TXOP after completing a data transfer to or from the sharing AP.

FIG. 2 shows an example frame exchange sequence 200 that supports C-TDMA in Wi-Fi networks for partial bandwidth TXOP sharing, including in scenarios in which a sharing AP shares a portion of a TXOP after completing a data transfer to or from the sharing AP. The frame exchange sequence 200 illustrates communication between an AP 102-*a* and an AP 102-*b*. The AP 102-*a* and the AP 102-*b* may each be an example of an AP 102 as illustrated by and described with reference to FIG. 1. In some examples, the AP 102-*a* may function, be understood, or be referred to as a sharing AP, such as a TXOP sharing AP. In some examples, the AP 102-*b* may function, be understood, or be referred to as a shared AP, such as a TXOP shared AP. In some examples, the AP 102-*a* may be associated with a first BSS and the AP 102-*b* may be associated with a second BSS. The first BSS and the second BSS may be the same or may be different. Further, although shown in the example of a communication sequence between two APs 102, any two or more wireless communication devices may implement the frame exchange sequence 200. In some implementations, for example, two or more wireless communication devices may support triggered TXOP sharing (TXS), via which an AP 102 may share a portion of a TXOP with an associated STA 104 for P2P operations (such as P2P communication).

The frame exchange sequence 200 may illustrate an example C-TDMA sequence that the AP 102-*a* and the AP 102-*b* may use to organize or otherwise coordinate communication (such as to organize or coordinate communication via a same channel or via overlapping channels). In some implementations, the AP 102-*a* may obtain a TXOP associated with a bandwidth. The AP 102-*a* may transmit a frame, such as a schedule announcement frame 202, to indicate an expected (such as planned, scheduled, anticipated, or possible) use of the resources associated with the TXOP. For example, the AP 102-*a* may indicate an expectation to share a first duration of the TXOP with the AP 102-*b*, among other aspects, via the frame (such as via the schedule announcement frame 202, among other example frames that might communicate scheduling or coordination information). For example, the AP 102-*a* may announce a C-TDMA schedule to the AP 102-*b* via the schedule announcement frame 202. In some examples, the AP 102-*b* may transmit a frame 204 including acknowledgment (ACK) or other responsive information associated with receiving the indication of the expected use of the resources associated with the TXOP.

In some examples, the AP 102-*a* may perform one or more frame exchanges 206 within the TXOP obtained by the AP 102-*a*. Such frame exchanges 206 may include one or more frame transmissions or one or more frame receptions, or any combination thereof, between the AP 102-*a* and one or more STAs 104 associated with the AP 102-*a*. The AP 102-*a* may perform the one or more frame exchanges 206 prior to or after sharing the TXOP with the AP 102-*b*, or both. In examples in which the AP 102-*a* performs the one or more frame exchanges 206 prior to sharing the TXOP with the AP 102-*b* (as illustrated in the example of FIG. 2), the AP 102-*a* may transmit information indicative of an allocation (such as a sharing) of a first duration of the TXOP to the AP 102-*b*. For example, the AP 102-*a* may trigger a TXOP sharing with the AP 102-*b* via a frame that includes information indicative of the allocation of the first duration of the TXOP to the AP 102-*b*. Such a frame may be referred to herein as a TXOP allocation frame 208, among other examples. In some aspects, the TXOP allocation frame 208 may be a multi-user (MU) request-to-send (RTS) TXS frame. In some of such aspects, the AP 102-*a* may use the MU-RTS TXS frame to share a portion of a TXOP with an associated STA 104, such as for P2P operations or applications.

The AP 102-*b* may receive the frame including the information indicative of the allocation of the first duration of the TXOP to the AP 102-*b* and, in some examples, may transmit a clear-to-send (CTS) frame 210. In some examples, the CTS frame may protect the shared TXOP at the AP 102-*b* from being overtaken by one or more other wireless communication devices. In some examples, the AP 102-*b* may perform one or more frame exchanges 212 within the first duration of the TXOP that is shared with the AP 102-*b*. Such frame exchanges 212 may include one or more frame transmissions or one or more frame receptions, or any combination thereof, between the AP 102-*b* and one or more STAs 104 associated with the AP 102-*b*. In some examples, the AP 102-*b* may return a remaining duration of the shared first duration. For example, if the AP 102-*b* completes the one or more frame exchanges 212 prior to an expiration of the first duration of the TXOP that is allocated to the AP 102-*b*, the AP 102-*b* may return the extra time to the AP 102-*a*. In some examples, the AP 102-*b* may return the remaining duration of the shared first duration by transmitting a frame indicative of the return to the AP 102-*a*. Such a frame may be, for example, a TXOP return frame 214. In accordance with a reception of such a frame, the AP 102-*a* may reclaim (and, in some examples, use for further communication) an unused portion of the shared first duration (if any) from the AP 102-*b*.

Figure 3:
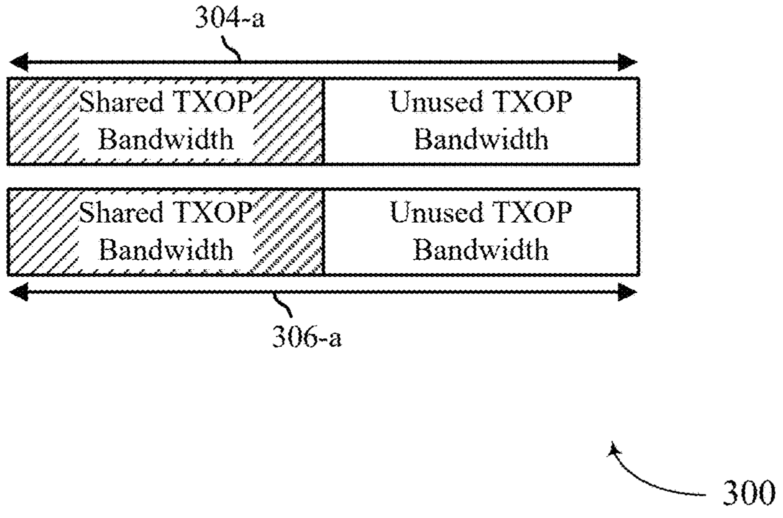
FIG. 3 shows example scenarios that illustrate comparisons between two operational bandwidths of two coordinating APs that support C-TDMA in Wi-Fi networks for partial bandwidth TXOP sharing.
Figure 3:
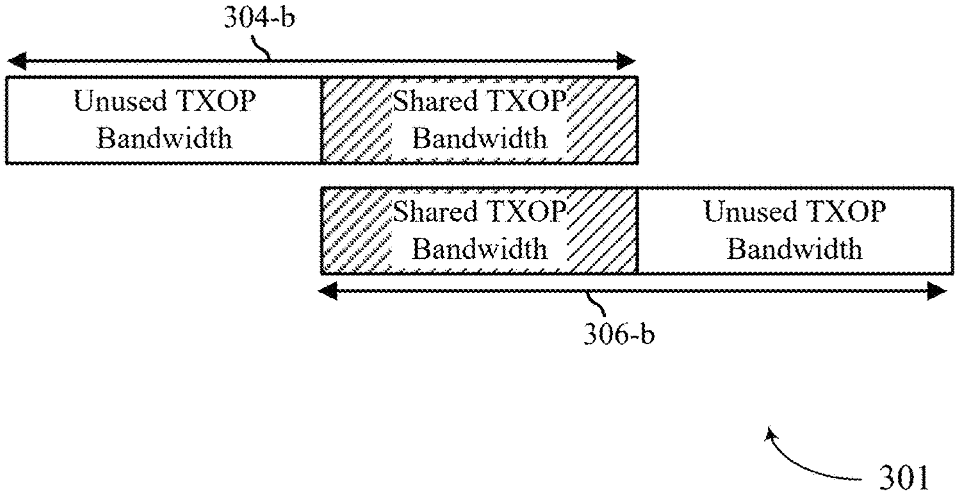
Figure 3:
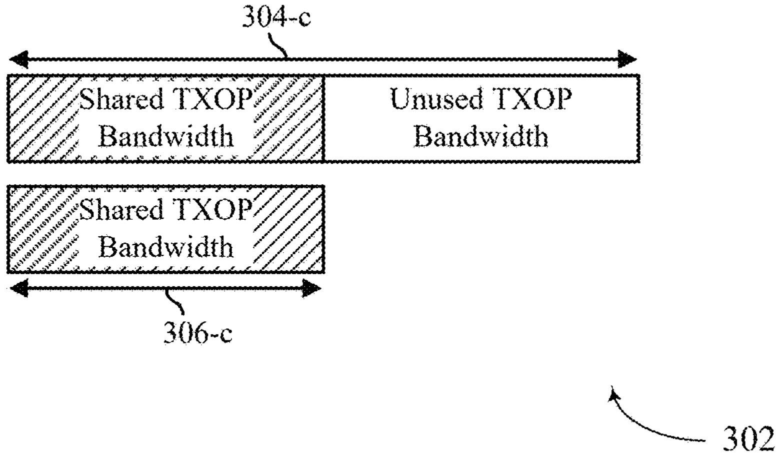

FIG. 3 shows example scenarios 300, 301, and 302 that illustrate comparisons between two operational bandwidths of two coordinating APs that support C-TDMA in Wi-Fi networks for partial bandwidth TXOP sharing. For example, the scenarios 300, 301, and 302 illustrate comparisons between a bandwidth (such as an operational bandwidth) of the AP 102-*a* (such as the sharing AP) and a bandwidth (such as an operational bandwidth) of the AP 102-*b* (such as the shared AP). In some aspects, the scenarios 300, 301, and 302 illustrate some of the various reasons or causes according to which TXOP sharing may not occur over an entire bandwidth of the AP 102-*a* (the sharing AP) such that there may be an underutilization of the available spectrum in some networks (such as in some C-TDMA networks).

In the scenario 300, the AP 102-*a* may be associated with a bandwidth 304-*a* and the AP 102-*b* may be associated with a bandwidth 306-*a*. The bandwidth 304-*a* may be an acquired TXOP bandwidth by the AP 102-*a*. The scenario 300 illustrates an example in which the AP 102-*b* (the shared AP) uses a portion of the entire bandwidth (such as a portion of the bandwidth 304-*a* or the bandwidth 306-*a*), regardless of whether the AP 102-*a* and the AP 102-*b* have a same bandwidth or different bandwidths. In other words, in the scenario 300, the AP 102-*b* may use less than the bandwidth 304-*a* acquired by the AP 102-*a*, with the bandwidth 304-*a* being the same as or different than the bandwidth 306-*a*. For example, the AP 102-*b* may communicate with one or more narrowband STAs 104 in the second BSS associated with the AP 102-*b*. Thus, in the scenario 300, the AP 102-*b* may use a portion of the bandwidth 304-*a* (if the TXOP obtained by the AP 102-*a* is shared with the AP 102-*b*) by way of selecting to use a relatively smaller bandwidth (such as to communicate with one or more narrowband client devices).

In the scenario 301, the AP 102-*a* may be associated with a bandwidth 304-*b* and the AP 102-*b* may be associated with a bandwidth 306-*b*. The bandwidth 304-*b* may be an acquired TXOP bandwidth by the AP 102-*a*. The bandwidth 304-*b* and the bandwidth 306-*b* may be the same or may be different and, as illustrated in the scenario 301, may overlap in part. Thus, in the scenario 301, the AP 102-*b* may use a portion of the bandwidth 304-*b* (if the TXOP obtained by the AP 102-*a* is shared with the AP 102-*b*) by way of being associated with the bandwidth 306-*b* that is partially non-overlapping (such as not fully overlapping) with the bandwidth 304-*b* acquired by the AP 102-*a*.

In the scenario 302, the AP 102-*a* may be associated with a bandwidth 304-*c* and the AP 102-*b* may be associated with a bandwidth 306-*c*. The bandwidth 304-*c* may be an acquired TXOP bandwidth by the AP 102-*a*. In the scenario 302, the bandwidth 304-*c* and the bandwidth 306-*c* may be different (such as may have different sizes). For example, the bandwidth 304-*c* may be larger than the bandwidth 306-*c*. For example, the AP 102-*b* may reduce an operational bandwidth of the AP 102-*b* (such as by using OMN). Thus, in the scenario 302, the AP 102-*b* may use a portion of the bandwidth 304-*c* (if the TXOP obtained by the AP 102-*a* is shared with the AP 102-*b*) by way of having a smaller operational bandwidth as compared to the bandwidth 304-*c* of the AP 102-*a*.

Additionally, or alternatively, the AP 102-*a* and the AP 102-*b* may experience scenarios in which the AP 102-*a* (the sharing AP) selects or determines to share a portion of a BSS bandwidth of the AP 102-*a* with the AP 102-*b*. In such scenarios, the AP 102-*a* may serve (such as communicate with) one or more STAs 104 associated with the AP 102-*a* while also allowing the AP 102-*b* (or, more generally, one or more neighboring APs 102) to flush one or more respective data/transmission queues. Thus, in such scenarios, the AP 102-*b* may use a portion of the bandwidth obtained by the AP 102-*a* by way of the AP 102-*a* selectively sharing the portion (such as less than an entirety of) the bandwidth with the AP 102-*b*.

Additionally, or alternatively, the AP 102-*a* may intentionally share a portion of a TXOP bandwidth with the AP 102-*b*. In such scenarios, the AP 102-*a* and the AP 102-*b* may have same or different bandwidths and the AP 102-*a* may selectively, deterministically, or intentionally share a portion of the TXOP bandwidth so that the AP 102-*a* can share a remaining portion of the TXOP bandwidth with one or more STAs 104 associated with the AP 102-*a* or such that the AP 102-*a* may otherwise use a remaining portion of the TXOP to communicate with one or more STAs 104 associated with the AP 102-*a*. In some implementations, the AP 102-*a* may select how much of a TXOP bandwidth to allocate to the AP 102-*b* in accordance with an indicated or determined bandwidth usage at the AP 102-*b*, an amount of data buffered at the AP 102-*a*, or bandwidth capabilities of the one or more STAs 104 associated with the AP 102-*a*, among other examples.

Figure 4:
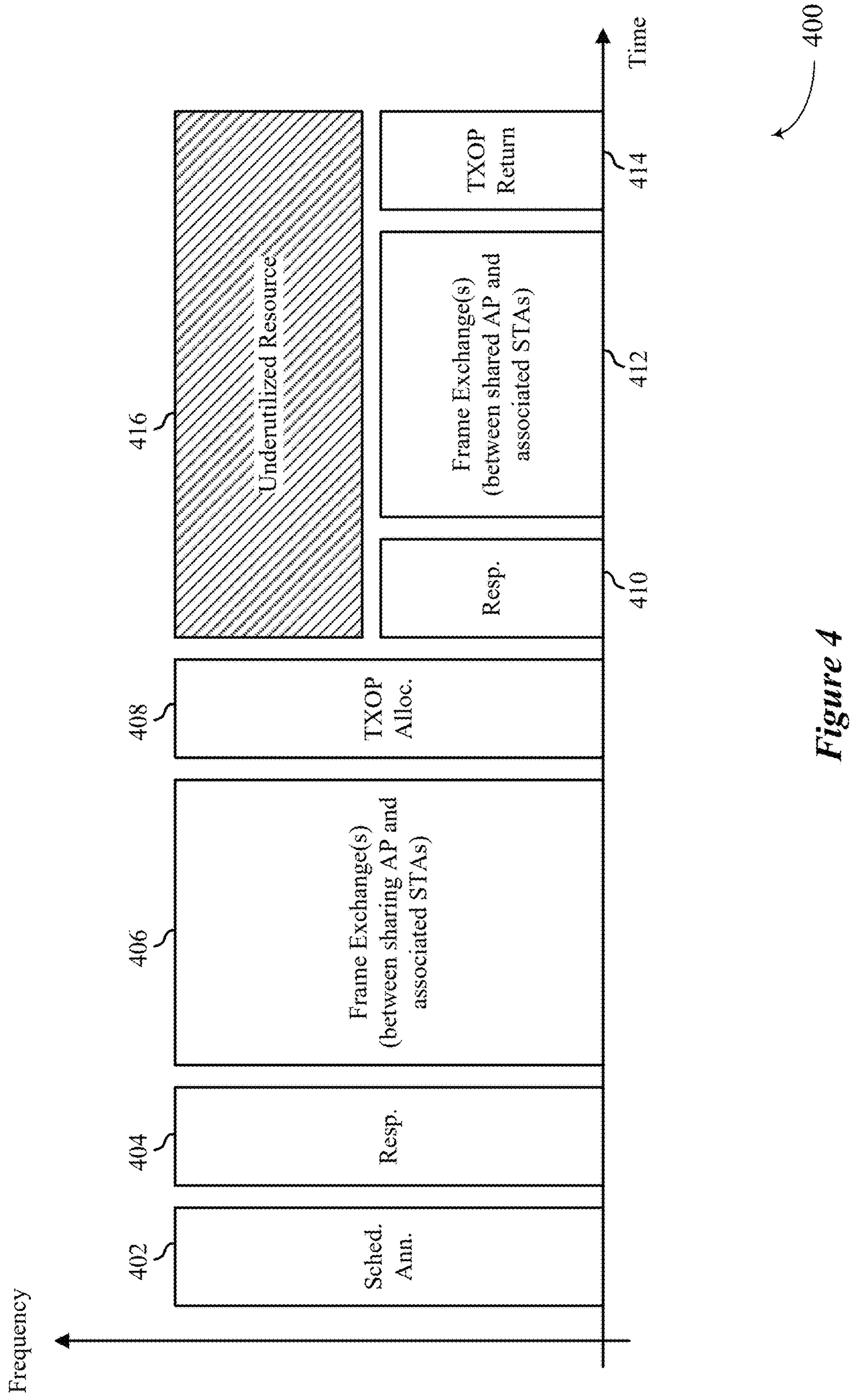
FIGS. 4-10 show example communication timelines that illustrate various protocols or mechanisms according to which a sharing AP may communicate with one or more associated stations (STAs) within a shared TXOP duration to support C-TDMA in Wi-Fi networks for partial bandwidth TXOP sharing.

FIG. 4 shows an example communication timeline 400 that illustrates various protocols or mechanisms according to which a sharing AP may communicate with one or more associated STAs within a shared TXOP duration to support C-TDMA in Wi-Fi networks for partial bandwidth TXOP sharing. The communication timeline 400 may illustrate communication involving (such as to or from) the AP 102-*a*, the AP 102-*b*, one or more STAs 104 associated with the AP 102-*a*, and one or more STAs associated with the AP 102-*b*. For example, the communication timeline 400 may illustrate how the AP 102-*a* uses an obtained TXOP for communication with one or more STAs 104 associated with the AP 102-*a* and allocates (such as shares) a portion of the TXOP to the AP 102-*b* for communication between the AP 102-*b* and one or more STAs 104 associated with the AP 102-*b*.

As illustrated in the example of the communication timeline 400, the AP 102-*a* may obtain a TXOP associated with a bandwidth and may announce (such as transmit) information indicative of an expected communication schedule associated with the TXOP via a schedule announcement frame 402. Such a communication schedule may be a C-TDMA schedule. The AP 102-*b* may receive the schedule announcement frame 402 and may transmit a response frame 404. The response frame 404 may acknowledge the schedule announcement frame 402 and, in some implementations, may provide additional information associated with a use, or an expected use, of any shared TXOP duration by the AP 102-*b*.

The AP 102-*a* may perform one or more frame exchanges 406 via the bandwidth associated with the TXOP obtained by the AP 102-*a*. Such frame exchanges 406 may include one or more frame transmissions or one or more frame receptions, or any combination thereof, between the AP 102-*a* (the sharing AP) and one or more STAs 104 associated with the AP 102-*a*. In some examples, the AP 102-*a* may transmit a frame, such as a TXOP allocation frame 408, to allocate a first duration of the TXOP to the AP 102-*b*. In some examples, the AP 102-*a* may transmit the TXOP allocation frame 408 in accordance with the expected communication schedule associated with the TXOP announced by the AP 102-*a* via the schedule announcement frame 402.

In some examples, the AP 102-*b* (the shared AP) may transmit a response frame 410 acknowledging the TXOP allocation frame 408. In some scenarios, the AP 102-*b* may transmit the response frame 410 via a portion of the bandwidth associated with the TXOP. For example, in accordance with one or more of various scenarios disclosed herein, the AP 102-*b* may use a portion of the bandwidth associated with the TXOP. The AP 102-*b* may perform one or more frame exchanges 412 via the portion of the bandwidth associated with the TXOP. Such frame exchanges 412 may include one or more frame transmissions or one or more frame receptions, or any combination thereof, between the AP 102-*b* and one or more STAs 104 associated with the AP 102-*b*. The AP 102-*b* may transmit a TXOP return frame 414 to the AP 102-*a* to return any unused portion of the shared TXOP duration to the AP 102-*a*.

In accordance with the bandwidth mismatch between the AP 102-*a* (the sharing AP) and the AP 102-*b* (the shared AP), a first portion 416 of the bandwidth associated with the TXOP may be unutilized or underutilized, which may lead to an underutilization of the available spectrum at the AP 102-*a*, the AP 102-*b*, or both. Accordingly, in some implementations, the AP 102-*a*, the AP 102-*b*, and one or more associated STAs 104 may support one or more protocols or mechanisms according to which the AP 102-*a* and one or more STAs 104 associated with the AP 102-*a* may mitigate the underutilization of the first portion 416 of the bandwidth associated with the TXOP, which may improve a BSS performance (such as a throughput or reliability) of the AP 102-*a*. Additionally, or alternatively, one or more protocols or mechanisms may address scenarios in which a bandwidth is reduced by the AP 102-*b* over time (such as within or across the one or more frame exchanges 412). For example, the AP 102-*a*, the AP 102-*b*, and one or more associated STAs 104 may support one or more protocols or mechanisms according to which one or more of such wireless communication devices may avoid scenarios in which the AP 102-*a* is unable to expand a bandwidth of the AP 102-*a* back to the originally acquired bandwidth associated with the TXOP (which may cause unnecessary loss in the BSS performance of the AP 102-*a*).

Figure 5:
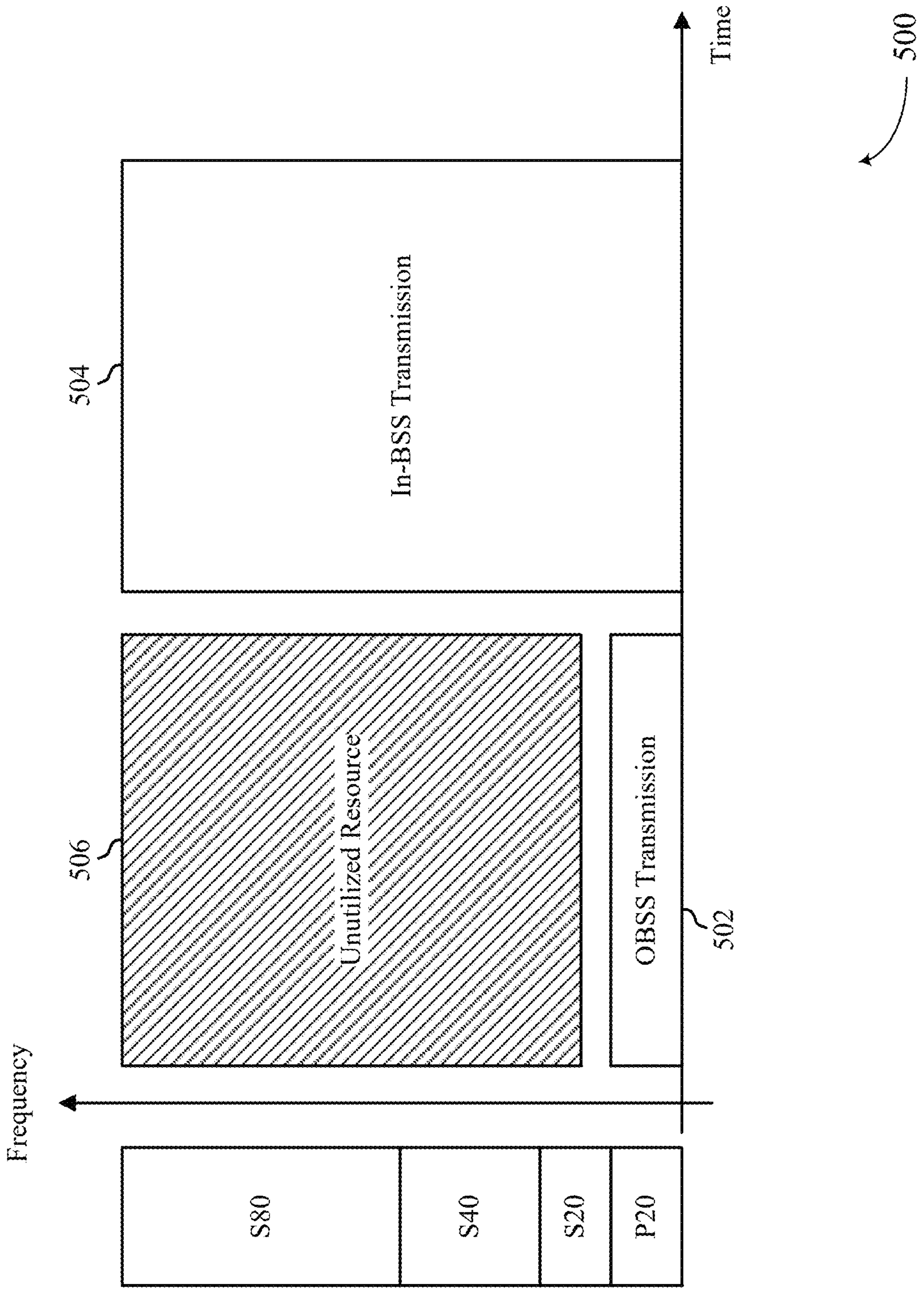

FIG. 5 shows an example communication timeline 500 that illustrates various protocols or mechanisms according to which a sharing AP may communicate with one or more associated STAs within a shared TXOP duration to support C-TDMA in Wi-Fi networks for partial bandwidth TXOP sharing. The communication timeline 500 may illustrate resource utilization by various transmissions or receptions by or at the AP 102-*a* or the AP 102-*b*, which may be associated with OBSSs relative to each other. For example, the AP 102-*a* may be associated with a first BSS and the AP

102-*b* may be associated with a second BSS and, in some aspects, the second BSS may be an OBSS with respect to the first BSS (and vice versa).

In some networks, the AP 102-*a* may attempt to access the wireless medium by contending for channel access. In some examples, the AP 102-*a* may contend for channel access in accordance with monitoring and measuring an energy associated with one or more select channels, such as a primary 20 MHz channel (which may be denoted as a P20 channel). In such examples, if the AP 102-*a* senses that the primary 20 MHz channel is busy, the AP 102-*a* may refrain from transmitting and wait until the primary 20 MHz channel is idle (such as available). In some scenarios, however, an OBSS transmission 502 via the primary 20 MHz channel (which the AP 102-*a* may sense as part of a determination that the primary 20 MHz channel is busy) may be limited to a portion of an available bandwidth, such as a portion of an operational or BSS bandwidth of the AP 102-*a*. Thus, in some scenarios, a first portion 506 of the available bandwidth may be unutilized for at least a duration of the OBSS transmission 502. In other words, if a primary channel of a BSS is busy due to, for example, narrowband OBSS traffic, a remainder of the available bandwidth (such as the bandwidth of the AP 102-*a*) may be unutilized. Once the OBSS transmission is complete, the AP 102-*a* may sense the primary 20 MHz channel as idle and perform an in-BSS transmission 504 (which may be, for example, performed via a 160 MHz bandwidth, or an entirety of the available bandwidth at the AP 102-*a*).

In some examples, the AP 102-*a* may employ a non-primary channel access (NCPA) procedure to increase the usage of the first portion 506 of the available bandwidth. For example, in accordance with NPCA, the AP 102-*a* may define one or more O-Primary channels within the BSS bandwidth of the AP 102-*a* via which the AP 102-*a* and non-AP STAs 104 associated with the AP 102-*a* may contend for access when the primary (such as the M-Primary) channel is busy.

Additionally, or alternatively, if the AP 102-*a* or the AP 102-*b* has traffic for narrowband in-BSS STAs 104, and performs a transmission for such narrowband in-BSS STAs 104 via a primary 20 MHz channel, a remainder of the BSS bandwidth of the AP 102-*a* or the AP 102-*b* may similarly be unutilized. In some examples, the AP 102-*a* or the AP 102-*b* may employ a DSO procedure to trigger or cause one or more (narrowband) non-AP STAs 104 to switch to one or more secondary sub-bands (such as DSO sub-bands) on a dynamic (such as per-TXOP) basis. For example, if the AP 102-*a* or the AP 102-*b* measures that a first subband (such as a first set of one or more channels) is busy, the AP 102-*a* or the AP 102-*b* may trigger one or more associated STAs 104 to switch to a second subband (such as a second set of one or more channels) for in-BSS communication. Additionally, or alternatively, the AP 102-*a* or the AP 102-*b* may proactively trigger one or more associated STAs 104 to switch to the second subband (such as without measuring that the first subband is busy).

Figure 6:
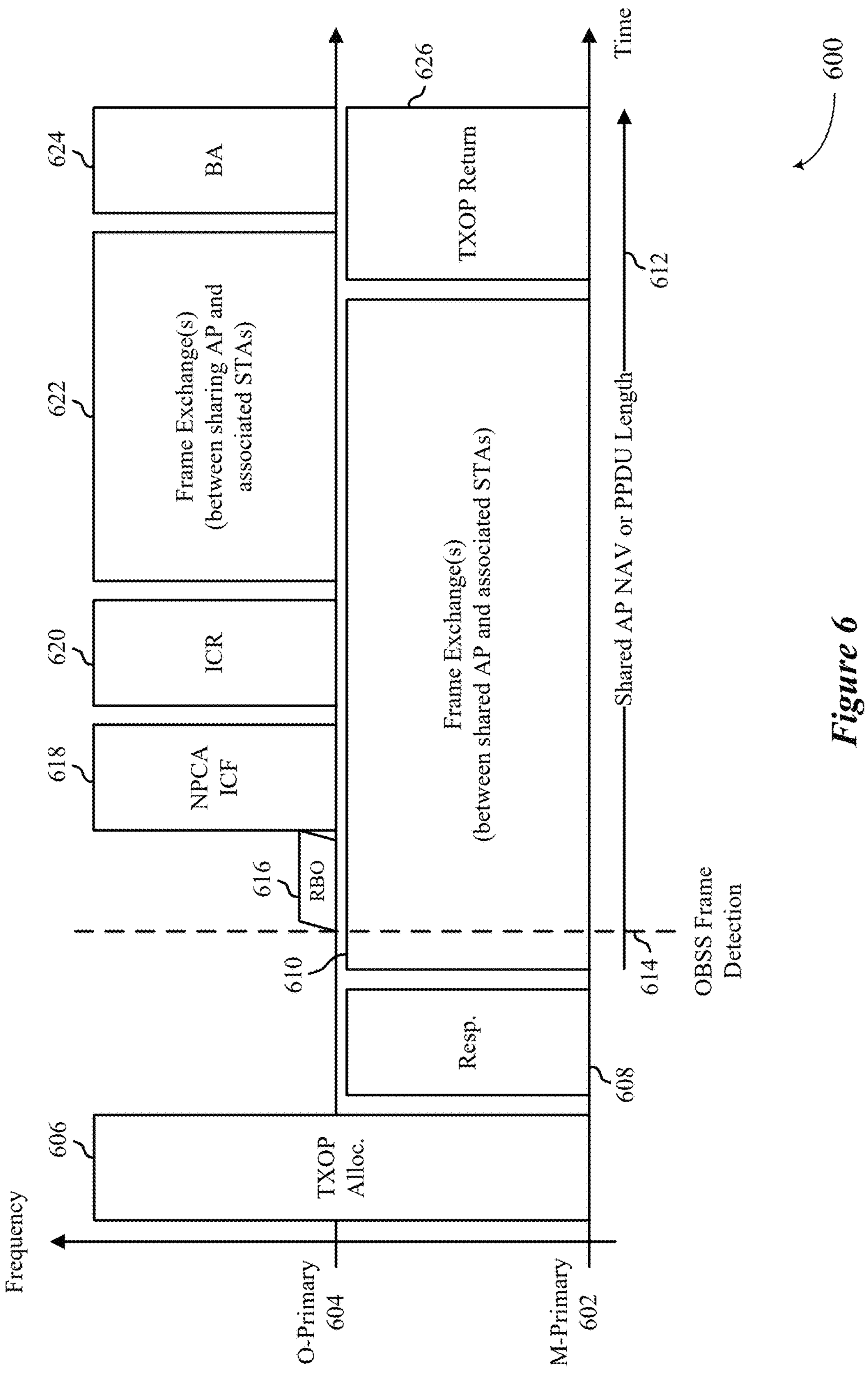

FIG. 6 shows an example communication timeline 600 that illustrates various protocols or mechanisms according to which a sharing AP may communicate with one or more associated STAs within a shared TXOP duration to support C-TDMA in Wi-Fi networks for partial bandwidth TXOP sharing. The communication timeline 600 may illustrate communication involving (such as to or from) the AP 102-*a*, the AP 102-*b*, one or more STAs 104 associated with the AP 102-*a*, and one or more STAs associated with the AP 102-*b*. For example, the communication timeline 600 may illustrate how the AP 102-*a* allocates (such as shares) a portion of the TXOP to the AP 102-*b* for communication between the AP 102-*b* and one or more STAs 104 associated with the AP 102-*b* and how the AP 102-*a* also uses the obtained TXOP for communication with one or more STAs 104 associated with the AP 102-*a*.

In some aspects, the communication timeline 600 illustrates a baseline NPCA procedure that the AP 102-*a*, or one or more STAs 104 associated with the AP 102-*a*, may employ in association with measuring that a primary channel (such as an M-Primary channel 602) is busy. For example, the AP 102-*a* and the one or more STAs 104 associated with the AP 102-*a* may support communication via an M-Primary channel 602 and an O-Primary channel 604. In some examples, the AP 102-*a* may support NPCA in addition to (such as in conjunction with) C-TDMA. For example, the AP 102-*a* may transmit a schedule announcement frame and may perform one or more frame exchanges with one or more in-BSS STAs 104 in addition to the frame exchanges illustrated by the communication timeline 600, such as prior to the frame exchanges illustrated by the communication timeline 600.

In some implementations, the AP 102-*a* may obtain a TXOP associated with a bandwidth and may allocate a portion of the TXOP to the AP 102-*b*. For example, the AP 102-*a* may transmit a TXOP allocation frame 606 that includes information indicative of an allocation of a first duration of the TXOP to the AP 102-*b*. The AP 102-*b* may transmit a response frame 608 in association with receiving the TXOP allocation frame 606. In some scenarios, the AP 102-*b* may use a portion of the bandwidth associated with the TXOP (in accordance with one or more of various example reasons as disclosed herein, among others).

In such scenarios, the AP 102-*b* may transmit the response frame 608 and may perform one or more frame exchanges 610 via the portion of the bandwidth associated with the TXOP. In some aspects, the frame exchanges 610 may set a shared AP NAV or may be associated with a PPDU length of a duration 612. In such aspects, the portion of the bandwidth used by the AP 102-*b* may be protected for at least the duration 612. Such frame exchanges 610 may include one or more frame transmissions or one or more frame receptions, or any combination thereof, between the AP 102-*b* and one or more STAs 104 associated with the AP 102-*b*.

In accordance with the frame exchanges 610 via the portion of the bandwidth associated with the TXOP, the AP 102-*a* (and, in some examples, one or more STAs 104 associated with the AP 102-*a*) may switch from the M-Primary channel 602 to the O-Primary channel 604. In other words, in accordance with an NCPA procedure, if the AP 102-*b* transmits one or more frames via the M-Primary channel 602, the AP 102-*a* and its associated STAs 104 may identify the transmission(s) by the AP 102-*b* as OBSS transmissions (as, for example, an OBSS frame detection 614) and switch to the O-Primary channel 604 to increase a utilization of a remainder of the bandwidth associated with the TXOP. In some aspects, a TXOP on the O-Primary channel 604 may occur until an end of the OBSS TXOP duration (such as until an end of the shared TXOP duration). In some aspects, the shared TXOP duration may be acquired by the AP 102-*a* and one or more STAs 104 associated with the AP 102-*a* in accordance with a NAV or a PPDU length indicated by the AP 102-*b* (such as via a frame of the frame exchanges 610).

In some examples, the AP 102-*a* may perform a channel access procedure 616 to obtain access to the O-Primary channel 604. Such a channel access procedure 616 may be an EDCA procedure such that the AP 102-*a* may obtain access to the O-Primary channel 604 in accordance with a random backoff (RBO) counter reaching a zero value. Additionally, or alternatively, one or more STAs 104 associated with the AP 102-*a* may perform a channel access procedure 616 to contend for access to the O-Primary channel 604. In some other examples, the AP 102-*a* may refrain from performing the channel access procedure 616 (or, in other words, may refrain from performing an RBO) if the duration until a start of an NPCA initial control frame (ICF) 618 is protected by the NAV set by the TXOP allocation frame 606 (as the AP 102-*a* owns the TXOP across the entire bandwidth).

In either examples, the AP 102-*a* may transmit the NPCA ICF 618 via the O-Primary channel 604. One or more STAs 104 associated with the AP 102-*a* may transmit, via the O-Primary channel 604, an initial control response (ICR) 620 in association with receiving the NPCA ICF 618. The AP 102-*a* and the one or more STAs 104 associated with the AP 102-*a* may perform one or more frame exchanges 622. Such frame exchanges 622 may include one or more frame transmissions or one or more frame receptions, or any combination thereof, between the AP 102-*a* and the one or more STAs 104 associated with the AP 102-*a*. The communication between the AP 102-*a* and the one or more STAs 104 associated with the AP 102-*a* may include a block acknowledgment (BA) frame 624 associated with data communicated via the one or more frame exchanges 622.

In some examples, the AP 102-*b* may transmit a TXOP return frame 626 in association with completing the one or more frame exchanges 610. The TXOP return frame 626 may return a portion of the shared TXOP duration to the AP 102-*a* (if any remains). In some examples, the AP 102-*a* and the one or more STAs 104 associated with the AP 102-*a* may end a TXOP on the O-Primary channel 604 no later than (such as at or prior to) a time instance or boundary at which the shared TXOP duration ends.

In accordance with such a baseline NPCA procedure, there may be a relatively large gap (in time) between an end of the PPDU carrying the TXOP allocation frame 606 and a start of the NCPA ICF 618. In some aspects, such a time gap may be associated with a value of [(2×SIFS)+Response_Time+OBSS_PPDU_detection_time+RBO_Time] and could be greater than approximately 100 microseconds. Such a time gap may lead to inefficiency in the utilization of the O-Primary channel 604 as, for example, the O-Primary channel 604 may be unused for the time gap. Additionally, or alternatively, one or more other wireless communication devices may "jump in" and take a portion of the bandwidth associated with the O-Primary channel 604 within the time gap. In such scenarios, the "taken" portion of the bandwidth may not be retrievable by the AP 102-*a* when the AP 102-*b* returns the TXOP to the AP 102-*a* (as the "overtaking" wireless communication devices may have ongoing transmissions via that portion of the bandwidth). Such a possibility of other wireless communication devices "jumping in" and taking the portion of the bandwidth may worsen if the AP 102-*a* shares the TXOP with multiple APs 102, as each shared AP 102 may generally receive a smaller bandwidth and further reduce the bandwidth over time. Additionally, or alternatively, one or more STAs 104 associated with the AP 102-*a* (such as an NPCA non-AP STA 104) may not hear the frame exchanges 610 (such as a transmission from a BSS associated with the AP 102-*b*). In such scenarios, the one or more STAs 104 associated with the AP 102-*a* may not switch to the O-Primary channel 604 and, therefore, may not respond to the NPCA ICF 618, which also may contribute to a wasted opportunity on the O-Primary channel 604.

Accordingly, in some implementations, the AP 102-*a*, the AP 102-*b*, and one more associated STAs 104 may support one or more protocols or mechanisms according to which the AP 102-*a* may provide (and according to which one or more other communication devices may interpret and act on) information indicative of a location or presence, or both, of communication between the AP 102-*a* and one or more STAs 104 associated with the AP 102-*a* in association with information indicative of an allocation of a first duration of the TXOP to the AP 102-*b*. For example, the AP 102-*a* may transmit a PPDU that includes or indicates first information indicative of an allocation of the first duration of the TXOP to the AP 102-*b* and second information indicative of a location/presence of in-BSS communication associated with the AP 102-*a* within at least the first duration of the TXOP. Additionally, or alternatively, the AP 102-*a* and the AP 102-*b* may participate in a frame exchange (such as a transmission or reception of one or more frames) according to which the AP 102-*a* may receive or derive information indicative of a (likely) bandwidth usage at the AP 102-*b* within the first duration of the TXOP shared with the AP 102-*b*. Additionally, or alternatively, a STA 104 associated with the AP 102-*a* may support one or more field, subfield, element, or frame interpretation rules according to which the STA 104 may parse and act on one or both of the first information or the second information. The STA 104 may select or implement such one or more interpretation rules in accordance with signaling from the AP 102-*a* or in accordance with a network specification, among other examples.

Figure 7:
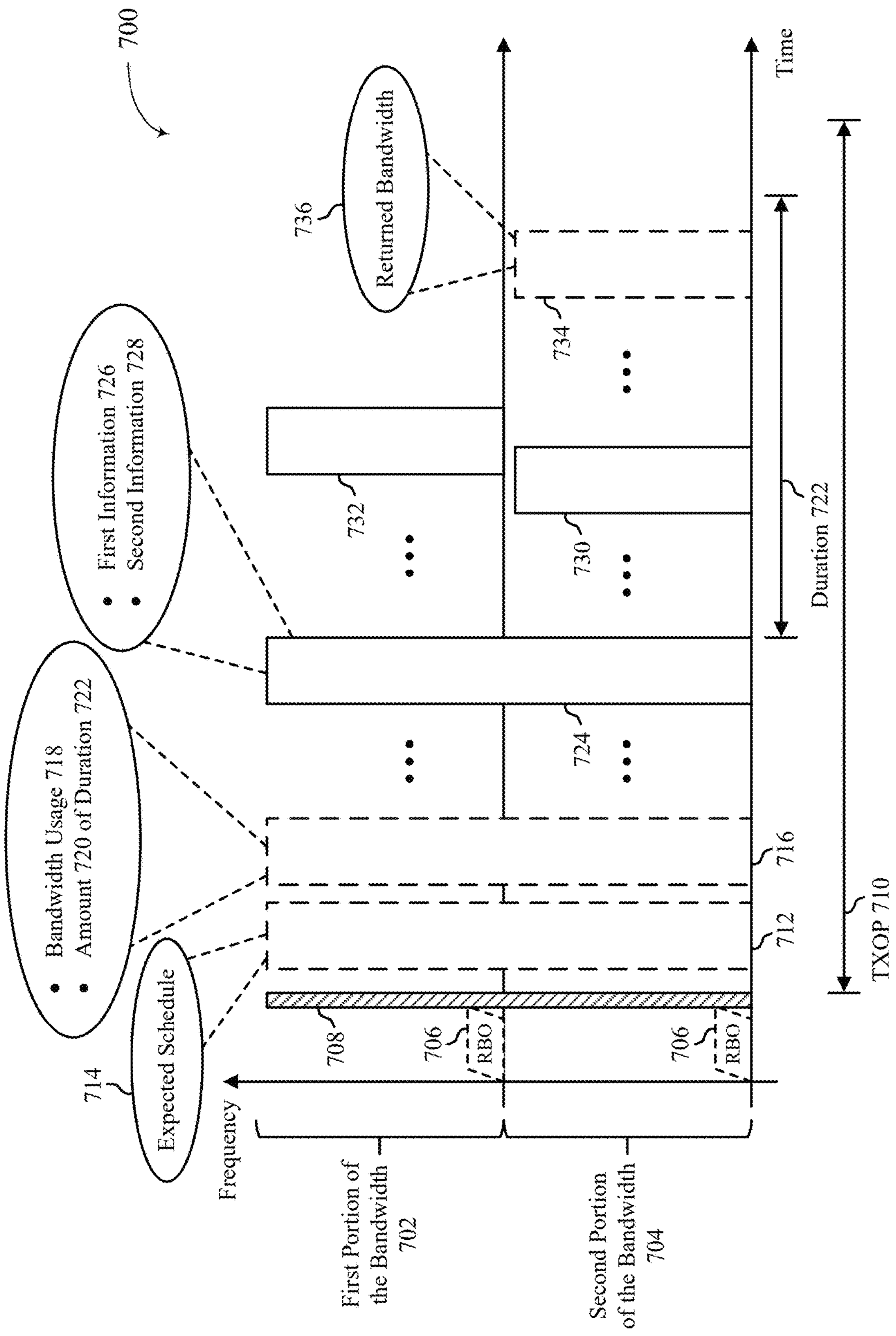

FIG. 7 shows an example communication timeline 700 that illustrates various protocols or mechanisms according to which a sharing AP may communicate with one or more associated STAs within a shared TXOP duration to support C-TDMA in Wi-Fi networks for partial bandwidth TXOP sharing. The communication timeline 700 may illustrate communication involving (such as to or from) the AP 102-*a*, the AP 102-*b*, one or more STAs 104 associated with the AP 102-*a*, and one or more STAs associated with the AP 102-*b*. For example, the communication timeline 700 may illustrate how the AP 102-*a* allocates (such as shares) a portion of the TXOP to the AP 102-*b* for communication between the AP 102-*b* and one or more STAs 104 associated with the AP 102-*b* and how the AP 102-*a* also uses the obtained TXOP for communication with one or more STAs 104 associated with the AP 102-*a*.

Further, although described in the context of an example in which the AP 102-*a* shares a TXOP with another AP 102, the disclosed techniques may be equivalently implemented in scenarios in which the AP 102-*a* shares the TXOP with a STA 104 associated with the AP 102-*a*. For example, the AP 102-*a* may share a duration of a TXOP with a STA 104 associated with the AP 102-*a* for P2P communication and may communicate with one or more other STAs 104 associated with the AP 102-*a* via a portion of a TXOP bandwidth within the shared TXOP duration. In such examples in which the AP 102-*a* shares a portion of the TXOP with its associated STA 104 for P2P operations, there may be an absence of a "Schedule Announcement frame" and instead the medium access coordination may be associated with a "TXOP Allocation frame," which may be referred to as an MU-RTS TXS frame such examples of TXOP sharing for P2P operations. Thus, some example implementations of the present disclosure are also applicable if partial BW sharing occurs via TXS for a P2P application.

In some implementations, the AP 102-*a* may support communication via a bandwidth (such as an operational or BSS bandwidth) that includes a first portion 702 of the bandwidth and a second portion 704 of the bandwidth. The AP 102-*a* may perform one or more channel access procedures 706 via one or more channels (such as via one or more primary channels) and, in association with performing the one or more channel access procedures 706, may obtain a TXOP 710 at 708. The TXOP 710 may be associated with the bandwidth of the AP 102-*a* including the first portion 702 and the second portion 704.

In some examples, the AP 102-*a* and the AP 102-*b* may support C-TDMA and may coordinate on a usage associated with the TXOP 710 obtained by the AP 102-*a*. In some implementations, the AP 102-*a* may transmit a frame 712 that includes information indicative of an expected schedule 714 associated with the TXOP 710. In some examples, the expected schedule 714 may indicate that the AP 102-*a* plans or expects to share a portion of the TXOP 710 with the AP 102-*b*. For example, the expected schedule 714 may indicate that the AP 102-*a* plans or expects to allocate a first duration 722 of the TXOP 710 to the AP 102-*b*. For example, the AP 102-*a* may indicate an upper limit allocation duration (such as the first duration 722) in an allocation duration field of the frame 712 (such that the AP 102-*b*, when allocated with the first duration 722 via a TXOP allocation frame, the AP 102-*b* may utilize an entirety of the first duration 722 or return of a portion of the first duration 722 to the AP 102-*a*). In some examples, the frame 712 may be a schedule announcement frame (such as a schedule announcement frame in the TXOP 710, such as the same TXOP as a TXOP allocation frame), a negotiation frame (such as an initial management frame exchanged between the AP 102-*a* and the AP 102-*b* during an initial negotiation for C-TDMA), or any other management or data frame, among other examples.

In some implementations, to avoid missing a potential TXOP return frame from the AP 102-*b* (which may occur if the AP 102-*b* transmits a TXOP return frame via the second portion 704 of the bandwidth while the AP 102-*a* is performing a frame exchange via the first portion 702 of the bandwidth or while the AP 102-*a* is otherwise blind to the second portion 704 of the bandwidth, which may be the case until the first duration 722 indicated by an allocation duration field elapses), the AP 102-*a* and the AP 102-*b* may support a signaling protocol or mechanism according to which the AP 102-*b* may provide information to the AP 102-*a* indicative of an amount 720 of the first duration 722 that the AP 102-*b* will (likely) use. For example, the AP 102-*b* may transmit a frame 716 including information indicative of an amount 720 of the first duration 722 that the AP 102-*b* will (likely) use if the AP 102-*b* receives an allocation of the first duration 722. In addition to, or as an alternative to, checking (such as determining) the amount 720 of the first duration 722 that the AP 102-*b* will (likely) use, the AP 102-*b* may account for a bandwidth usage 718 that the AP 102-*b* plans (such as expects) to use within the shared TXOP duration. Such a bandwidth usage 718 may be associated with an amount of data buffered at the AP 102-*b*, a bandwidth of a client device with which the AP 102-*b* expects to communicate, or a bandwidth of the AP 102-*b*, among other examples. The AP 102-*b* may include or otherwise provide an indication of the amount 720 of the first duration 722 that the AP 102-*b* expects to use or an indication of the bandwidth usage 718 that the AP 102-*b* expects, or both, within or via the frame 716. Such indication(s) may be implicit or explicit. The frame 716 may be a response frame associated with a schedule announcement frame, a negotiation frame, or a management frame, among other examples.

The AP 102-*b* may provide the indication of the amount 720 via one or more of various signaling mechanisms. In some implementations, the AP 102-*b* may transmit the indication of the amount 720 via a binary indication, such as a 1-bit indication. In such implementations, the 1-bit indication may indicate whether the AP 102-*b* expects to use an entirety of the first duration 722 or a subset of the first duration 722. In other words, a first value of the 1-bit indication may indicate that the AP 102-*b* expects to use the entirety of the first duration 722 and a second value of the 1-bit indication may indicate that the AP 102-*b* expects to use a subset of the first duration 722. Additionally, or alternatively, the AP 102-*b* may transmit the indication of the amount 720 via a multi-bit indication. Such a multi-bit indication may indicate a relatively more granular duration of the amount 720 that the AP 102-*b* expects to use. For example, the multi-bit indication may indicate a time value, such as a duration, that corresponds to the amount 720. In some aspects, the AP 102-*b* may use the multi-bit indication to provide an approximate duration of the shared TXOP duration (the first duration 722) that the AP 102-*b* expects to use to serve its associated STAs 104.

The AP 102-*b* may perform one or more actions in accordance with receiving the indication of the amount 720 of the first duration 722 that the AP 102-*b* expects to use. For example, if the AP 102-*b* provides the indication of the amount 720 as a duration value (such as via a multi-bit indication), the AP 102-*a* may adjust a duration of the shared TXOP such that there is zero or a relatively smaller amount of excess time allocated to the AP 102-*b* (and, likewise, such that there is zero or a relatively smaller amount of a blindness period at the AP 102-*a* within which the AP 102-*b* may transmit a TXOP return frame). In such implementations, the AP 102-*b* may schedule communication with one or more in-BSS STAs 104 via the first portion 702 of the bandwidth within at least the shared TXOP duration (which may be shortened in accordance with the indication of the amount 720) as the AP 102-*a* may have a (relative) guarantee that there is not likely to be a TXOP return during the shared TXOP duration.

For further example, if the AP 102-*b* provides an indication of the amount 720 as a 1-bit indication, the AP 102-*a* may determine whether or not to schedule communication with one or more in-BSS STAs 104 via the first portion 702 of the bandwidth within at least the shared TXOP duration (the first duration 722). For example, the AP 102-*a* may determine to communicate with one or more in-BSS STAs 104 via the first portion 702 of the bandwidth within at least the shared TXOP duration if the AP 102-*b* indicates that the AP 102-*b* plans to use an entirety of the first duration 722 (such as if the AP 102-*b* indicates that the amount 720 is equal to an entirety of the first duration 722, or such as if the AP 102-*b* indicates that the AP 102-*b* does not plan on returning the shared TXOP duration). Additionally, or alternatively, the AP 102-*a* may determine to refrain from communicating with one or more in-BSS STAs 104 via the first portion 702 of the bandwidth within at least the shared TXOP duration if the AP 102-*b* indicates that the AP 102-*b* plans to use less than an entirety of the first duration 722 (such as if the AP 102-*b* indicates that the amount 720 is less than an entirety of the first duration 722, or such as if the AP 102-*b* indicates that the AP 102-*b* plans on returning the shared TXOP duration). In such implementations, the AP 102-*a*, and on or more associated STAs 104, may fall back to a baseline NPCA procedure, such as the baseline NPCA procedure illustrated by and described with reference to FIG. 6.

In some implementations, the AP 102-*a* may obtain information indicative of the bandwidth usage 718 at the AP 102-*b*. The AP 102-*a* may obtain the information indicative of the bandwidth usage 718 at the AP 102-*b* in one or more of various ways, including via the frame 716 or via a different frame. In some implementations, the AP 102-*a* and the AP 102-*b* may support one or more signaling protocols or mechanisms according to which the AP 102-*a* may obtain the information indicative of the bandwidth usage 718 at the AP 102-*b* prior to transmitting a TXOP allocation frame (such as prior to sharing the first duration 722 with the AP 102-*b*). The AP 102-*a* may receive the information indicative of the bandwidth usage 718 at the AP 102-*b* explicitly or implicitly via a response associated with a schedule announcement frame, a negotiation frame, or a management frame. Example management frames include may include a broadcast frame, a beacon frame, a probe response frame, or an individually addressed management frame, among other examples. The AP 102-*a* may receive the information indicative of the bandwidth usage 718 from the AP 102-*b* or from another network node (such as a central controller) and may receive the information dynamically, semi-persistently, periodically, semi-statically, or once.

In some examples, the AP 102-*a* may receive dynamic bandwidth feedback from the AP 102-*b*. For example, in response to a schedule announcement frame, the AP 102-*b* may indicate whether the AP 102-*b* expects to use (such as will use) an entire bandwidth associated with the TXOP or a portion (such as the second portion 704) of the bandwidth associated with the TXOP. The AP 102-*b* may use less than an entirety of the bandwidth associated with the TXOP in accordance with an amount of data at the AP 102-*b* or in accordance with a portion of the bandwidth being unavailable at the AP 102-*b* (due to a lack of a wideband STA 104 in a BSS of the AP 102-*b* or a coexistence consideration of one or more associated STAs 104, among other examples).

In some aspects, the AP 102-*b* may provide an explicit indication of the bandwidth usage 718 via a binary indication, such as a 1-bit indication. In such aspects, a first value of the 1-bit indication may indicate that the AP 102-*b* expects to use an entirety of the bandwidth associated with the TXOP and a second value of the 1-bit indication may indicate that the AP 102-*b* expects to use a portion of the bandwidth associated with the TXOP. Additionally, or alternatively, the AP 102-*b* may provide an explicit indication of the bandwidth usage 718 via a relatively more granular indication, such as a multi-bit indication. In such aspects, a first value of the multi-bit indication may indicate that a first portion of the bandwidth will be used (such as a primary 40 MHz, or P40, portion), a second value of the multi-bit indication may indicate that a second portion of the bandwidth will be used (such as a primary 80 MHz, or P80, portion), a third value of the multi-bit indication may indicate that a third portion of the bandwidth will be used (such as a primary 160 MHz, or P160, portion), and so on. Additionally, or alternatively, the AP 102-*b* may provide an implicit indication of the bandwidth usage 718. For example, the AP 102-*b* may convey the indication of the bandwidth usage 718 via an occupied bandwidth associated with a frame transmitted by the AP 102-*b*. Such a frame may include a response frame to a schedule announcement frame, a negotiation frame, or a management frame. For example, the AP 102-*b* may transmit the frame 716 via the second portion 704 of the bandwidth to indicate that the bandwidth usage 718 at the AP 102-*b* corresponds to the second portion 704 of the bandwidth.

Additionally, or alternatively, the AP 102-*a* may receive semi-static or "long-term" bandwidth feedback from the AP 102-*b*. For example, the AP 102-*b* may indicate, to the AP 102-*a*, how much bandwidth (such as the bandwidth usage 718) that the AP 102-*b* expects to use on a semi-static basis. Such a semi-static indication of the bandwidth usage 718 may be associated with a per-coordination instance basis. A coordination instance may correspond to a time epoch or duration within which capabilities are negotiated or a time epoch or duration within which capabilities are updated (such as in accordance with a parameter or capability update mechanism). In other words, the AP 102-*b* may transit an indication of the bandwidth usage 718 to the AP 102-*a* when the AP 102-*a* and the AP 102-*b* initially agree to participate in coordinated communication (such as C-TDMA) or (periodically) later on via an update mechanism.

In some implementations, the AP 102-*a* may transmit a PPDU 724 including first information 726 and second information 728. The AP 102-*a* may generate and transmit one or both of the first information 726 and the second information 728 in a standalone manner or in accordance with other information received, obtained, or otherwise derived by the AP 102-*a*. For example, in some implementations, the AP 102-*a* may generate and transmit one or both of the first information 726 or the second information 728 in accordance with one or both of the bandwidth usage 718 or the amount 720 of the first duration 722 indicated by the AP 102-*b* (if indicated). In some examples, the first information 726 may include an indication of an allocation of the first duration 722 (or a shortened version of the first duration 722) to the AP 102-*b* and the second information 728 may include an indication of a presence or an absence of communication (such as a transmission, a reception, or a frame exchange) associated with a BSS of the AP 102-*a* via the first portion 702 within at least the first duration 722. In accordance with some example implementations, the AP 102-*a* may transmit the second information 728 in association with transmitting the first information 726.

The PPDU 724 may include one or more frames. In some examples, the PPDU 724 may include a single frame and the single frame may include both the first information 726 and the second information 728 (such as via one or more subfields, fields, or elements of the single frame). Additionally, or alternatively, the PPDU 724 may include multiple frames and a first frame may include the first information 726 and a second frame may include the second information 728. In such examples, an A-MPDU of the PPDU 724 may include the multiple frames (including the first frame and the second frame). In some aspects, the PPDU 724 may include at least a TXOP allocation frame.

In some implementations, the second information 728 may include an indication of whether there is an impending or potential communication associated with a BSS of the AP 102-*a* via the first portion 702 of the bandwidth. For example, if the AP 102-*a* determines, measures, or receives an indication of the bandwidth usage 718 at the AP 102-*b* is less than the full bandwidth associated with the TXOP (prior to transmitting the PPDU 724), the AP 102-*a* may include an indication, within the second information 728, of an impending communication associated with the BSS of the AP 102-*a* via the first portion 702 of the bandwidth. If the AP 102-*a* is not aware of the bandwidth usage 718 at the AP 102-*b* (prior to transmitting the PPDU 724), the AP 102-*a* may include an indication, within the second information 728, of a potential communication associated with the BSS of the AP 102-*a* via the first portion 702 of the bandwidth.

To carry such an indication of an impending/potential communication associated with the BSS of the AP 102-*a* via the first portion 702 of the bandwidth, the AP 102-*a* may transmit the indication of the communication as or via a 1-bit indication or a multi-bit indication. In some examples, the AP 102-*a* may use 1 or 2 (reserved) bits within a TXOP allocation frame (such as in a PHY header, a MAC header, or a data portion) to convey the 1-bit indication or the multi-bit indication. In implementations in which the AP 102-*a* transmits the indication of the communication as or via a 1-bit indication, a first value (such as "0" value) may indicate an absence of the communication associated with the BSS of the AP 102-*a* via the first portion 702 of the bandwidth and a second value (such as a "1" value) may indicate that the communication associated with the BSS of the AP 102-*a* via the first portion 702 of the bandwidth is impending or possible. Additionally, or alternatively, in which the AP 102-*a* transmits the indication of the communication as or via a multi-bit indication, a first value (such as a "00" value) may indicate an absence of the communication associated with the BSS of the AP 102-*a* via the first portion 702 of the bandwidth, a second value (such as a "01" value) may indicate that the communication associated with the BSS of the AP 102-*a* via the first portion 702 of the bandwidth is impending, and a third value (such as a "10" value) may indicate that the communication associated with the BSS of the AP 102-*a* via the first portion 702 of the bandwidth is possible.

A STA 104 (such as a DSO or NPCA non-AP STA) associated with AP 102-*a* may, in accordance with receiving the second information 728, selectively switch to the first portion 702 of the bandwidth for the communication. For example, if the second information 728 indicates an absence of the communication, the STA 104 may refrain from switching to the amount 720 of the bandwidth. For further example, if the second information 728 indicates that the communication is impending (such as guaranteed or guaranteed with at least a threshold probability) or possible (such as not guaranteed or guaranteed with less than a threshold probability), the STA 104 may determine whether to switch to the first portion 702 of the bandwidth. For example, the STA 104 may determine not to switch to the first portion 702 of the bandwidth (and, instead, remain on the second portion 704 of the bandwidth) if the communication via the first portion 702 of the bandwidth is possible (such as not guaranteed). In other words, the STA 104 may determine to switch to the first portion 702 of the bandwidth exclusively in accordance with the communication via the first portion 702 being impending. Alternatively, the STA 104 may determine to switch to the first portion 702 of the bandwidth in accordance with the communication via the first portion 702 being impending or possible.

Additionally, or alternatively, the second information 728 may include an indication of a presence of the communication (such as a transmission, a reception, or a frame exchange) associated with the BSS of the AP 102-*a* via the first portion 702 of the bandwidth as an indication of whether one or more STAs 104 associated with the AP 102-*a* are to switch from the second portion 704 of the bandwidth to the first portion 702 of the bandwidth. In such implementations, the second information 728 may trigger a switch of one or more STAs 104 associated with the AP 102-*a* to the first portion 702 of the bandwidth.

In some implementations, the TXOP associated with the first portion 702 of the bandwidth may be limited to AP-initiated communication (such as either downlink communication or trigger-based (TB) uplink communication). In other words, one or more STAs 104 associated with the AP 102-*a* may switch to the first portion 702 of the bandwidth but may not (in accordance with a signaled or otherwise specified rule) perform, for example, EDCA-based contention. In some implementations, the AP 102-*a* may indicate whether uplink EDCA-based contention is allowed or not, such as via the PPDU 724 (such as via a TXOP allocation frame). In accordance with such implementations, the AP 102-*a* may increase the likelihood of efficient resource utilization and low latency channel access because the AP 102-*a* may have greater knowledge of the bandwidth usage 718 at the AP 102-*b*.

For example, if the AP 102-*a* receives information indicative of the bandwidth usage 718 at the AP 102-*b* via a response frame associated with a TXOP allocation frame (such that the bandwidth usage 718 at the AP 102-*b* may be unknown to the AP 102-*a* prior to transmitting the TXOP allocation frame), STAs 104 associated with the 102-*a* may be unaware of the bandwidth usage 718 at the AP 102-*b* (and, accordingly, the first portion 702 that is available). For example, the STAs 104 associated with the 102-*a* may be hidden to the AP 102-*b*). Thus, the AP 102-*a* may more efficiently determine whether to initiate a TXOP for communication with in-BSS STAs associated with the first portion 702 of the bandwidth in accordance with the indicated bandwidth usage 718.

In some implementations, a STA 104 associated with the AP 102-*a* may support one or more interpretation rules associated with a parsing of the PPDU 724, such as associated with a parsing of one or both of the first information 726 and the second information 728. For example, a TXOP allocation frame carried by the PPDU 724 may be an MU-RTS Trigger frame with a Triggered TXOP Sharing Mode subfield set to a non-zero value (such as a value of 2 or 3) and, because this subfield may be present within a Common Info field of the MU-RTS Trigger frame, a STA 104 may employ an interpretation rule to avoid misinterpreting the TXOP allocation frame as a TXS frame for P2P operation or to avoid ignoring the frame altogether.

Accordingly, in some implementations, the PPDU 724 (such as the TXOP allocation frame) may carry (such as include or otherwise convey) an indication to prompt the STA 104 to ignore the Triggered TXOP Sharing Mode subfield. The indication may be explicit or implicit. In examples in which the indication is explicit, the PPDU 724 (such as the TXOP allocation frame) may include a field or a subfield (such as one or more bits or a single bit) in a User Info field to indicate that the STA 104 to which that User Info field is addressed is expected to ignore the Triggered TXOP Sharing Mode subfield and treat (such as interpret or parse) the frame as an MU-RTS Trigger frame instead. In implementations in which the indication is implicit, the STA 104 may employ an interpretation rule in accordance with the Triggered TXOP Sharing Mode subfield being set to a non-zero value. The interpretation rule may define or specify that the STA 104 is to treat (such as interpret or parse) the frame as a TXS frame if the RU allocation subfield indicates an RU within the second portion 704 of the bandwidth (such as within a primary channel). The interpretation rule may define or specify that the STA 104 is to treat (such as interpret or parse) the frame as an MU-RTS Trigger frame otherwise, such as if the RU allocation subfield indicates an RU outside of the second portion 704 of the bandwidth (such as outside of the primary subchannel or within the first portion 702 of the bandwidth).

In either implementations of an explicit indication or an implicit indication, the addressed STA 104 may respond with a CTS frame via the first portion 702 of the bandwidth (such as a secondary subchannel) indicated by the RU allocation field. Further, if the STA 104 supports DSO, the RU(s) allocated to the STA 104 may be inside or outside an operating bandwidth of the STA 104. If the allocated RU(s) are outside of the operating bandwidth of the STA 104, the STA 104 may switch to a DSO sub-band that includes the allocated RU(s) and respond with a CTS frame via the allocated RU(s). If the STA 104 does not support DSO, the AP 102-*a* may generate an RU allocation for the STA 104 such that the allocated RU(s) are within an operating bandwidth of the STA 104.

In accordance with one or both of the first information 726 or the second information 728, the AP 102-*b* may transmit or receive a frame 730 via the second portion 704 of the bandwidth within the first duration 722 of the TXOP 710 and the AP 102-*a* may selectively (such as conditionally) transmit or receive a frame 732 via the first portion 702 of the bandwidth within at least the first duration 722 of the TXOP 710. The AP 102-*a* may selectively transmit the frame 732 via the first portion 702 of the bandwidth within at least the first duration 722 of the TXOP 710 in accordance with determining whether the bandwidth usage 718 at the AP 102-*b* is less than or equal to an entirety of the bandwidth associated with the TXOP 710, among other examples disclosed herein. In some implementations, the AP 102-*a* may communicate with one or more in-BSS STAs 104 via the first portion 702 of the bandwidth for a duration longer than the first duration 722.

In some implementations, the AP 102-*b* may transmit a frame 734 (such as TXOP return frame) that returns at least a subset of the first duration 722 to the AP 102-*a*. The AP 102-*b* may transmit the frame 734 in association with completing at least a portion of a data transfer between the AP 102-*b* and one or more STAs 104 associated with the AP 102-*b*. In some examples, the AP 102-*b* may perform a first frame exchange with a first set of one or more in-BSS STAs 104 and may subsequently perform a second frame exchange with a second set of one or more in-BSS STAs 104. In some of such examples, the AP 102-*b* may use a relatively smaller bandwidth for the second frame exchange as compared to a bandwidth that the AP 102-*b* uses for the first frame exchange (such as, for example, if the second set of in-BSS STA(s) 104 have a relatively smaller operating bandwidth as compared to the first set of in-BSS STA(s) 104). For example, a 320 MHz sharing AP may share 160 MHz with a shared AP and, during the shared TXOP, the shared AP may reduce the bandwidth further to 80 MHz. In some networks, once a bandwidth is reduced, a shared AP may not be able to subsequently expand its bandwidth. In such examples, the AP 102-*a* may be unaware of how much bandwidth the AP 102-*b* uses after the initial sharing (such as after the transmission of the PPDU 724).

In some implementations, the AP 102-*a* and the AP 102-*b* may support one or more signaling protocols or mechanisms according to which the AP 102-*b* may progressively or iteratively transmit indications to the AP 102-*a* to indicate a return, to the AP 102-*a*, of one or more portions of the bandwidth originally used by the AP 102-*b*. For example, the AP 102-*b* may transmit a frame 734 in accordance with completing the first frame exchange and prior to reducing an operating bandwidth for the second frame exchange and the frame 734 may indicate how much bandwidth the AP 102-*b* is returning to the AP 102-*a*. The AP 102-*b* may provide such an indication of a returned bandwidth 736 via an explicit indication or an implicit indication. In some implementations, for example, the AP 102-*b* may transmit an indication of the returned bandwidth 736 via an explicit indication by including, within the frame 734, a field or subfield that indicates a value of the returned bandwidth 736. In such implementations, a first value of the field/subfield may indicate that an entirety of the bandwidth used by the AP 102-*b* is returned (such as an entirety of the second portion 704 of the bandwidth associated with the TXOP 710), a second value of the field/subfield may indicate that 20 MHz is returned (such as an upper or lower 20 MHz of the bandwidth used by the AP 102-*b*), a third value of the field/subfield may indicate that 40 MHz is returned (such as an upper or lower 40 MHz of the bandwidth used by the AP 102-*b*), and so on.

Additionally, or alternatively, the AP 102-*b* may transmit an indication of the returned bandwidth 736 via an implicit indication by transmitting the frame 734 via a specific bandwidth and the AP 102-*a* may infer the returned bandwidth 736 in accordance with the bandwidth occupied by the frame 734. For example, the AP 102-*a* may determine the returned bandwidth 736 by subtracting the bandwidth occupied by the frame 734 from the bandwidth usage 718 or the second portion 704 (or, generally, the bandwidth that the AP 102-*a* knows or expects the AP 102-*b* to have been using previous to the frame 734). In accordance with the implicit or explication indication of the returned bandwidth 736, the AP 102-*a* may extend a TXOP into the returned bandwidth 736. The continuation of the TXOP of the AP 102-*a* into the returned bandwidth 736 may be for sharing the returned bandwidth 736 with one or more other wireless communication devices (such as one or more other APs 102) or for serving one or more STAs 104 associated with the AP 102-*a*. Additionally, or alternatively, the AP 102-*a* may perform a point coordination function (PCF) IFS (PIFS) energy detection check on one or more remaining subchannels within the second portion 704 of the bandwidth and may extend (such as expand) a TXOP of the AP 102-*a* into one or more subchannels if the energy detection check indicates that the one or more subchannels are idle.

Figure 8:
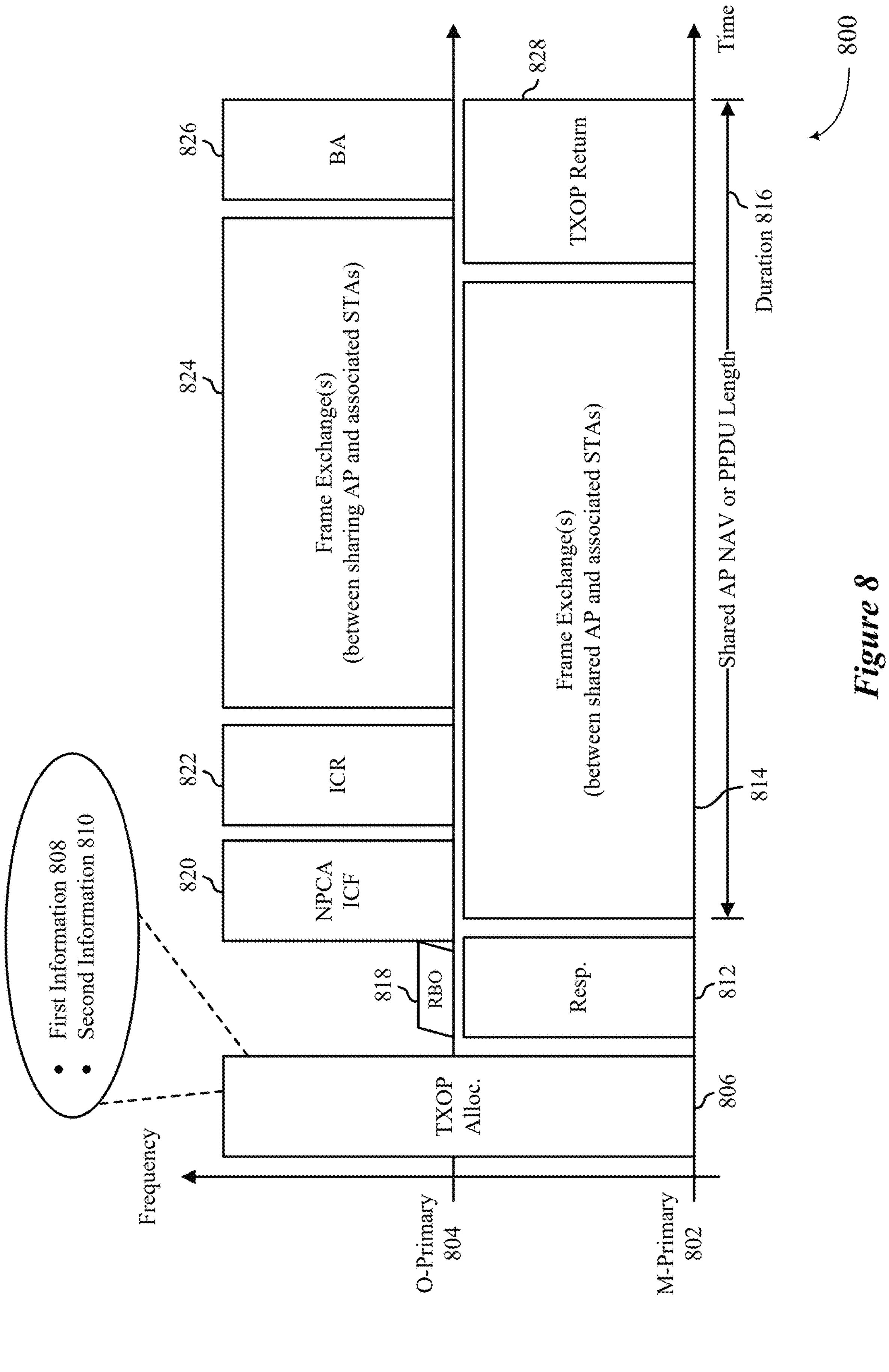

FIG. 8 shows an example communication timeline 800 that illustrates various protocols or mechanisms according to which a sharing AP may communicate with one or more associated STAs within a shared TXOP duration to support C-TDMA in Wi-Fi networks for partial bandwidth TXOP sharing. The communication timeline 800 may illustrate communication involving (such as to or from) the AP 102-*a*, the AP 102-*b*, one or more STAs 104 associated with the AP 102-*a*, and one or more STAs associated with the AP 102-*b*. For example, the communication timeline 800 may illustrate how the AP 102-*a* allocates (such as shares) a portion of the TXOP to the AP 102-*b* for communication between the AP 102-*b* and one or more STAs 104 associated with the AP 102-*b* and how the AP 102-*a* also uses the obtained TXOP for communication with one or more STAs 104 associated with the AP 102-*a* via one or more NPCA frames.

For example, the communication timeline 800 may illustrate an example of the communication timeline 700 in which the exchanged frames are associated with an NPCA procedure. In such examples, the AP 102-*a* may support a bandwidth associated with (such as including) an M-Primary channel 802 and an O-Primary channel 804. The M-Primary channel 802 may be an example of or may be included within the second portion 704 as illustrated by and described with reference to FIG. 7. The O-Primary channel 804 may be an example of or may be included within the first portion 702 as illustrated by and described with reference to FIG. 7.

In some implementations, the AP 102-*a* may transmit a TXOP allocation frame 806 that includes first information 808 and second information 810. The TXOP allocation frame 806 may be an example of a frame carried by PPDU 724 as illustrated by and described with reference to FIG. 7. Further, the first information 808 and the second information 810 may examples of the first information 726 and the second information 728, respectively, as illustrated by and described with reference to FIG. 7. Thus, for example, the first information 808 may include an allocation of a first duration of the TXOP to the AP 102-*b* and the second information 810 may include information indicative of a presence or an absence of communication (to or from the AP 102-*a*) via the O-Primary channel 804 within the first duration of the TXOP. In some implementations, the second information 810 may include an indication of an impending or potential transmission via the O-Primary channel 804 within the first duration of the TXOP. In other words, the TXOP allocation frame 806 may carry an indication of an impending or potential transmission via the O-Primary channel 804 within the shared TXOP duration.

The AP 102-*b* may transmit a response frame 812 associated with (such as responsive to) the TXOP allocation frame 806. In some implementations, the AP 102-*a* may begin (such as start, invoke, or initiate) a channel access procedure 818 on the O-Primary channel 804. In some implementations, one or more STAs 104 associated with the AP 102-*a* may refrain from contending for channel access on the O-Primary channel 804. In some implementations, the AP 102-*a* may switch to the O-Primary channel 804 in accordance with receiving the response frame 812. In some implementations, one or more STAs 104 associated with the AP 102-*a* may switch to the O-Primary channel 804 in accordance with receiving the second information 810. The AP 102-*b* may perform one or more frame exchanges 814 via the M-Primary channel 802 in accordance with receiving the TXOP allocation frame 806. In some implementations, the one or more frame exchanges 814 may be associated with a shared AP NAV or a PPDU length of a duration 816.

The AP 102-*a* may selectively transmit an NPCA ICF 820 via the O-Primary channel 804 in association with the first information 808 and the second information 810. In implementations in which the AP 102-*a* transmits the ICF 820, at least one STA 104 associated with the AP 102-*a* may transmit an ICR 822. The AP 102-*a* and the at least one STA 104 may perform one or more frame exchanges 824 via the O-Primary channel 804 accordingly. In association with completing the one or more frame exchanges 824, the AP 102-*a* and the at least one STA 104 may communicate a BA frame 826. In some implementations, the AP 102-*b* may transmit a TXOP return frame 828 via the M-Primary channel 802 to indicate at least a partial completion of the one or more frame exchanges 814 at the AP 102-*b* and to return at least a portion of the bandwidth used by the AP 102-*b* to the AP 102-*a*. The TXOP return frame 828 may be an example of the frame 734 as illustrated by and described with reference to FIG. 7.

Figure 9:
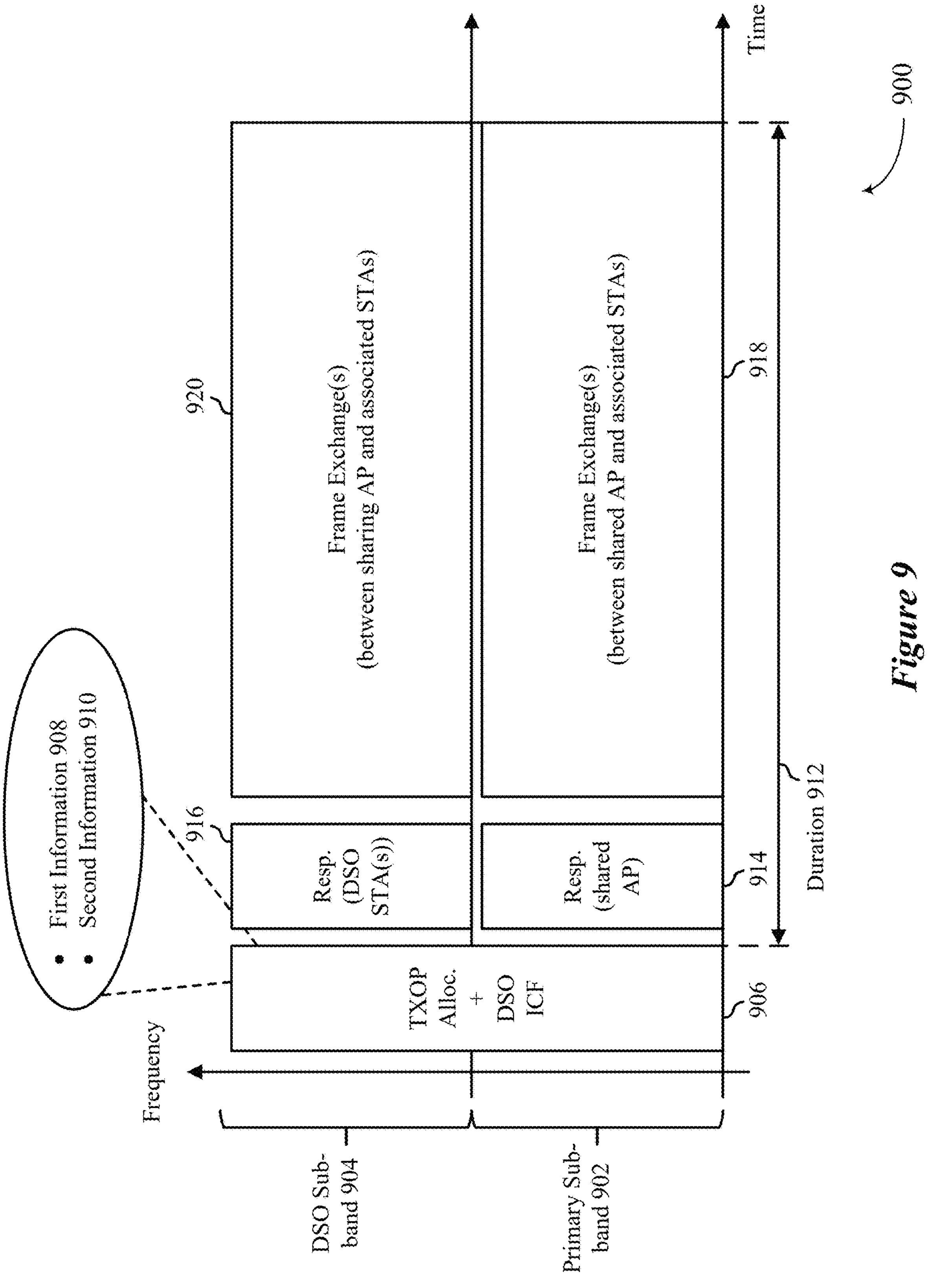

FIG. 9 shows an example communication timeline 900 that illustrates various protocols or mechanisms according to which a sharing AP may communicate with one or more associated STAs within a shared TXOP duration to support C-TDMA in Wi-Fi networks for partial bandwidth TXOP sharing. The communication timeline 900 may illustrate communication involving (such as to or from) the AP 102-*a*, the AP 102-*b*, one or more STAs 104 associated with the AP 102-*a*, and one or more STAs associated with the AP 102-*b*. For example, the communication timeline 900 may illustrate how the AP 102-*a* allocates (such as shares) a portion of the TXOP to the AP 102-*b* for communication between the AP 102-*b* and one or more STAs 104 associated with the AP 102-*b* and how the AP 102-*a* also uses the obtained TXOP for communication with one or more STAs 104 associated with the AP 102-*a* via one or more DSO frames. In other words, various wireless communication devices may leverage DSO to utilize a bandwidth that may have otherwise gone unutilized or underutilized.

For example, the communication timeline 900 may illustrate an example of the communication timeline 700 in which the exchanged frames are associated with a DSO procedure. In such examples, the AP 102-*a* may support a bandwidth associated with (such as including) a primary sub-band 902 and a DSO sub-band 904. The primary sub-band 902 may be an example of or may be included within the second portion 704 as illustrated by and described with reference to FIG. 7. The DSO sub-band 904 may be an example of or may be included within the first portion 702 as illustrated by and described with reference to FIG. 7.

In some implementations, the AP 102-*a* may transmit a frame 906 as both a TXOP allocation frame and a DSO ICF. In other words, the frame 906 may serve at least two purposes, including to act or function as a TXOP allocation frame (thereby sharing the TXOP on the primary sub-band 902 with the AP 102-*b*) and to act or function as DSO ICF (thereby triggering a switch of one or more STAs 104 associated with the AP 102-*a* to the DSO sub-band 904). In other words, a TXOP allocation frame also may function as a DSO ICF in accordance with some example implementations. For example, the frame 906 may include first information 908 and second information 910. The frame 906 may be an example of a frame carried by PPDU 724 as illustrated by and described with reference to FIG. 7. Further, the first information 908 and the second information 910 may examples of the first information 726 and the second information 728, respectively, as illustrated by and described with reference to FIG. 7. Thus, for example, the first information 908 may include an allocation of a first duration 912 of the TXOP to the AP 102-*b* and the second information 910 may include information indicative of a presence or an absence of communication (to or from the AP 102-*a*) via the DSO sub-band 904 within the first duration 912 of the TXOP.

In implementations in which the second information 910 triggers one or more STAs 104 associated with the AP 102-*a* to switch to the DSO sub-band 904, the AP 102-*b* may transmit a response frame 914 and at least one STA 104 associated with the AP 102-*a* may transmit a response frame 916. The AP 102-*b* may perform one or more frame exchanges 918 with one or more STAs 104 associated with the AP 102-*b* via the primary sub-band 902 within the first duration 912. Additionally, or alternatively, the AP 102-*a* may perform one or more frame exchanges 920 with one or more STAs 104 associated with the AP 102-*a* via the DSO sub-band 904 within the first duration 912.

Further, although the second information 910 is described in some examples as indicating or triggering a "switch" of one or more STAs 104 from the primary sub-band 902 to the DSO sub-band 904, whether a STA 104 actually performs a bandwidth or sub-band "switching" may be conditioned on or associated with a capability or operational mode of the STA 104. For example, if the STA 104 is a narrowband STA (such that the STA 104 may communicate via a select one of the primary sub-band 902 or the DSO sub-band 904 at any given time), the STA 104 may perform a sub-band switch in accordance with receiving the second information 910.

Alternatively, if the STA 104 is a wideband STA (or is otherwise not a narrowband STA) and can support at least a portion of an entire bandwidth of the AP 102-*a* (such as at least a portion of the primary sub-band 902 and a portion of the DSO sub-band 904), the STA 104 may refrain from actually performing a sub-band switch in accordance with receiving the second information 910 (as the STA 104 may already have reception or transmission capabilities on the DSO sub-band 904).

Figure 10:
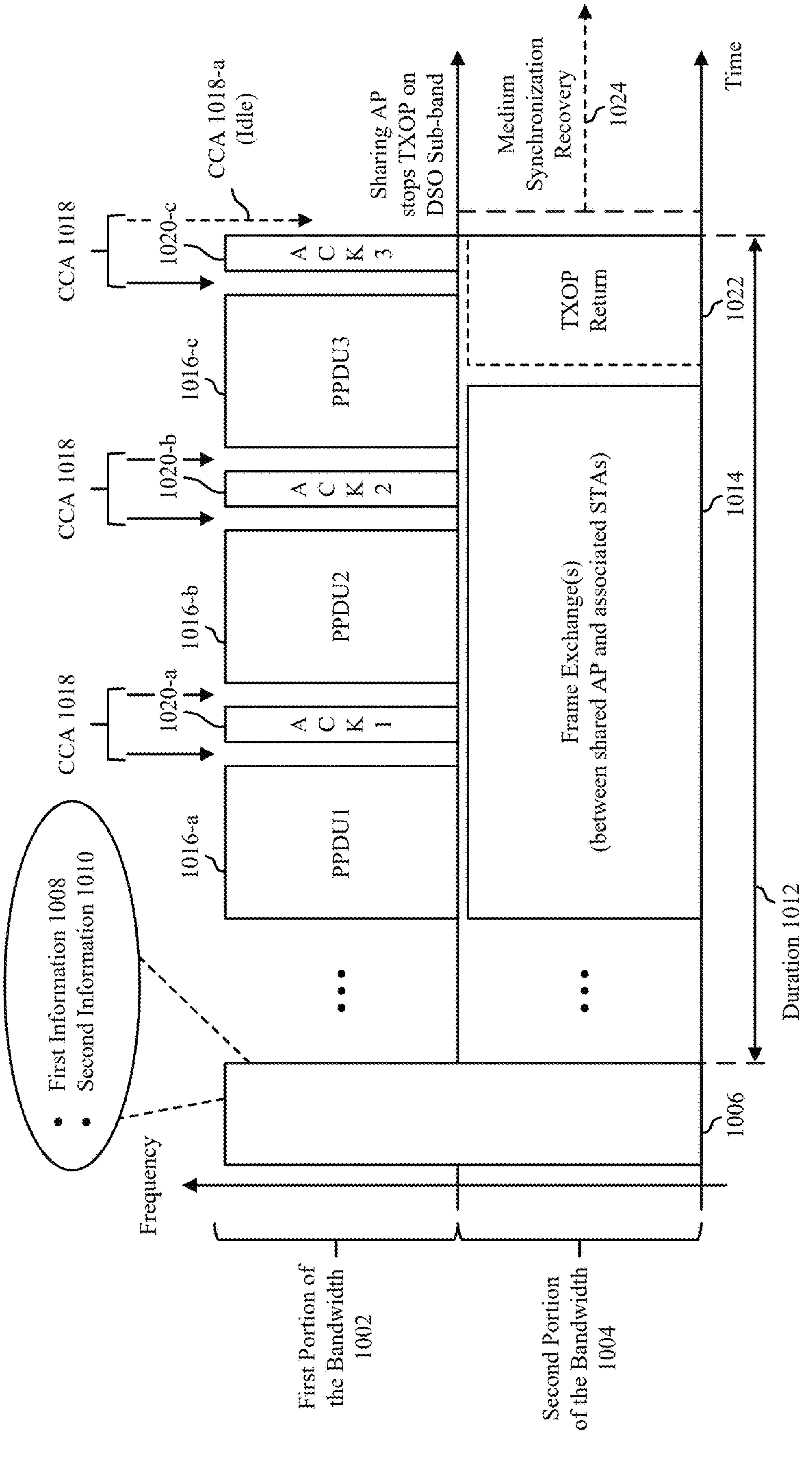

FIG. 10 shows an example communication timeline 1000 that illustrates various protocols or mechanisms according to which a sharing AP may communicate with one or more associated STAs within a shared TXOP duration to support C-TDMA in Wi-Fi networks for partial bandwidth TXOP sharing. The communication timeline 1000 may illustrate communication involving (such as to or from) the AP 102-*a*, the AP 102-*b*, one or more STAs 104 associated with the AP 102-*a*, and one or more STAs associated with the AP 102-*b*. For example, the communication timeline 1000 may illustrate how the AP 102-*a* allocates (such as shares) a portion of the TXOP to the AP 102-*b* for communication between the AP 102-*b* and one or more STAs 104 associated with the AP 102-*b* and how the AP 102-*a* also uses the obtained TXOP for communication with one or more STAs 104 associated with the AP 102-*a*. Further, the communication timeline 1000 illustrates how the AP 102-*a* may monitor or check to determine a status of the bandwidth usage by the AP 102-*b* within a shared TXOP duration.

In some implementations, for example, the AP 102-*a* may transmit a PPDU 1006 that includes first information 1008 and second information 1010. The PPDU 1006 may be an example of the PPDU 724 as illustrated by and described with reference to FIG. 7. The first information 1008 and the second information 1010 may be examples of the first information 726 and the second information 728, respectively, as illustrated by and described with reference to FIG. 7. In accordance with the first information 1008 and the second information 1010, the AP 102-*b* may perform one or more frame exchanges 1014 via a second portion 1004 associated with the TXOP bandwidth within a first duration 1012 that is allocated to the AP 102-*b* and the AP 102-*a* may communicate (such as transmit or receive) one or more PPDUs via a first portion 1002 of the TXOP bandwidth within at least the first duration 1012 that is allocated to the AP 102-*b*. The first portion 1002 and the second portion 1004 may be examples of the first portion 702 and the second portion 704, respectively, as illustrated by and described with reference to FIG. 7.

In some implementations, the AP 102-*a* may limit a PPDU size via the first portion 1002 of the bandwidth (such as, for example, a DSO sub-band) and may perform one or more CCA measurements on the second portion 1004 of the bandwidth (such as a primary sub-band). For example, the AP 102-*a* may limit the size of the PPDUs transmitted or solicited via the first portion 1002 of the bandwidth. In some aspects, the AP 102-*a* may use SIFS bursting to transmit multiple PPDUs within the TXOP associated with the first portion 1002 of the bandwidth and, during one or more SIFS gaps, the AP 102-*a* may perform one or more CCA measurements to infer whether the AP 102-*b* is still using the medium (such as the second portion 1004 of the bandwidth).

For example, the AP 102-*a* and one or more STAs 104 associated with the AP 102-*a* may communicate a PPDU 1016-*a*, an ACK 1020-*a* associated with the PPDU 1016-*a*, a PPDU 1016-*b*, an ACK 1020-*b* associated with the PPDU 1016-*b*, a PPDU 1016-*c*, and an ACK 1020-*c* associated with the PPDU 1016-*c*. During time gaps between a PPDU and an ACK, the AP 102-*a* may perform one or more CCA measurements 1018 on the second portion 1004 of the bandwidth. The AP 102-*a* may stop or terminate communication with one or more in-BSS STAs 104 via the first portion 1002 of the bandwidth in accordance with measuring that the second portion 1004 is idle. For example, the AP 102-*a* may stop a TXOP on the first portion 1002 of the bandwidth (such as a DSO sub-band) in accordance with a CCA measurement 1018-*a* indicating that the second portion 1004 of the bandwidth (such as the primary sub-band) is idle. In such examples, the AP 102-*a* may trigger one or more associated STAs 104 to switch back to the second portion 1004 of the bandwidth.

Additionally, or alternatively, the AP 102-*a* may operate an auxiliary radio (such as a receive only radio or a radio otherwise associated with a relatively lower capability as compared to a main radio of the AP 102-*a*) and may switch the auxiliary radio to the second portion 1004 of the bandwidth in accordance with (such as after) sharing the TXOP with the AP 102-*b*. In such implementations, the AP 102-*a* may use the auxiliary radio to monitor for a TXOP return frame 1022 from the AP 102-*b*. In some implementations, the AP 102-*a* and the AP 102-*b* may coordinate on type or a format of the TXOP return frame 1022 to increase a likelihood that the AP 102-*a* is able to receive and decode the TXOP return frame 1022 via the auxiliary radio (as the auxiliary radio of the AP 102-*a* may be unable to receive and decode all types of frames).

For example, the AP 102-*a* may indicate one or more constraints associated with the auxiliary radio of the AP 102-*a* via one or more frames, such as via a TXOP allocation frame, a negotiation frame, or a management frame) and the AP 102-*b* may generate or format the TXOP return frame 1022 in accordance with the indicated constraints. Additionally, or alternatively, the AP 102-*b* may generate or format the TXOP return frame 1022 in accordance with a network specification, which may specify a type or format that is compatible with various auxiliary radios that the AP 102-*a* might operate. In accordance with receiving (and decoding) the TXOP return frame 1022 via the auxiliary radio, the AP 102-*a* may stop, end, or terminate a TOXP on the first portion 1002 of the bandwidth (such as the DSO sub-band) and move its associated STAs 104 to the second portion 1004 of the bandwidth (such as the primary sub-band).

Additionally, or alternatively, the AP 102-*a* may perform a medium synchronization recovery procedure 1024 on the second portion 1004 of the bandwidth (such as the primary sub-band). In such implementations, the AP 102-*a* may perform the medium synchronization recovery procedure 1024 on a primary channel of the second portion 1004 of the bandwidth prior to initiating another TXOP on the primary channel of the second portion 1004 of the bandwidth. In some implementations, the AP 102-*a* may perform the medium synchronization recovery procedure 1024 in accordance with completing one or more frame exchanges via the first portion 1002 of the bandwidth. In some aspects, performing the medium synchronization recovery procedure 1024 may include performing one or more energy detection measurements and comparing the measured energy to an energy detection threshold. Such an energy detection threshold may be relatively lower as compared to an energy detection threshold that the AP 102-*a* may otherwise use, such as for channel access attempts outside of the medium synchronization recovery procedure 1024.

Figure 11:
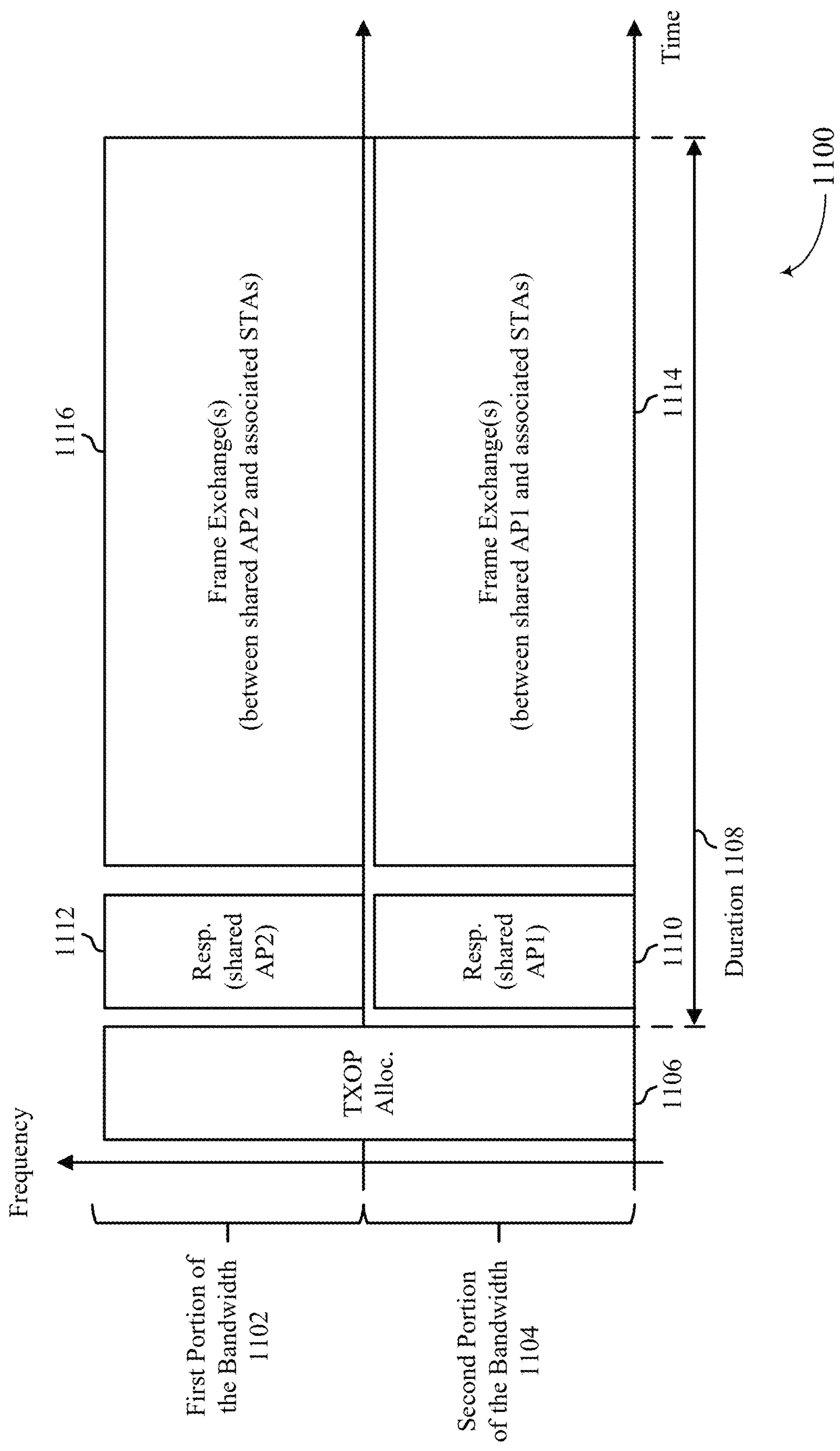
FIGS. 11 and 12 show example communication timelines that illustrate various protocols or mechanisms according to which a sharing AP may share a TXOP with multiple APs to support C-TDMA in Wi-Fi networks for partial bandwidth TXOP sharing.

FIG. 11 shows an example communication timeline 1100 that illustrates various protocols or mechanisms according to which a sharing AP may share a TXOP with multiple APs to support C-TDMA in Wi-Fi networks for partial bandwidth TXOP sharing. The communication timeline 1100 illustrates how the AP 102-*a* may share an obtained TXOP with multiple other APs 102 (such as multiple shared APs). For example, the AP 102-*a* may obtain a TXOP associated with a bandwidth and the bandwidth may include a first portion 1102 and a second portion 1104, which may be examples of corresponding portions as illustrated and described herein. The AP 102-*a* may transmit a TXOP allocation frame 1106 to share the TXOP bandwidth with multiple APs 102 in scenarios in which the bandwidths used by the multiple APs 102 within the neighborhood of the AP 102-*a* are orthogonal and within the TXOP bandwidth obtained by the AP 102-*a*. In other words, the AP 102-*a* may share a TXOP with multiple APs 102 in the frequency domain.

In some examples, the AP 102-*a* may transmit the TXOP allocation frame 1106 to share a first duration 1108 of the TXOP with a first AP 102 (a shared AP1) and a second AP 102 (a shared AP2). In some examples, the first AP 102 may transmit a response frame 1110 via the second portion 1104 of the bandwidth and the second AP 102 may transmit a response frame 1112 via the first portion 1102 of the bandwidth. In association with communicating one or more of the TXOP allocation frame 1106, the response frame 1110, and the response frame 1112, the first AP 102 may perform one or more frame exchanges 1114 with one or more STAs 104 associated with the first AP 102 via the second portion 1104 of the bandwidth and the second AP 102 may perform one or more frame exchanges 1116 with one or more STAs 104 associated with the second AP 102 via the first portion 1102 of the bandwidth. In some examples, the one or more STAs 104 associated with the second AP 102 may already operate on the first portion 1102 of the bandwidth and, in such examples, the second AP 102 may refrain from transmitting one or more frames to switch such STA(s) 104 to the first portion 1102 of the bandwidth. In some aspects, the communication timeline 1100 may be associated with a DSO at the APs 102 and baseline operation at one or more associated STAs 104 and may involve C-TDMA sharing on orthogonal frequencies.

Figure 12:
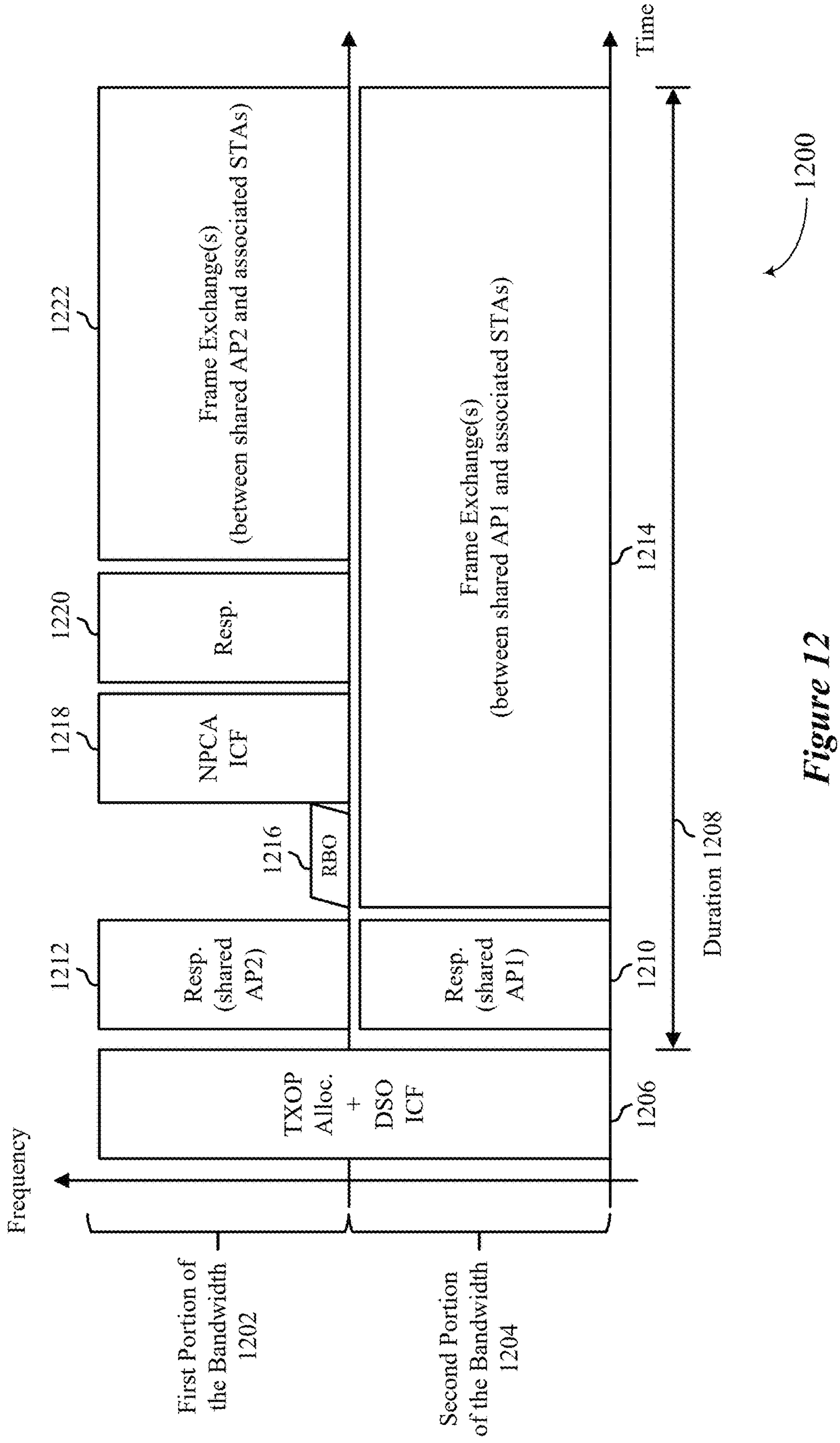

FIG. 12 shows an example communication timeline 1200 that illustrates various protocols or mechanisms according to which a sharing AP may share a TXOP with multiple APs to support C-TDMA in Wi-Fi networks for partial bandwidth TXOP sharing. The communication timeline 1200 illustrates how the AP 102-*a* may share an obtained TXOP with multiple other APs 102 (such as multiple shared APs). For example, the AP 102-*a* may obtain a TXOP associated with a bandwidth and the bandwidth may include a first portion 1202 and a second portion 1204, which may be examples of corresponding portions as illustrated and described herein. The AP 102-*a* may transmit a frame 1206 to share the TXOP bandwidth with multiple APs 102 in scenarios in which a bandwidth used by the multiple APs 102 is the same. In other words, the AP 102-*a* may, if the bandwidth used by multiple APs 102 within the neighborhood of the AP 102-*a* is the same, the AP 102-*a* may trigger a switch of one of the multiple APs 102 to a different sub-band (such as a DSO sub-band).

For example, the AP 102-*a* may transmit the frame 1206 to share a first duration 1208 of the TXOP with a first AP 102 (a shared AP1) and a second AP 102 (a shared AP2). In some examples, the frame 1206 may function as a TXOP allocation frame and a DSO ICF. For example, the frame 1206 may trigger the second AP 102 to switch to the first portion 1202 of the bandwidth (such as a DSO sub-band). In some examples, the first AP 102 may transmit a response frame 1210 via the second portion 1104 of the bandwidth and the second AP 102 may transmit a response frame 1212 via the first portion 1102 of the bandwidth. In association with communicating one or more of the frame 1206, the response frame 1210, and the response frame 1212, the first AP 102 may perform one or more frame exchanges 1214 with one or more associated STAs 104 via the second portion 1204 of the bandwidth and the second AP 102 may employ an NPCA procedure to communicate with one or more associated STAs 104 via the first portion 1202 of the bandwidth. In some aspects, the first portion 1202 of the bandwidth may be a DSO sub-band for the second AP 102 and the DSO sub-band may overlap with an O-Primary channel associated with the second AP 102.

In some implementations, for example, the second AP 102 may perform a channel access procedure 1216 associated with the first portion 1202 and may transmit an NPCA ICF 1218 via the first portion 1202 of the bandwidth (such as via an O-Primary channel within the first portion 1202 of the bandwidth). In such implementations, one or more STAs 104 associated with the second AP 102 may detect the co-channel AP (such as the first AP 102) as OBSS traffic and switch to the first portion 1202 of the bandwidth (such as the DSO sub-band or the O-Primary channel). In accordance with switching to the first portion 1202 of the bandwidth, one or more STAs 104 associated with the second AP 102 may transmit a response frame 1220 and, in association with communication of the response frame 1220, the second AP 102 and the one or more STAs 104 associated with the second AP 102 may perform one or more frame exchanges 1222 via the first portion 1202 of the bandwidth. In some aspects, the communication timeline 1200 may be associated with DSO at the APs 102 and NPCA at one or more associated STAs 104 and may involve C-TDMA sharing on orthogonal frequencies.

Figure 13:
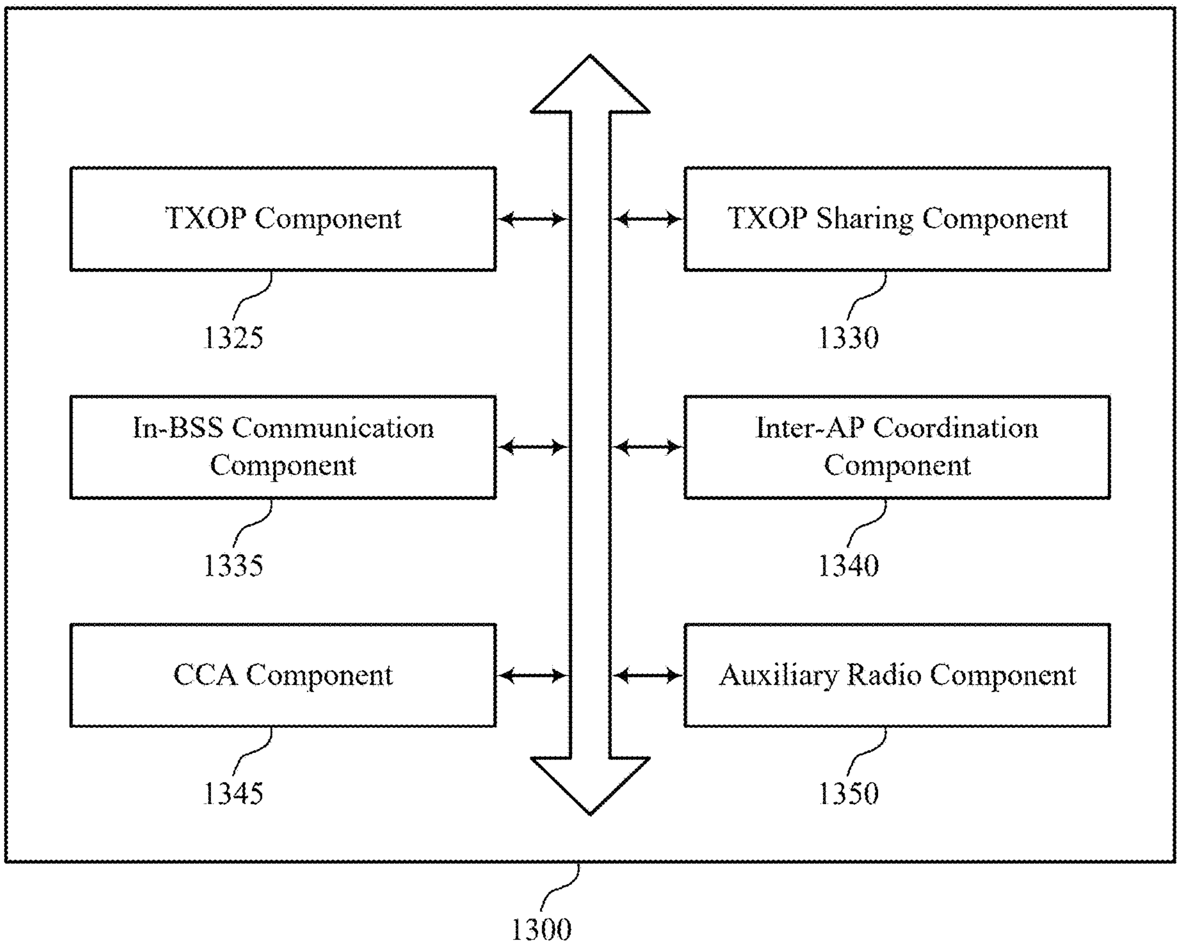
FIG. 13 shows a block diagram of an example wireless communication device that supports C-TDMA in Wi-Fi networks for partial bandwidth TXOP sharing.

FIG. 13 shows a block diagram of an example wireless communication device 1300 that supports C-TDMA in Wi-Fi networks for partial bandwidth TXOP sharing. In some examples, the wireless communication device 1300 is configured to perform the processes 1500 and 1600 described with reference to FIGS. 15 and 16, respectively. The wireless communication device 1300 may include one or more chips, SoCs, chipsets, packages, components or devices that individually or collectively constitute or include a processing system. The processing system may interface with other components of the wireless communication device 1300, and may generally process information (such as inputs or signals) received from such other components and output information (such as outputs or signals) to such other components. In some aspects, an example chip may include a processing system, a first interface to output or transmit information and a second interface to receive or obtain information. For example, the first interface may refer to an interface between the processing system of the chip and a transmission component, such that the wireless communication device 1300 may transmit the information output from the chip. In such an example, the second interface may refer to an interface between the processing system of the chip and a reception component, such that the wireless communication device 1300 may receive information that is then passed to the processing system. In some such examples, the first interface also may obtain information, such as from the transmission component, and the second interface also may output information, such as to the reception component.

The processing system of the wireless communication device 1300 includes processor (or "processing") circuitry in the form of one or multiple processors, microprocessors, processing units (such as central processing units (CPUs), graphics processing units (GPUs), neural processing units (NPUs) (also referred to as neural network processors or deep learning processors (DLPs)), or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein.

The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled with one or more of the processors and may individually or collectively store processor-executable code that, when executed by one or more of the processors, may configure one or more of the processors to perform various functions or operations described herein. In some implementations, one or more of the multiple memories may be configured to store processor-executable code that, when executed, may configure one or more of the multiple processors to perform various functions described herein (as part of a processing system). In some other implementations, the processing system may be pre-configured to perform various functions described herein.

Additionally, or alternatively, in some examples, one or more of the processors may be preconfigured to perform various functions or operations described herein without requiring configuration by software. The processing system may further include or be coupled with one or more modems (such as a Wi-Fi (such as IEEE compliant) modem or a cellular (such as 3GPP 4G LTE, 5G or 6G compliant) modem). In some implementations, one or more processors of the processing system include or implement one or more of the modems. The processing system may further include or be coupled with multiple radios (collectively "the radio"), multiple RF chains or multiple transceivers, each of which may in turn be coupled with one or more of multiple antennas. In some implementations, one or more processors of the processing system include or implement one or more of the radios, RF chains or transceivers.

In some examples, the wireless communication device 1300 can be configurable or configured for use in an AP, such as the AP 102 described with reference to FIG. 1. In some other examples, the wireless communication device 1300 can be an AP that includes such a processing system and other components including multiple antennas. The wireless communication device 1300 is capable of transmitting and receiving wireless communications in the form of, for example, wireless packets. For example, the wireless communication device 1300 can be configurable or configured to transmit and receive packets in the form of physical layer PPDUs and MPDUs conforming to one or more of the IEEE 802.11 family of wireless communication protocol standards. In some other examples, the wireless communication device 1300 can be configurable or configured to transmit and receive signals and communications conforming to one or more 3GPP specifications including those for 5G NR or 6G. In some examples, the wireless communication device 1300 also includes or can be coupled with one or more application processors which may be further coupled with one or more other memories. In some examples, the wireless communication device 1300 further includes at least one external network interface coupled with the processing system that enables communication with a core network or backhaul network that enables the wireless communication device 1300 to gain access to external networks including the Internet.

The wireless communication device 1300 includes a TXOP component 1325, a TXOP sharing component 1330, an in-BSS communication component 1335, an inter-AP coordination component 1340, a CCA component 1345, and an auxiliary radio component 1350. Portions of one or more of the TXOP component 1325, the TXOP sharing component 1330, the in-BSS communication component 1335, the inter-AP coordination component 1340, the CCA component 1345, and the auxiliary radio component 1350 may be implemented at least in part in hardware or firmware. For example, one or more of the TXOP component 1325, the TXOP sharing component 1330, the in-BSS communication component 1335, the inter-AP coordination component 1340, the CCA component 1345, and the auxiliary radio component 1350 may be implemented at least in part by at least a processor or a modem. In some examples, portions of one or more of the TXOP component 1325, the TXOP sharing component 1330, the in-BSS communication component 1335, the inter-AP coordination component 1340, the CCA component 1345, and the auxiliary radio component 1350 may be implemented at least in part by a processor and software in the form of processor-executable code stored in memory.

The wireless communication device 1300 may support wireless communication in accordance with examples as disclosed herein. The TXOP component 1325 is configurable or configured to obtain a transmission opportunity (TXOP) associated with a bandwidth. The TXOP sharing component 1330 is configurable or configured to transmit a physical layer (PHY) protocol data unit (PPDU) that includes first information indicative of an allocation of a first duration of the TXOP to a second wireless AP associated with a second BSS and second information indicative of a presence of communication associated with the first BSS via a first portion of the bandwidth within the first duration of the TXOP. The in-BSS communication component 1335 is configurable or configured to communicate, via the first portion of the bandwidth within the first duration of the TXOP, a frame with one or more stations (STAs) associated with the first wireless AP.

In some examples, the inter-AP coordination component 1340 is configurable or configured to receive an indication of a bandwidth usage at the second wireless AP via a second frame, where indicating the presence of the communication associated with the first BSS via the first portion of the bandwidth within the first duration is in accordance with the bandwidth usage at the second wireless AP being less than the bandwidth associated with the TXOP obtained by the first wireless AP.

In some examples, the inter-AP coordination component 1340 is configurable or configured to transmit information indicative of an expectation to share the TXOP with the second wireless AP, where receiving the indication of the bandwidth usage at the second wireless AP is in association with transmitting the information indicative of the expectation to share the TXOP with the second wireless AP.

In some examples, the first wireless AP transmits the information indicative of the expectation to share the TXOP with the second wireless AP via a schedule announcement frame.

In some examples, the indication of the bandwidth usage at the second wireless AP is associated with a 1-bit indication of whether the second wireless AP will use an entirety of the bandwidth associated with the TXOP or a portion of the bandwidth associated with the TXOP; a multi-bit indication that indicates which portion, of a set of multiple portions, of the bandwidth associated with the TXOP the second wireless AP will use; or an occupied bandwidth of the second frame. In some examples, the second frame is transmitted by the second wireless AP.

In some examples, the second frame is a response frame associated with a schedule announcement frame, a negotiation frame, or a management frame.

In some examples, the inter-AP coordination component 1340 is configurable or configured to receive the indication of the bandwidth usage at the second wireless AP dynamically on a per-TXOP basis or semi-statically on a per-coordination instance basis.

In some examples, the inter-AP coordination component 1340 is configurable or configured to receive the indication of the bandwidth usage at the second wireless AP from the second wireless AP, a central controller, or another network node.

In some examples, the TXOP sharing component 1330 is configurable or configured to transmit, via the first information, an indication of a second portion of the bandwidth allocated to the second wireless AP within the first duration of the TXOP.

In some examples, the second portion of the bandwidth allocated to the second wireless AP is associated with an indicated bandwidth usage at the second wireless AP.

In some examples, the second information indicates the presence of a transmission to or from the first wireless AP via an opportunistic primary (O-Primary) channel associated with the first BSS within the first duration of the TXOP. In some examples, the first portion of the bandwidth includes the O-Primary channel. In some examples, the communication associated with the first BSS includes the transmission via the O-Primary channel.

In some examples, the second information includes a 1-bit indication. In some examples, a first value of the 1-bit indication corresponds to an absence of the transmission via the O-Primary channel and a second value of the 1-bit indication corresponds to the presence of the transmission via the O-Primary channel.

In some examples, the second value of the 1-bit indication indicates, to the one or more STAs associated with the first wireless AP, that the transmission via the O-Primary channel is an impending transmission or a potential transmission.

In some examples, the second information includes a multi-bit indication. In some examples, a first value of the multi-bit indication corresponds to an absence of the transmission via the O-Primary channel, a second value of the multi-bit indication corresponds an indication of the transmission via the O-Primary channel as an impending transmission, and a third value of the multi-bit indication corresponds an indication of the transmission via the O-Primary channel as a potential transmission.

In some examples, the second information includes an indication of whether uplink channel access is allowed via the O-Primary channel within the first duration of the TXOP.

In some examples, the second information indicates the one or more STAs associated with the first wireless AP to switch from a second portion of the bandwidth to the first portion of the bandwidth.

In some examples, the first portion of the bandwidth includes a secondary subchannel associated with the first BSS and the second portion of the bandwidth includes a primary subchannel associated with the first BSS.

In some examples, the first portion of the bandwidth includes a dynamic subchannel operation (DSO) sub-band associated with the first BSS.

In some examples, the PPDU is associated with a TXOP allocation and a dynamic subchannel operation (DSO) initial control frame (ICF) in association with including the first information and the second information.

In some examples, the inter-AP coordination component 1340 is configurable or configured to transmit, via information indicative of an expectation to share the TXOP with the second wireless AP, an indication of the first duration of the TXOP. In some examples, the inter-AP coordination component 1340 is configurable or configured to receive an indication of an amount of the first duration that the second wireless AP will use, where indicating the presence of the communication associated with the first BSS via the first portion of the bandwidth within the first duration is in accordance with the amount of the first duration that the second wireless AP will use.

In some examples, the indication includes a 1-bit indication indicating whether the second wireless AP will use an entirety of the first duration or a subset of the first duration. In some examples, the indication includes a multi-bit indication indicating a specific amount of the first duration that the second wireless AP will use.

In some examples, the CCA component 1345 is configurable or configured to perform one or more CCA measurements associated with a second portion of the bandwidth used by the second wireless AP within the first duration of the TXOP. In some examples, the in-BSS communication component 1335 is configurable or configured to selectively communicate one or more frames via at least a sub-portion of the second portion of the bandwidth in association with performing the one or more CCA measurements.

In some examples, the auxiliary radio component 1350 is configurable or configured to monitor a second portion of the bandwidth used by the second wireless AP within the first duration of the TXOP via an auxiliary radio of the first wireless AP. In some examples, the in-BSS communication component 1335 is configurable or configured to selectively communicate one or more frames via at least a sub-portion of the second portion of the bandwidth in association with whether the auxiliary radio receives a TXOP return frame associated with at least the sub-portion of the second portion of the bandwidth.

In some examples, the CCA component 1345 is configurable or configured to perform a medium synchronization recovery procedure associated with a second portion of the bandwidth used by the second wireless AP within the first duration of the TXOP in association with a completion of the communication associated with the first BSS via the first portion of the bandwidth within the first duration of the TXOP. In some examples, the TXOP component 1325 is configurable or configured to selectively initiate a second TXOP or continuing the TXOP across at least a sub-portion of the second portion of the bandwidth in association with whether the medium synchronization recovery procedure is successful.

In some examples, the TXOP sharing component 1330 is configurable or configured to transmit, via the PPDU, an indication of how the one or more STAs associated with the first wireless AP are to parse a TXOP sharing mode indication included by the PPDU.

In some examples, the indication is included by a subfield within one or more user info fields associated with the one or more STAs. In some examples, the indication is that the one or more STAs are to ignore the TXOP sharing mode indication.

In some examples, the indication is associated with an interpretation of a set of multiple subfields. In some examples, the interpretation defines that the one or more STAs are to interpret the PPDU as carrying a multi-user request-to-send (RTS) trigger frame in association with the TXOP sharing mode indication being set to a non-zero value and an resource unit (RU) allocation subfield indicating a first RU outside of a primary subchannel associated with the first BSS; or the one or more STAs are to interpret the PPDU as carrying a TXOP sharing (TXS) frame in association with the TXOP sharing mode indication being set to the non-zero value and the RU allocation subfield indicating a second RU within the primary subchannel associated with the first BSS.

In some examples, the TXOP sharing component 1330 is configurable or configured to transmit, via the PPDU, one or more frames that include the first information and the second information.

In some examples, the one or more frames consists of a single frame, the single frame including the first information and the second information. In some examples, the one or more frames include a first frame and a second frame, the first frame including the first information and the second frame including the second information.

In some examples, the PPDU includes an aggregated medium access control (MAC) protocol data unit (A-MPDU). In some examples, the A-MPDU includes the first frame and the second frame.

In some examples, the TXOP sharing component 1330 is configurable or configured to receive a second frame that indicates a return, to the first wireless AP, of a sub-portion, of a set of multiple sub-portions, of a second portion of the bandwidth associated with the TXOP used by the second wireless AP.

In some examples, the second frame includes an indication of the sub-portion, from the set of multiple sub-portions. In some examples, the second frame indicates the return of the sub-portion via an occupied bandwidth of the second frame, the sub-portion being associated with a difference between the second portion of the bandwidth used by the second wireless AP and the occupied bandwidth of the second frame.

In some examples, the TXOP sharing component 1330 is configurable or configured to communicate one or more frames via the sub-portion of the second portion of the bandwidth.

In some examples, the one or more frames are transmitted to the one or more STAs associated with the first wireless AP or allocate the sub-portion of the second portion of the bandwidth to one or more other wireless APs.

Additionally, or alternatively, the wireless communication device 1300 may support wireless communication in accordance with examples as disclosed herein. The inter-AP coordination component 1340 is configurable or configured to receive first information indicative of an expectation of a second wireless AP associated with a second BSS to share a transmission opportunity (TXOP) with the first wireless AP. In some examples, the inter-AP coordination component 1340 is configurable or configured to transmit an indication of a bandwidth usage at the first wireless AP. In some examples, the TXOP sharing component 1330 is configurable or configured to receive a physical layer (PHY) protocol data unit (PPDU) that includes second information indicative of an allocation of a first duration of the TXOP to the first wireless AP in accordance with the indication of the bandwidth usage at the first wireless AP. In some examples, the in-BSS communication component 1335 is configurable or configured to communicate, via a first portion of a bandwidth associated with the TXOP and within the first duration of the TXOP, a frame with one or more stations (STAs) associated with the first wireless AP, where the bandwidth usage at the first wireless AP includes the first portion of the bandwidth.

In some examples, the PPDU further includes third information indicative of a presence of communication associated with the second BSS via a second portion of the bandwidth within the first duration of the TXOP. In some examples, communicating the frame via the first portion of the bandwidth is in accordance with the presence of the communication associated with the second BSS via the second portion of the bandwidth.

In some examples, the first wireless AP receives the information indicative of the expectation to share the TXOP with the second wireless AP via a schedule announcement frame.

In some examples, the indication of the bandwidth usage at the first wireless AP is received via a second frame. In some examples, the indication of the bandwidth usage at the first wireless AP is associated with a 1-bit indication of whether the first wireless AP will use an entirety of the bandwidth associated with the TXOP or a portion of the bandwidth associated with the TXOP; a multi-bit indication that indicates which portion, of a set of multiple portions, of the bandwidth associated with the TXOP the first wireless AP will use; or an occupied bandwidth of the second frame. In some examples, the second frame is transmitted by the first wireless AP.

In some examples, the second frame is a response frame associated with a schedule announcement frame, a negotiation frame, or a management frame.

In some examples, the inter-AP coordination component 1340 is configurable or configured to transmit the indication of the bandwidth usage at the first wireless AP dynamically on a per-TXOP basis or semi-statically on a per-coordination instance basis.

In some examples, the TXOP sharing component 1330 is configurable or configured to receive, via the second information, an indication of the first portion of the bandwidth allocated to the first wireless AP within the first duration of the TXOP.

In some examples, the inter-AP coordination component 1340 is configurable or configured to receive, via the first information indicative of the expectation to share the TXOP with the first wireless AP, an indication of the first duration of the TXOP. In some examples, the inter-AP coordination component 1340 is configurable or configured to transmit an indication of an amount of the first duration that the first wireless AP will use.

In some examples, the indication includes a 1-bit indication indicating whether the first wireless AP will use an entirety of the first duration or a subset of the first duration. In some examples, the indication includes a multi-bit indication indicating a specific amount of the first duration that the first wireless AP will use.

In some examples, the TXOP sharing component 1330 is configurable or configured to transmit a second frame that indicates a return, to the second wireless AP, of a sub-portion, of a set of multiple sub-portions, of the first portion of the bandwidth associated with the TXOP used by the first wireless AP.

In some examples, the second frame includes an indication of the sub-portion, from the set of multiple sub-portions. In some examples, the second frame indicates the return of the sub-portion via an occupied bandwidth of the second frame, the sub-portion being associated with a difference between the first portion of the bandwidth used by the first wireless AP and the occupied bandwidth of the second frame.

Figure 14:
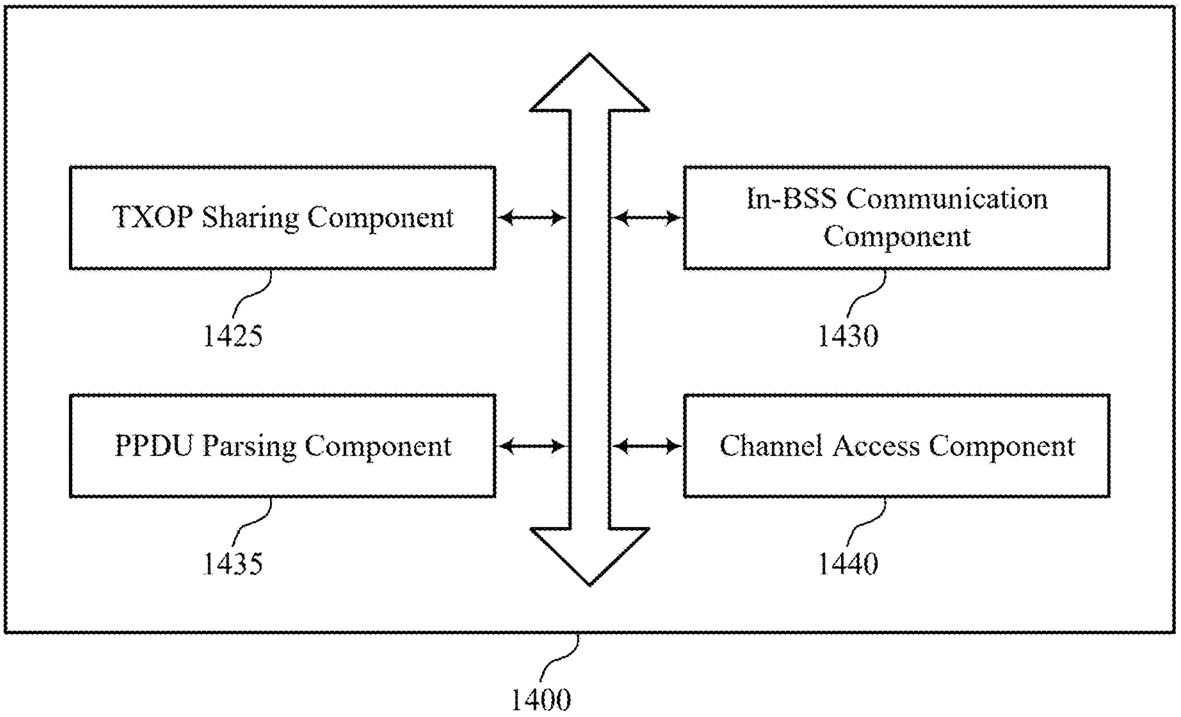
FIG. 14 shows a block diagram of an example wireless communication device that supports C-TDMA in Wi-Fi networks for partial bandwidth TXOP sharing.

FIG. 14 shows a block diagram of an example wireless communication device 1400 that supports C-TDMA in Wi-Fi networks for partial bandwidth TXOP sharing. In some examples, the wireless communication device 1400 is configured to perform the process 1700 described with reference to FIG. 17. The wireless communication device 1400 may include one or more chips, SoCs, chipsets, packages, components or devices that individually or collectively constitute or include a processing system. The processing system may interface with other components of the wireless communication device 1400, and may generally process information (such as inputs or signals) received from such other components and output information (such as outputs or signals) to such other components. In some aspects, an example chip may include a processing system, a first interface to output or transmit information and a second interface to receive or obtain information. For example, the first interface may refer to an interface between the processing system of the chip and a transmission component, such that the wireless communication device 1400 may transmit the information output from the chip. In such an example, the second interface may refer to an interface between the processing system of the chip and a reception component, such that the wireless communication device 1400 may receive information that is then passed to the processing system. In some such examples, the first interface also may obtain information, such as from the transmission component, and the second interface also may output information, such as to the reception component.

The processing system of the wireless communication device 1400 includes processor (or "processing") circuitry in the form of one or multiple processors, microprocessors, processing units (such as central processing units (CPUs), graphics processing units (GPUs), neural processing units (NPUs) (also referred to as neural network processors or deep learning processors (DLPs)), or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein.

The processing system may further include memory circuitry in the form of one or more memory devices, memory blocks, memory elements or other discrete gate or transistor logic or circuitry, each of which may include tangible storage media such as random-access memory (RAM) or ROM, or combinations thereof (all of which may be generally referred to herein individually as "memories" or collectively as "the memory" or "the memory circuitry"). One or more of the memories may be coupled with one or more of the processors and may individually or collectively store processor-executable code that, when executed by one or more of the processors, may configure one or more of the processors to perform various functions or operations described herein. In some implementations, one or more of the multiple memories may be configured to store processor-executable code that, when executed, may configure one or more of the multiple processors to perform various functions described herein (as part of a processing system). In some other implementations, the processing system may be pre-configured to perform various functions described herein.

Additionally, or alternatively, in some examples, one or more of the processors may be preconfigured to perform various functions or operations described herein without requiring configuration by software. The processing system may further include or be coupled with one or more modems (such as a Wi-Fi (such as IEEE compliant) modem or a cellular (such as 3GPP 4G LTE, 5G or 6G compliant) modem). In some implementations, one or more processors of the processing system include or implement one or more of the modems. The processing system may further include or be coupled with multiple radios (collectively "the radio"), multiple RF chains or multiple transceivers, each of which may in turn be coupled with one or more of multiple antennas. In some implementations, one or more processors of the processing system include or implement one or more of the radios, RF chains or transceivers.

In some examples, the wireless communication device 1400 can be configurable or configured for use in a STA, such as the STA 104 described with reference to FIG. 1. In some other examples, the wireless communication device 1400 can be a STA that includes such a processing system and other components including multiple antennas. The wireless communication device 1400 is capable of transmitting and receiving wireless communications in the form of, for example, wireless packets. For example, the wireless communication device 1400 can be configurable or configured to transmit and receive packets in the form of physical layer PPDUs and MPDUs conforming to one or more of the IEEE 802.11 family of wireless communication protocol standards. In some other examples, the wireless communication device 1400 can be configurable or configured to transmit and receive signals and communications conforming to one or more 3GPP specifications including those for 5G NR or 6G. In some examples, the wireless communication device 1400 also includes or can be coupled with one or more application processors which may be further coupled with one or more other memories. In some examples, the wireless communication device 1400 further includes a user interface (UI) (such as a touchscreen or keypad) and a display, which may be integrated with the UI to form a touchscreen display that is coupled with the processing system. In some examples, the wireless communication device 1400 may further include one or more sensors such as, for example, one or more inertial sensors, accelerometers, temperature sensors, pressure sensors, or altitude sensors, that are coupled with the processing system.

The wireless communication device 1400 includes a TXOP sharing component 1425, an in-BSS communication component 1430, a PPDU parsing component 1435, and a channel access component 1440. Portions of one or more of the TXOP sharing component 1425, the in-BSS communication component 1430, the PPDU parsing component 1435, and the channel access component 1440 may be implemented at least in part in hardware or firmware. For example, one or more of the TXOP sharing component 1425, the in-BSS communication component 1430, the PPDU parsing component 1435, and the channel access component 1440 may be implemented at least in part by at least a processor or a modem. In some examples, portions of one or more of the TXOP sharing component 1425, the in-BSS communication component 1430, the PPDU parsing component 1435, and the channel access component 1440 may be implemented at least in part by a processor and software in the form of processor-executable code stored in memory.

The wireless communication device 1400 may support wireless communication in accordance with examples as disclosed herein. The TXOP sharing component 1425 is configurable or configured to receive, from a first wireless AP associated with the first BSS, a physical layer (PHY) protocol data unit (PPDU) that includes first information indicative of an allocation of a first duration of a transmission opportunity (TXOP) obtained by the first wireless AP to a second wireless AP associated with a second BSS and second information indicative of a presence of communication associated with the first BSS via a first portion of a bandwidth associated with the TXOP within the first duration of the TXOP. The in-BSS communication component 1430 is configurable or configured to receive, via the first portion of the bandwidth within the first duration of the TXOP, a frame from the first wireless AP.

In some examples, the TXOP sharing component 1425 is configurable or configured to receive, via the first information, an indication of a second portion of the bandwidth allocated to the second wireless AP within the first duration of the TXOP.

In some examples, the second information indicates the presence of a transmission to or from the first wireless AP via an opportunistic primary (O-Primary) channel associated with the first BSS within the first duration of the TXOP. In some examples, the first portion of the bandwidth includes the O-Primary channel. In some examples, the communication associated with the first BSS includes the transmission via the O-Primary channel.

In some examples, the second information includes a 1-bit indication. In some examples, a first value of the 1-bit indication corresponds to an absence of the transmission via the O-Primary channel and a second value of the 1-bit indication corresponds to the presence of the transmission via the O-Primary channel.

In some examples, the second value of the 1-bit indication indicates, to the STA, that the transmission via the O-Primary channel is an impending transmission or a potential transmission.

In some examples, the second information includes a multi-bit indication. In some examples, a first value of the multi-bit indication corresponds to an absence of the transmission via the O-Primary channel, a second value of the multi-bit indication corresponds an indication of the transmission via the O-Primary channel as an impending transmission, and a third value of the multi-bit indication corresponds an indication of the transmission via the O-Primary channel as a potential transmission.

In some examples, the second information includes an indication of whether uplink channel access is allowed via the O-Primary channel within the first duration of the TXOP.

In some examples, the channel access component 1440 is configurable or configured to selectively perform a channel access procedure associated with the O-Primary channel within the first duration of the TXOP in accordance with the indication of whether the uplink channel access is allowed via the O-Primary channel within the first duration of the TXOP.

In some examples, the second information indicates that the first STA is to switch from a second portion of the bandwidth to the first portion of the bandwidth.

In some examples, the first portion of the bandwidth includes a secondary subchannel associated with the first BSS and the second portion of the bandwidth includes a primary subchannel associated with the first BSS.

In some examples, the first portion of the bandwidth includes a dynamic subchannel operation (DSO) sub-band associated with the first BSS.

In some examples, the PPDU is associated with a TXOP allocation and a dynamic subchannel operation (DSO) initial control frame (ICF) in association with including the first information and the second information.

In some examples, the PPDU parsing component 1435 is configurable or configured to receive, via the PPDU, an indication of how the first STA is to parse a TXOP sharing mode indication included by the PPDU.

In some examples, the indication is included by a subfield within a user info field associated with the first STA. In some examples, the indication is that the first STA is to ignore the TXOP sharing mode indication.

In some examples, the indication is associated with an interpretation of a set of multiple subfields. In some examples, the interpretation defines that the first STA is to interpret the PPDU as carrying a multi-user request-to-send (RTS) trigger frame in association with the TXOP sharing mode indication being set to a non-zero value and an resource unit (RU) allocation subfield indicating a first RU outside of a primary subchannel associated with the first BSS; or the first STA is to interpret the PPDU as carrying a TXOP sharing (TXS) frame in association with the TXOP sharing mode indication being set to the non-zero value and the RU allocation subfield indicating a second RU within the primary subchannel associated with the first BSS.

In some examples, the TXOP sharing component 1425 is configurable or configured to receive, via the PPDU, one or more frames that include the first information and the second information.

In some examples, the one or more frames consists of a single frame, the single frame including the first information and the second information. In some examples, the one or more frames include a first frame and a second frame, the first frame including the first information and the second frame including the second information.

In some examples, the PPDU includes an aggregated medium access control (MAC) protocol data unit (A-MPDU). In some examples, the A-MPDU includes the first frame and the second frame.

Figure 15:
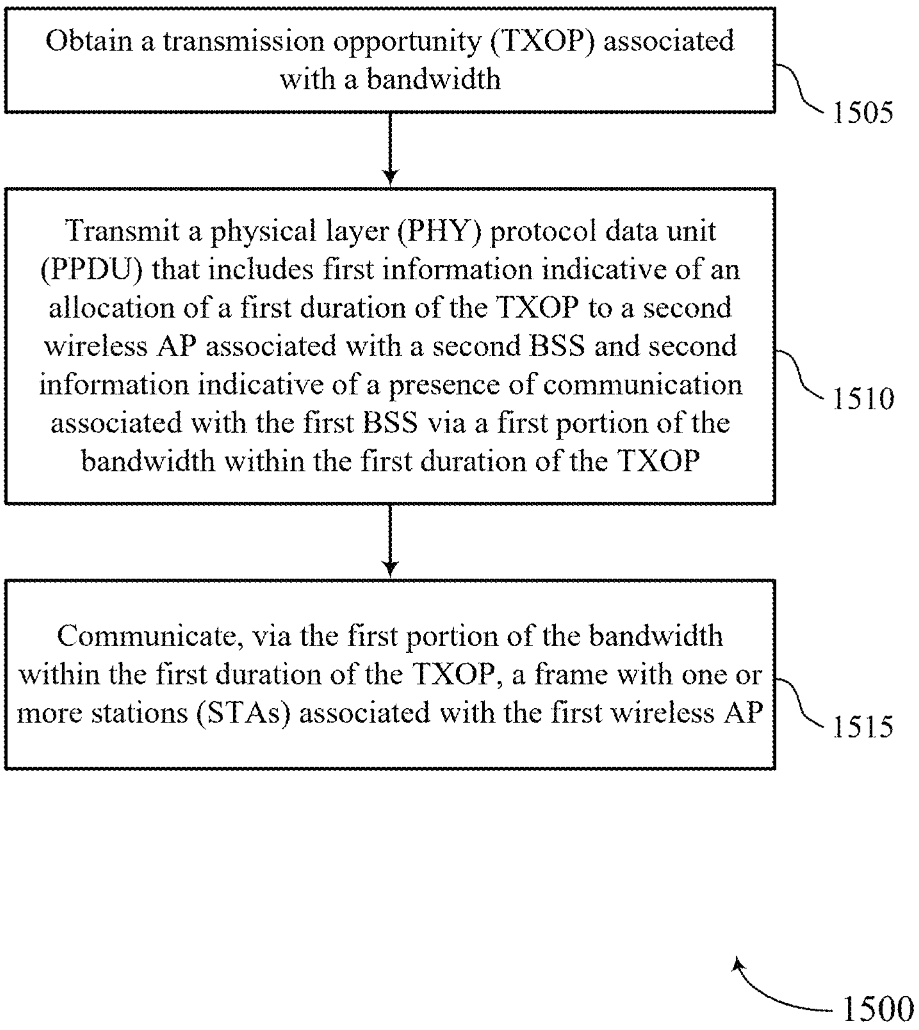
FIGS. 15 and 16 show flowcharts illustrating example processes performable by or at a first wireless AP associated with a first basic service set (BSS) that supports C-TDMA in Wi-Fi networks for partial bandwidth TXOP sharing.

FIG. 15 shows a flowchart illustrating an example process 1500 performable by or at a first wireless AP associated with a first BSS that supports C-TDMA in Wi-Fi networks for partial bandwidth TXOP sharing. The operations of the process 1500 may be implemented by a first wireless AP associated with a first basic service set (BSS) or its components as described herein. For example, the process 1500 may be performed by a wireless communication device, such as the wireless communication device 1300 described with reference to FIG. 13, operating as or within a wireless AP. In some examples, the process 1500 may be performed by a wireless AP, such as one of the APs 102 described with reference to FIG. 1.

In some examples, in 1505, the first wireless AP associated with a first basic service set (BSS) may obtain a transmission opportunity (TXOP) associated with a bandwidth. The operations of 1505 may be performed in accordance with examples as disclosed herein. In some implementations, aspects of the operations of 1505 may be performed by a TXOP component 1325 as described with reference to FIG. 13.

In some examples, in 1510, the first wireless AP associated with a first basic service set (BSS) may transmit a physical layer (PHY) protocol data unit (PPDU) that includes first information indicative of an allocation of a first duration of the TXOP to a second wireless AP associated with a second BSS and second information indicative of a presence of communication associated with the first BSS via a first portion of the bandwidth within the first duration of the TXOP. The operations of 1510 may be performed in accordance with examples as disclosed herein. In some implementations, aspects of the operations of 1510 may be performed by a TXOP sharing component 1330 as described with reference to FIG. 13.

In some examples, in 1515, the first wireless AP associated with a first basic service set (BSS) may communicate, via the first portion of the bandwidth within the first duration of the TXOP, a frame with one or more stations (STAs) associated with the first wireless AP. The operations of 1515 may be performed in accordance with examples as disclosed herein. In some implementations, aspects of the operations of 1515 may be performed by an in-BSS communication component 1335 as described with reference to FIG. 13.

Figure 16:
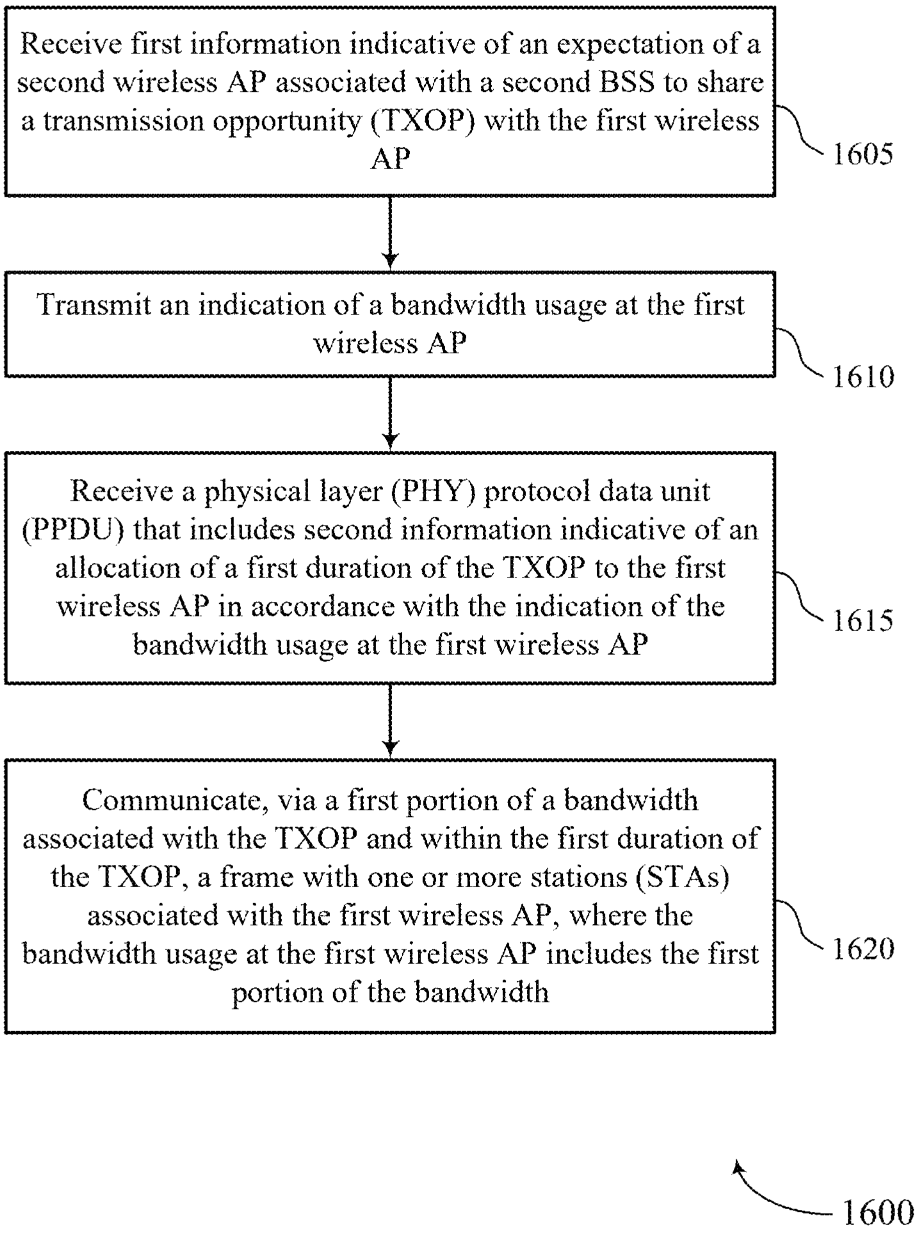

FIG. 16 shows a flowchart illustrating an example process 1600 performable by or at a first wireless AP associated with a first BSS that supports C-TDMA in Wi-Fi networks for partial bandwidth TXOP sharing. The operations of the process 1600 may be implemented by a first wireless AP associated with a first basic service set (BSS) or its components as described herein. For example, the process 1600 may be performed by a wireless communication device, such as the wireless communication device 1300 described with reference to FIG. 13, operating as or within a wireless AP. In some examples, the process 1600 may be performed by a wireless AP, such as one of the APs 102 described with reference to FIG. 1.

In some examples, in 1605, the first wireless AP associated with a first basic service set (BSS) may receive first information indicative of an expectation of a second wireless AP associated with a second BSS to share a transmission opportunity (TXOP) with the first wireless AP. The operations of 1605 may be performed in accordance with examples as disclosed herein. In some implementations, aspects of the operations of 1605 may be performed by an inter-AP coordination component 1340 as described with reference to FIG. 13.

In some examples, in 1610, the first wireless AP associated with a first basic service set (BSS) may transmit an indication of a bandwidth usage at the first wireless AP. The operations of 1610 may be performed in accordance with examples as disclosed herein. In some implementations, aspects of the operations of 1610 may be performed by an inter-AP coordination component 1340 as described with reference to FIG. 13.

In some examples, in 1615, the first wireless AP associated with a first basic service set (BSS) may receive a physical layer (PHY) protocol data unit (PPDU) that includes second information indicative of an allocation of a first duration of the TXOP to the first wireless AP in accordance with the indication of the bandwidth usage at the first wireless AP. The operations of 1615 may be performed in accordance with examples as disclosed herein. In some implementations, aspects of the operations of 1615 may be performed by a TXOP sharing component 1330 as described with reference to FIG. 13.

In some examples, in 1620, the first wireless AP associated with a first basic service set (BSS) may communicate, via a first portion of a bandwidth associated with the TXOP and within the first duration of the TXOP, a frame with one or more stations (STAs) associated with the first wireless AP, where the bandwidth usage at the first wireless AP includes the first portion of the bandwidth. The operations of 1620 may be performed in accordance with examples as disclosed herein. In some implementations, aspects of the operations of 1620 may be performed by an in-BSS communication component 1335 as described with reference to FIG. 13.

Figure 17:
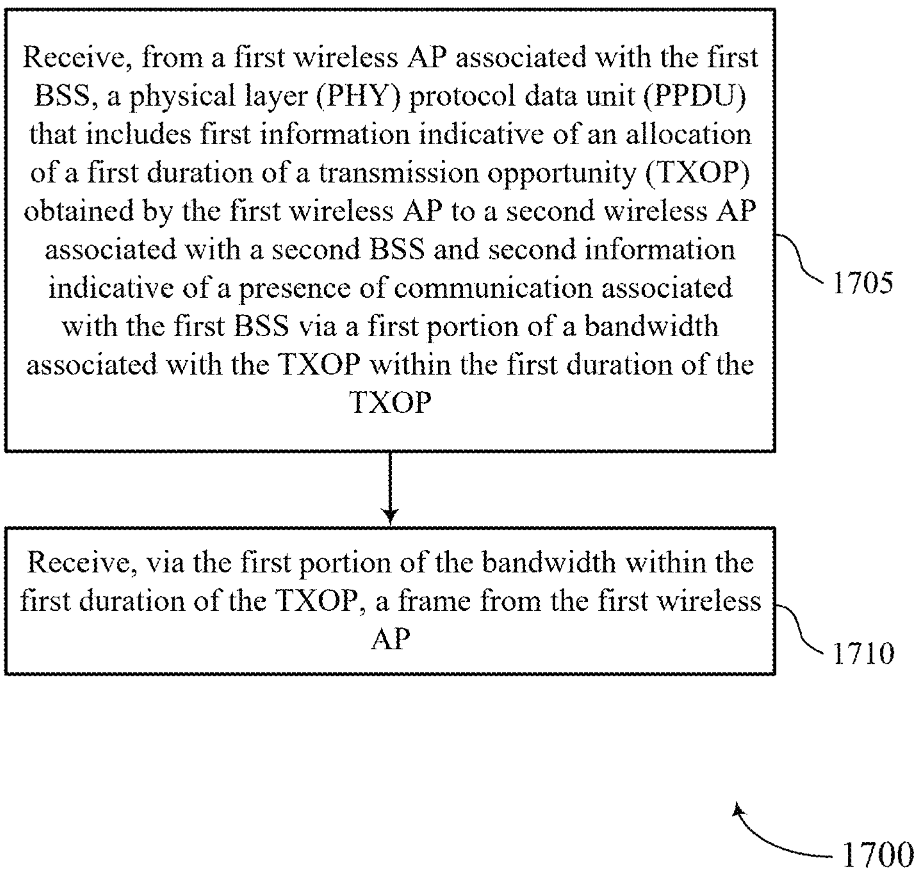
FIG. 17 shows a flowchart illustrating an example process performable by or at a first STA associated with a first BSS that supports C-TDMA in Wi-Fi networks for partial bandwidth TXOP sharing.

FIG. 17 shows a flowchart illustrating an example process 1700 performable by or at a first STA associated with a first BSS that supports C-TDMA in Wi-Fi networks for partial bandwidth TXOP sharing. The operations of the process 1700 may be implemented by a first STA associated with a first basic service set (BSS) or its components as described herein. For example, the process 1700 may be performed by a wireless communication device, such as the wireless communication device 1400 described with reference to FIG. 14, operating as or within a wireless STA. In some examples, the process 1700 may be performed by a wireless STA, such as one of the STAs 104 described with reference to FIG. 1.

In some examples, in 1705, the first STA associated with a first basic service set (BSS) may receive, from a first wireless AP associated with the first BSS, a physical layer (PHY) protocol data unit (PPDU) that includes first information indicative of an allocation of a first duration of a transmission opportunity (TXOP) obtained by the first wireless AP to a second wireless AP associated with a second BSS and second information indicative of a presence of communication associated with the first BSS via a first portion of a bandwidth associated with the TXOP within the first duration of the TXOP. The operations of 1705 may be performed in accordance with examples as disclosed herein. In some implementations, aspects of the operations of 1705 may be performed by a TXOP sharing component 1425 as described with reference to FIG. 14.

In some examples, in 1710, the first STA associated with a first basic service set (BSS) may receive, via the first portion of the bandwidth within the first duration of the TXOP, a frame from the first wireless AP. The operations of 1710 may be performed in accordance with examples as disclosed herein. In some implementations, aspects of the operations of 1710 may be performed by an in-BSS communication component 1430 as described with reference to FIG. 14.

Implementation examples are described in the following numbered clauses:

Clause 1: A method for wireless communication at a first wireless AP associated with a first BSS, including: obtaining a TXOP associated with a bandwidth; transmitting a PPDU that includes first information indicative of an allocation of a first duration of the TXOP to a second wireless AP associated with a second BSS and second information indicative of a presence of communication associated with the first BSS via a first portion of the bandwidth within the first duration of the TXOP; and communicating, via the first portion of the bandwidth within the first duration of the TXOP, a frame with one or more STAs associated with the first wireless AP.

Clause 2: The method of clause 1, further including: receiving an indication of a bandwidth usage at the second wireless AP via a second frame, where indicating the presence of the communication associated with the first BSS via the first portion of the bandwidth within the first duration is in accordance with the bandwidth usage at the second wireless AP being less than the bandwidth associated with the TXOP obtained by the first wireless AP.

Clause 3: The method of any of clauses 1-2, further including: transmitting information indicative of an expectation to share the TXOP with the second wireless AP, where receiving the indication of the bandwidth usage at the second wireless AP is in association with transmitting the information indicative of the expectation to share the TXOP with the second wireless AP.

Clause 4: The method of any of clauses 1-3, where the first wireless AP transmits the information indicative of the expectation to share the TXOP with the second wireless AP via a schedule announcement frame.

Clause 5: The method of any of clauses 1-4, where the indication of the bandwidth usage at the second wireless AP is associated with a 1-bit indication of whether the second wireless AP will use an entirety of the bandwidth associated with the TXOP or a portion of the bandwidth associated with the TXOP; a multi-bit indication that indicates which portion, of a plurality of portions, of the bandwidth associated with the TXOP the second wireless AP will use; or an occupied bandwidth of the second frame, the second frame is transmitted by the second wireless AP.

Clause 6: The method of any of clauses 1-5, where the second frame is a response frame associated with a schedule announcement frame, a negotiation frame, or a management frame.

Clause 7: The method of any of clauses 1-6, further including: receiving the indication of the bandwidth usage at the second wireless AP dynamically on a per-TXOP basis or semi-statically on a per-coordination instance basis.

Clause 8: The method of any of clauses 1-7, further including: receiving the indication of the bandwidth usage at the second wireless AP from the second wireless AP, a central controller, or another network node.

Clause 9: The method of any of clauses 1-8, further including: transmitting, via the first information, an indication of a second portion of the bandwidth allocated to the second wireless AP within the first duration of the TXOP.

Clause 10: The method of any of clauses 1-9, where the second portion of the bandwidth allocated to the second wireless AP is associated with an indicated bandwidth usage at the second wireless AP.

Clause 11: The method of any of clauses 1-10, where the second information indicates the presence of a transmission to or from the first wireless AP via an O-Primary channel associated with the first BSS within the first duration of the TXOP, the first portion of the bandwidth includes the O-Primary channel, and the communication associated with the first BSS includes the transmission via the O-Primary channel.

Clause 12: The method of any of clauses 1-11, where the second information includes a 1-bit indication, and a first value of the 1-bit indication corresponds to an absence of the transmission via the O-Primary channel and a second value of the 1-bit indication corresponds to the presence of the transmission via the O-Primary channel.

Clause 13: The method of any of clauses 1-12, where the second value of the 1-bit indication indicates, to the one or more STAs associated with the first wireless AP, that the transmission via the O-Primary channel is an impending transmission or a potential transmission.

Clause 14: The method of any of clauses 1-13, where the second information includes a multi-bit indication, and a first value of the multi-bit indication corresponds to an absence of the transmission via the O-Primary channel, a second value of the multi-bit indication corresponds an indication of the transmission via the O-Primary channel as an impending transmission, and a third value of the multi-bit indication corresponds an indication of the transmission via the O-Primary channel as a potential transmission.

Clause 15: The method of any of clauses 1-14, where the second information includes an indication of whether uplink channel access is allowed via the O-Primary channel within the first duration of the TXOP.

Clause 16: The method of any of clauses 1-15, where the second information indicates the one or more STAs associated with the first wireless AP to switch from a second portion of the bandwidth to the first portion of the bandwidth.

Clause 17: The method of any of clauses 1-16, where the first portion of the bandwidth includes a secondary subchannel associated with the first BSS and the second portion of the bandwidth includes a primary subchannel associated with the first BSS.

Clause 18: The method of any of clauses 1-17, where the first portion of the bandwidth includes a DSO sub-band associated with the first BSS.

Clause 19: The method of any of clauses 1-18, where the PPDU is associated with a TXOP allocation and a DSO ICF in association with including the first information and the second information.

Clause 20: The method of any of clauses 1-19, further including: transmitting, via information indicative of an expectation to share the TXOP with the second wireless AP, an indication of the first duration of the TXOP; and receiving an indication of an amount of the first duration that the second wireless AP will use, where indicating the presence of the communication associated with the first BSS via the first portion of the bandwidth within the first duration is in accordance with the amount of the first duration that the second wireless AP will use.

Clause 21: The method of any of clauses 1-20, where the indication includes a 1-bit indication indicating whether the second wireless AP will use an entirety of the first duration or a subset of the first duration; or the indication includes a multi-bit indication indicating a specific amount of the first duration that the second wireless AP will use.

Clause 22: The method of any of clauses 1-21, further including: performing one or more CCA measurements associated with a second portion of the bandwidth used by the second wireless AP within the first duration of the TXOP; and selectively communicating one or more frames via at least a sub-portion of the second portion of the bandwidth in association with performing the one or more CCA measurements.

Clause 23: The method of any of clauses 1-22, further including: monitoring a second portion of the bandwidth used by the second wireless AP within the first duration of the TXOP via an auxiliary radio of the first wireless AP; and selectively communicating one or more frames via at least a sub-portion of the second portion of the bandwidth in association with whether the auxiliary radio receives a TXOP return frame associated with at least the sub-portion of the second portion of the bandwidth.

Clause 24: The method of any of clauses 1-23, further including: performing a medium synchronization recovery procedure associated with a second portion of the bandwidth used by the second wireless AP within the first duration of the TXOP in association with a completion of the communication associated with the first BSS via the first portion of the bandwidth within the first duration of the TXOP; and selectively initiating a second TXOP or continuing the TXOP across at least a sub-portion of the second portion of the bandwidth in association with whether the medium synchronization recovery procedure is successful.

Clause 25: The method of any of clauses 1-24, further including: transmitting, via the PPDU, an indication of how the one or more STAs associated with the first wireless AP are to parse a TXOP sharing mode indication included by the PPDU.

Clause 26: The method of any of clauses 1-25, where the indication is included by a subfield within one or more user info fields associated with the one or more STAs, and the indication is that the one or more STAs are to ignore the TXOP sharing mode indication.

Clause 27: The method of any of clauses 1-26, where an interpretation of a plurality of subfields defines that the one or more STAs are to interpret the PPDU as carrying a multi-user RTS trigger frame in association with the TXOP sharing mode indication being set to a non-zero value and an RU allocation subfield indicating a first RU outside of a primary subchannel associated with the first BSS; or the one or more STAs are to interpret the PPDU as carrying a TXS frame in association with the TXOP sharing mode indication being set to the non-zero value and the RU allocation subfield indicating a second RU within the primary subchannel associated with the first BSS.

Clause 28: The method of any of clauses 1-27, further including: transmitting, via the PPDU, one or more frames that include the first information and the second information.

Clause 29: The method of any of clauses 1-28, where the one or more frames consists of a single frame, the single frame including the first information and the second information; or the one or more frames include a first frame and a second frame, the first frame including the first information and the second frame including the second information.

Clause 30: The method of any of clauses 1-29, where the PPDU includes an A-MPDU, and the A-MPDU includes the first frame and the second frame.

Clause 31: The method of any of clauses 1-30, further including: receiving a second frame that indicates a return, to the first wireless AP, of a sub-portion, of a plurality of sub-portions, of a second portion of the bandwidth associated with the TXOP used by the second wireless AP.

Clause 32: The method of any of clauses 1-31, where the second frame includes an indication of the sub-portion, from the plurality of sub-portions; or the second frame indicates the return of the sub-portion via an occupied bandwidth of the second frame, the sub-portion being associated with a difference between the second portion of the bandwidth used by the second wireless AP and the occupied bandwidth of the second frame.

Clause 33: The method of any of clauses 1-32, further including: communicating one or more frames via the sub-portion of the second portion of the bandwidth.

Clause 34: The method of any of clauses 1-33, where the one or more frames are transmitted to the one or more STAs associated with the first wireless AP or allocate the sub-portion of the second portion of the bandwidth to one or more other wireless APs.

Clause 35: A method for wireless communication at a first wireless AP associated with a first BSS, including: receiving first information indicative of an expectation of a second wireless AP associated with a second BSS to share a TXOP with the first wireless AP; transmitting an indication of a bandwidth usage at the first wireless AP; receiving a PPDU that includes second information indicative of an allocation of a first duration of the TXOP to the first wireless AP in accordance with the indication of the bandwidth usage at the first wireless AP; and communicating, via a first portion of a bandwidth associated with the TXOP and within the first duration of the TXOP, a frame with one or more STAs associated with the first wireless AP, where the bandwidth usage at the first wireless AP includes the first portion of the bandwidth.

Clause 36: The method of clause 35, where the PPDU further includes third information indicative of a presence of communication associated with the second BSS via a second portion of the bandwidth within the first duration of the TXOP, communicating the frame via the first portion of the bandwidth is in accordance with the presence of the communication associated with the second BSS via the second portion of the bandwidth.

Clause 37: The method of any of clauses 35-36, where the first wireless AP receives the information indicative of the expectation to share the TXOP with the second wireless AP via a schedule announcement frame.

Clause 38: The method of any of clauses 35-37, where the indication of the bandwidth usage at the first wireless AP is received via a second frame, and the indication of the bandwidth usage at the first wireless AP is associated with a 1-bit indication of whether the first wireless AP will use an entirety of the bandwidth associated with the TXOP or a portion of the bandwidth associated with the TXOP; a multi-bit indication that indicates which portion, of a plurality of portions, of the bandwidth associated with the TXOP the first wireless AP will use; or an occupied bandwidth of the second frame, the second frame is transmitted by the first wireless AP.

Clause 39: The method of any of clauses 35-38, where the second frame is a response frame associated with a schedule announcement frame, a negotiation frame, or a management frame.

Clause 40: The method of any of clauses 35-39, further including: transmitting the indication of the bandwidth usage at the first wireless AP dynamically on a per-TXOP basis or semi-statically on a per-coordination instance basis.

Clause 41: The method of any of clauses 35-40, further including: receiving, via the second information, an indication of the first portion of the bandwidth allocated to the first wireless AP within the first duration of the TXOP.

Clause 42: The method of any of clauses 35-41, further including: receiving, via the first information indicative of the expectation to share the TXOP with the first wireless AP, an indication of the first duration of the TXOP; and transmitting an indication of an amount of the first duration that the first wireless AP will use.

Clause 43: The method of any of clauses 35-42, where the indication includes a 1-bit indication indicating whether the first wireless AP will use an entirety of the first duration or a subset of the first duration; or the indication includes a multi-bit indication indicating a specific amount of the first duration that the first wireless AP will use.

Clause 44: The method of any of clauses 35-43, further including: transmitting a second frame that indicates a return, to the second wireless AP, of a sub-portion, of a plurality of sub-portions, of the first portion of the bandwidth associated with the TXOP used by the first wireless AP.

Clause 45: The method of any of clauses 35-44, where the second frame includes an indication of the sub-portion, from the plurality of sub-portions; or the second frame indicates the return of the sub-portion via an occupied bandwidth of the second frame, the sub-portion being associated with a difference between the first portion of the bandwidth used by the first wireless AP and the occupied bandwidth of the second frame.

Clause 46: A method for wireless communication at a first STA associated with a first BSS, including: receiving, from a first wireless AP associated with the first BSS, a PPDU that includes first information indicative of an allocation of a first duration of a TXOP obtained by the first wireless AP to a second wireless AP associated with a second BSS and second information indicative of a presence of communication associated with the first BSS via a first portion of a bandwidth associated with the TXOP within the first duration of the TXOP; and receiving, via the first portion of the bandwidth within the first duration of the TXOP, a frame from the first wireless AP.

Clause 47: The method of clause 46, further including: receiving, via the first information, an indication of a second portion of the bandwidth allocated to the second wireless AP within the first duration of the TXOP.

Clause 48: The method of any of clauses 46-47, where the second information indicates the presence of a transmission to or from the first wireless AP via an O-Primary channel associated with the first BSS within the first duration of the TXOP, the first portion of the bandwidth includes the O-Primary channel, and the communication associated with the first BSS includes the transmission via the O-Primary channel.

Clause 49: The method of any of clauses 46-48, where the second information includes a 1-bit indication, and a first value of the 1-bit indication corresponds to an absence of the transmission via the O-Primary channel and a second value of the 1-bit indication corresponds to the presence of the transmission via the O-Primary channel.

Clause 50: The method of any of clauses 46-49, where the second value of the 1-bit indication indicates, to the first STA, that the transmission via the O-Primary channel is an impending transmission or a potential transmission.

Clause 51: The method of any of clauses 46-50, where the second information includes a multi-bit indication, and a first value of the multi-bit indication corresponds to an absence of the transmission via the O-Primary channel, a second value of the multi-bit indication corresponds an indication of the transmission via the O-Primary channel as an impending transmission, and a third value of the multi-bit indication corresponds an indication of the transmission via the O-Primary channel as a potential transmission.

Clause 52: The method of any of clauses 46-51, where the second information includes an indication of whether uplink channel access is allowed via the O-Primary channel within the first duration of the TXOP.

Clause 53: The method of any of clauses 46-52, further including: selectively performing a channel access procedure associated with the O-Primary channel within the first duration of the TXOP in accordance with the indication of whether the uplink channel access is allowed via the O-Primary channel within the first duration of the TXOP.

Clause 54: The method of any of clauses 46-53, where the second information indicates that the first STA is to switch from a second portion of the bandwidth to the first portion of the bandwidth.

Clause 55: The method of any of clauses 46-54, where the first portion of the bandwidth includes a secondary subchannel associated with the first BSS and the second portion of the bandwidth includes a primary subchannel associated with the first BSS.

Clause 56: The method of any of clauses 46-55, where the first portion of the bandwidth includes a DSO sub-band associated with the first BSS.

Clause 57: The method of any of clauses 46-56, where the PPDU is associated with a TXOP allocation and a DSO ICF in association with including the first information and the second information.

Clause 58: The method of any of clauses 46-57, further including: receiving, via the PPDU, an indication of how the first STA is to parse a TXOP sharing mode indication included by the PPDU.

Clause 59: The method of any of clauses 46-58, where the indication is included by a subfield within a user info field associated with the first STA, and the indication is that the first STA is to ignore the TXOP sharing mode indication.

Clause 60: The method of any of clauses 46-59, an interpretation of a plurality of subfields defines that the first STA is to interpret the PPDU as carrying a multi-user RTS trigger frame in association with the TXOP sharing mode indication being set to a non-zero value and an RU allocation subfield indicating a first RU outside of a primary subchannel associated with the first BSS; or the first STA is to interpret the PPDU as carrying a TXS frame in association with the TXOP sharing mode indication being set to the non-zero value and the RU allocation subfield indicating a second RU within the primary subchannel associated with the first BSS.

Clause 61: The method of any of clauses 46-60, further including: receiving, via the PPDU, one or more frames that include the first information and the second information.

Clause 62: The method of any of clauses 46-61, where the one or more frames consists of a single frame, the single frame including the first information and the second information; or the one or more frames include a first frame and a second frame, the first frame including the first information and the second frame including the second information.

Clause 63: The method of any of clauses 46-62, where the PPDU includes an A-MPDU, and the A-MPDU includes the first frame and the second frame.

Clause 64: An apparatus for wireless communication at a first wireless AP associated with a first BSS, including a processing system that includes processor circuitry and memory circuitry that stores code, the processing system configured to cause the first wireless AP to perform a method of any of clauses 1-34.

Clause 65: An apparatus for wireless communication at a first wireless AP associated with a first BSS, including at least one means for performing a method of any of clauses 1-34.

Clause 66: A non-transitory computer-readable medium storing code for wireless communication, the code including instructions executable by a processing system to perform a method of any of clauses 1-34.

Clause 67: An apparatus for wireless communication at a first wireless AP associated with a first BSS, including a processing system that includes processor circuitry and memory circuitry that stores code, the processing system configured to cause the first wireless AP to perform a method of any of clauses 35-45.

Clause 68: An apparatus for wireless communication at a first wireless AP associated with a first BSS, including at least one means for performing a method of any of clauses 35-45.

Clause 69: A non-transitory computer-readable medium storing code for wireless communication, the code including instructions executable by a processing system to perform a method of any of clauses 35-45.

Clause 70: An apparatus for wireless communication at a first STA associated with a first BSS, including a processing system that includes processor circuitry and memory circuitry that stores code, the processing system configured to cause the first STA associated to perform a method of any of clauses 46-63.

Clause 71: An apparatus for wireless communication at a first STA associated with a first BSS, including at least one means for performing a method of any of clauses 46-63.

Clause 72: A non-transitory computer-readable medium storing code for wireless communication, the code including instructions executable by a processing system to perform a method of any of clauses 46-63.

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, measuring, and the like. Also, "determining" can include receiving (such as receiving information), accessing (such as accessing data stored in memory), transmitting (such as transmitting information) and the like. Also, "determining" can include resolving, selecting, obtaining, choosing, establishing and other such similar actions.

As used herein, a phrase referring to "at least one of" or "one or more of" a list of items refers to any combination of those items, including single members. As an example, "at least one of: a, b, or c" is intended to cover: a, b, c, a-b, a-c, b-c, and a-b-c. As used herein, "or" is intended to be interpreted in the inclusive sense, unless otherwise explicitly indicated. For example, "a or b" may include a only, b only, or a combination of a and b. Furthermore, as used herein, a phrase referring to "a" or "an" element refers to one or more of such elements acting individually or collectively to perform the recited function(s). Additionally, a "set" refers to one or more items, and a "subset" refers to less than a whole set, but non-empty.

As used herein, "based on" is intended to be interpreted in the inclusive sense, unless otherwise explicitly indicated. For example, "based on" may be used interchangeably with "based at least in part on," "associated with," "in association with," or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions, or information.

The various illustrative components, logic, logical blocks, modules, circuits, operations, and algorithm processes described in connection with the examples disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the examples described in this disclosure may be readily apparent to persons having ordinary skill in the art, and the generic principles defined herein may be applied to other examples without departing from the spirit or scope of this disclosure. Thus, the claims are not intended to be limited to the examples shown herein, but are to be accorded the widest scope consistent with this disclosure, the principles and the novel features disclosed herein.

Additionally, various features that are described in this specification in the context of separate examples also can be implemented in combination in a single implementation. Conversely, various features that are described in the context of a single implementation also can be implemented in multiple examples separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

What is claimed is:

1. An apparatus for wireless communication at a first wireless access point (AP) associated with a first basic service set (BSS), comprising:
- a processing system that includes processor circuitry and memory circuitry that stores code, the processing system configured to cause the first wireless AP to:
  - obtain a transmission opportunity (TXOP) associated with a bandwidth;
  - transmit a physical layer (PHY) protocol data unit (PPDU) that comprises:
    - first information indicative of an allocation of a first duration of the TXOP to a second wireless AP associated with a second BSS, and
    - second information indicative of a presence of communication associated with the first BSS via a first portion of the bandwidth within the first duration of the TXOP; and
  - communicate, via the first portion of the bandwidth within the first duration of the TXOP, a frame with one or more stations (STAs) associated with the first wireless AP.

2. The apparatus of claim 1, wherein the processing system is further configured to cause the first wireless AP to:
- receive an indication of a bandwidth usage at the second wireless AP via a second frame, wherein indicating the presence of the communication associated with the first BSS via the first portion of the bandwidth within the first duration is in accordance with the bandwidth usage at the second wireless AP being less than the bandwidth associated with the TXOP obtained by the first wireless AP.

3. The apparatus of claim 2, wherein the processing system is further configured to cause the first wireless AP to:

transmit information indicative of an expectation to share the TXOP with the second wireless AP, wherein receiving the indication of the bandwidth usage at the second wireless AP is in association with transmitting the information indicative of the expectation to share the TXOP with the second wireless AP.

4. The apparatus of claim 3, wherein the first wireless AP transmits the information indicative of the expectation to share the TXOP with the second wireless AP via a schedule announcement frame.

5. The apparatus of claim 2, wherein the indication of the bandwidth usage at the second wireless AP is associated with:

a 1-bit indication of whether the second wireless AP will use an entirety of the bandwidth associated with the TXOP or a portion of the bandwidth associated with the TXOP;

a multi-bit indication that indicates which portion, of a plurality of portions, of the bandwidth associated with the TXOP the second wireless AP will use; or an occupied bandwidth of the second frame, wherein the second frame is transmitted by the second wireless AP.

6. The apparatus of claim 2, wherein the processing system is further configured to cause the first wireless AP to:

receive the indication of the bandwidth usage at the second wireless AP dynamically on a per-TXOP basis or semi-statically on a per-coordination instance basis.

7. The apparatus of claim 1, wherein:

the second information indicates the presence of a transmission to or from the first wireless AP via an opportunistic primary (O-Primary) channel associated with the first BSS within the first duration of the TXOP, the first portion of the bandwidth comprises the O-Primary channel, and the communication associated with the first BSS comprises the transmission via the O-Primary channel.

8. The apparatus of claim 7, wherein:

the second information comprises a 1-bit indication, and a first value of the 1-bit indication corresponds to an absence of the transmission via the O-Primary channel and a second value of the 1-bit indication corresponds to the presence of the transmission via the O-Primary channel.

9. The apparatus of claim 8, wherein the second value of the 1-bit indication indicates, to the one or more STAs associated with the first wireless AP, that the transmission via the O-Primary channel is an impending transmission or a potential transmission.

10. The apparatus of claim 7, wherein:

the second information comprises a multi-bit indication, and a first value of the multi-bit indication corresponds to an absence of the transmission via the O-Primary channel, a second value of the multi-bit indication corresponds an indication of the transmission via the O-Primary channel as an impending transmission, and a third value of the multi-bit indication corresponds an indication of the transmission via the O-Primary channel as a potential transmission.

11. The apparatus of claim 7, wherein the second information comprises an indication of whether uplink channel access is allowed via the O-Primary channel within the first duration of the TXOP.

12. The apparatus of claim 1, wherein the second information indicates the one or more STAs associated with the first wireless AP to switch from a second portion of the bandwidth to the first portion of the bandwidth.

13. The apparatus of claim 12, wherein the first portion of the bandwidth comprises a secondary subchannel associated with the first BSS and the second portion of the bandwidth comprises a primary subchannel associated with the first BSS.

14. The apparatus of claim 12, wherein the first portion of the bandwidth comprises a dynamic subchannel operation (DSO) sub-band associated with the first BSS.

15. The apparatus of claim 12, wherein the PPDU is associated with a TXOP allocation and a dynamic subchannel operation (DSO) initial control frame (ICF) in association with comprising the first information and the second information.

16. An apparatus for wireless communication at a first wireless access point (AP) associated with a first basic service set (BSS), comprising:

a processing system that includes processor circuitry and memory circuitry that stores code, the processing system configured to cause the first wireless AP to:

receive first information indicative of an expectation of a second wireless AP associated with a second BSS to share a transmission opportunity (TXOP) with the first wireless AP;

transmit an indication of a bandwidth usage at the first wireless AP;

receive a physical layer (PHY) protocol data unit (PPDU) that comprises second information indicative of an allocation of a first duration of the TXOP to the first wireless AP in accordance with the indication of the bandwidth usage at the first wireless AP; and communicate, via a first portion of a bandwidth associated with the TXOP and within the first duration of the TXOP, a frame with one or more stations (STAs) associated with the first wireless AP, wherein the bandwidth usage at the first wireless AP comprises the first portion of the bandwidth.

17. The apparatus of claim 16, wherein the first wireless AP receives the information indicative of the expectation to share the TXOP with the second wireless AP via a schedule announcement frame.

18. The apparatus of claim 16, wherein the indication of the bandwidth usage at the first wireless AP is received via a second frame, and wherein the indication of the bandwidth usage at the first wireless AP is associated with:

a 1-bit indication of whether the first wireless AP will use an entirety of the bandwidth associated with the TXOP or a portion of the bandwidth associated with the TXOP;

a multi-bit indication that indicates which portion, of a plurality of portions, of the bandwidth associated with the TXOP the first wireless AP will use; or an occupied bandwidth of the second frame, wherein the second frame is transmitted by the first wireless AP.

19. The apparatus of claim 16, wherein the processing system is further configured to cause the first wireless AP to:

receive, via the first information indicative of the expectation to share the TXOP with the first wireless AP, an indication of the first duration of the TXOP; and transmit an indication of an amount of the first duration that the first wireless AP will use.

20. The apparatus of claim 19, wherein:

the indication comprises a 1-bit indication indicating whether the first wireless AP will use an entirety of the first duration or a subset of the first duration; or the indication comprises a multi-bit indication indicating a specific amount of the first duration that the first wireless AP will use.

21. The apparatus of claim 16, wherein the processing system is further configured to cause the first wireless AP to:

transmit a second frame that indicates a return, to the second wireless AP, of a sub-portion, of a plurality of sub-portions, of the first portion of the bandwidth associated with the TXOP used by the first wireless AP.

22. The apparatus of claim 21, wherein:

the second frame comprises an indication of the sub-portion, from the plurality of sub-portions; or the second frame indicates the return of the sub-portion via an occupied bandwidth of the second frame, the sub-portion being associated with a difference between the first portion of the bandwidth used by the first wireless AP and the occupied bandwidth of the second frame.

23. An apparatus for wireless communication at a first station (STA) associated with a first basic service set (BSS), comprising:

a processing system that includes processor circuitry and memory circuitry that stores code, the processing system configured to cause the first STA to:

receive, from a first wireless access point (AP) associated with the first BSS, a physical layer (PHY) protocol data unit (PPDU) that comprises:

first information indicative of an allocation of a first duration of a transmission opportunity (TXOP) obtained by the first wireless AP to a second wireless AP associated with a second BSS, and second information indicative of a presence of communication associated with the first BSS via a first portion of a bandwidth associated with the TXOP within the first duration of the TXOP; and receive, via the first portion of the bandwidth within the first duration of the TXOP, a frame from the first wireless AP.

24. The apparatus of claim 23, wherein:

the second information indicates the presence of a transmission to or from the first wireless AP via an opportunistic primary (O-Primary) channel associated with the first BSS within the first duration of the TXOP, the first portion of the bandwidth comprises the O-Primary channel, and the communication associated with the first BSS comprises the transmission via the O-Primary channel.

25. The apparatus of claim 23, wherein the second information indicates the first STA to switch from a second portion of the bandwidth to the first portion of the bandwidth.

26. The apparatus of claim 23, wherein the processing system is further configured to cause the first STA to:

receive, via the PPDU, an indication of how the first STA is to parse a TXOP sharing mode indication comprised by the PPDU.

27. The apparatus of claim 26, wherein:

the indication is comprised by a subfield within a user info field associated with the first STA, and the indication is that the first STA is to ignore the TXOP sharing mode indication.

28. The apparatus of claim 26, wherein:

the indication is associated with an interpretation of a plurality of subfields, and the interpretation defines that the first STA is to interpret the PPDU as carrying a multi-user request-to-send (RTS) trigger frame in association with the TXOP sharing mode indication being set to a non-zero value and an resource unit (RU) allocation subfield indicating a first RU outside of a primary subchannel associated with the first BSS; or the first STA is to interpret the PPDU as carrying a TXOP sharing (TXS) frame in association with the TXOP sharing mode indication being set to the non-zero value and the RU allocation subfield indicating a second RU within the primary subchannel associated with the first BSS.

29. A method for wireless communication at a first wireless access point (AP) associated with a first basic service set (BSS), comprising:

obtaining a transmission opportunity (TXOP) associated with a bandwidth;

transmitting a physical layer (PHY) protocol data unit (PPDU) that comprises:

first information indicative of an allocation of a first duration of the TXOP to a second wireless AP associated with a second BSS, and second information indicative of a presence of communication associated with the first BSS via a first portion of the bandwidth within the first duration of the TXOP; and communicating, via the first portion of the bandwidth within the first duration of the TXOP, a frame with one or more stations (STAs) associated with the first wireless AP.

30. The method of claim 29, further comprising:

receiving an indication of a bandwidth usage at the second wireless AP via a second frame, wherein indicating the presence of the communication associated with the first BSS via the first portion of the bandwidth within the first duration is in accordance with the bandwidth usage at the second wireless AP being less than the bandwidth associated with the TXOP obtained by the first wireless AP.

* * * * *